US008170210B2

(12) United States Patent
Manders et al.

(10) Patent No.: US 8,170,210 B2
(45) Date of Patent: May 1, 2012

(54) DEVICE FOR AND A METHOD OF PROCESSING DATA STREAM

(75) Inventors: Roland Peter Jan Mathijs Manders, Eindhoven (NL); Albert Maria Arnold Rijckaert, Waalre (NL); Eric Wilhelmus Josephus Moors, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 852 days.

(21) Appl. No.: 12/159,011

(22) PCT Filed: Nov. 28, 2006

(86) PCT No.: PCT/IB2006/054469

§ 371 (c)(1),
(2), (4) Date: Jun. 24, 2008

(87) PCT Pub. No.: WO2007/072248

PCT Pub. Date: Jun. 28, 2007

(65) Prior Publication Data

US 2008/0317246 A1 Dec. 25, 2008

(30) Foreign Application Priority Data

Dec. 23, 2005 (EP) .................................... 05112870

(51) Int. Cl.
*H04N 5/915* (2006.01)

(52) U.S. Cl. ........................................ 380/217; 386/343

(58) Field of Classification Search .................... 380/36, 380/37, 42, 43, 200, 201; 386/205, 206, 386/350, 351, 352; 705/50, 51, 57
See application file for complete search history.

(56) References Cited

U.S. PATENT DOCUMENTS 6,658,199 B1 * 12/2003 Hallberg ........................ 386/346
2001/0036269 A1 * 11/2001 Morinaga et al. ............. 380/203
2003/0043919 A1 3/2003 Haddad
2005/0028192 A1 * 2/2005 Hooper et al. .................. 725/31
2005/0157714 A1 7/2005 Shlissel et al.
2005/0222847 A1 * 10/2005 Singhal et al. ................ 704/503
2007/0016802 A1 * 1/2007 Wingert et al. ............... 713/193
2007/0083467 A1 * 4/2007 Lindahl et al. .................. 705/50

FOREIGN PATENT DOCUMENTS

EP 1142340 B1 10/2001
WO 0126375 A1 4/2001

* cited by examiner

*Primary Examiner* — Gilberto Barron, Jr.
*Assistant Examiner* — Malcolm Cribbs

(57) ABSTRACT

A device (2300) for processing a data stream (1800), wherein the device (2300) comprises a splitting unit (2305) for splitting adjacent frames (1902) of a partially decrypted data stream (1900), the partially decrypted data stream (1900) comprising decrypted frame boundary portions (1901) between adjacent frames (1902), at the frame boundary portions (1901), a replication unit (2306) for replicating split frames (1902) a number of times in accordance with a predetermined replication rate and a connecting unit (2307) for connecting the replicated split frames (1902).

14 Claims, 33 Drawing Sheets

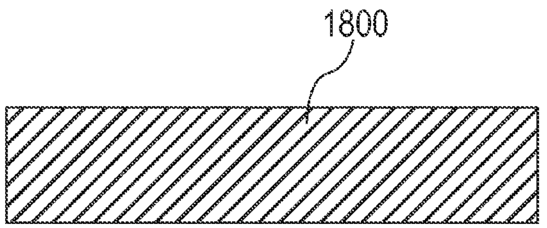
FIG. 18
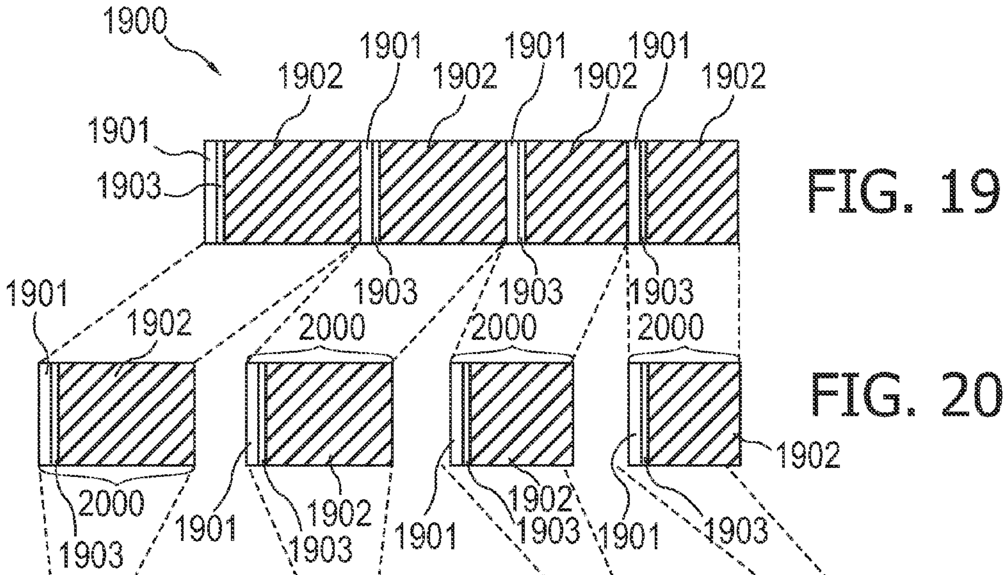
FIG. 19
FIG. 20
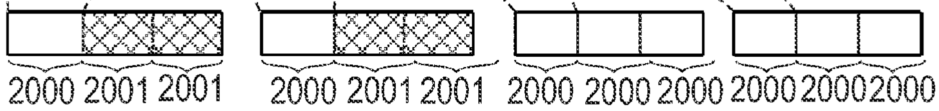
FIG. 21
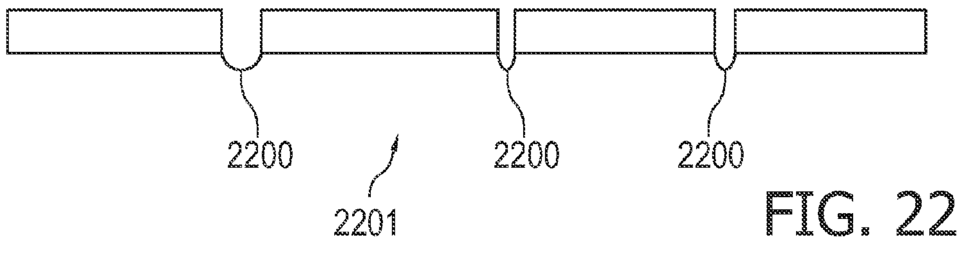
FIG. 22

DEVICE FOR AND A METHOD OF PROCESSING DATA STREAM

FIELD OF THE INVENTION

The invention relates to a device for processing a data stream.

The invention further relates to a method of processing a data stream.

The invention further relates to a program element.

The invention further relates to a computer-readable medium.

BACKGROUND OF THE INVENTION

Electronic entertainment devices become more and more important. Particularly, an increasing number of users buy hard disk based audio/video players and other entertainment equipment.

Since the reduction of storage space is an important issue in the field of audio/video players, audio and video data are often stored in a compressed manner, and for security reasons in an encrypted manner.

MPEG2 is a standard for the generic coding of moving pictures and associated audio and creates a video stream out of frame data that can be arranged in a specified order called the GOP ("Group Of Pictures") structure. An MPEG2 video bit stream is made up of a series of data frames encoding pictures. The three ways of encoding a picture are intra-coded (I picture), forward predictive (P picture) and bi-directional predictive (B picture). An intra-coded frame (I-frame) is an independently decodable frame. A forward predictive frame (P-frame) needs information of a preceding I-frame or P-frame. A bi-directional predictive frame (B-frame) is dependent on information of a preceding and/or subsequent I-frame or P-frame.

It is an interesting function in a media playback device to switch from a normal reproduction mode, in which media content is played back in a normal speed, to a trick-play reproduction mode, in which media content is played back in a modified manner, for instance with a reduced speed ("slow forward"), a still picture, or vice versa.

US 2005/0157714 A1 discloses a method for processing a packet-based scrambled stream, the method including receiving a plurality of scrambled packets in a packet stream, descrambling any of the scrambled packets, and transmitting a modified packet stream including at least one of the descrambled packets and at least one of the scrambled packets.

BRIEF SUMMARY OF THE INVENTION

It is an object of the invention to enable efficient processing of a data stream.

In order to achieve the object defined above, a device for processing a data stream, a method of processing a data stream, a program element and a computer-readable medium according to the independent claims are provided.

According to an exemplary embodiment of the invention, a device for processing a data stream is provided, wherein the device comprises a splitting unit for splitting adjacent frames of a partially decrypted (and partially encrypted) data stream, comprising decrypted frame boundary portions between adjacent frames, at the frame boundary portions, a replication unit for replicating split frames a number of times in accordance with a predetermined replication rate (for instance a trick-play factor, for example "3"), and a connecting unit for connecting the replicated split frames.

According to another exemplary embodiment of the invention, a method of processing a data stream is provided, the method comprising splitting adjacent frames of a partially decrypted (and partially encrypted) data stream, comprising decrypted frame boundary portions between adjacent frames, at the frame boundary portions, replicating split frames a number of times in accordance with a predetermined replication rate, and connecting the replicated split frames.

Beyond this, according to another exemplary embodiment of the invention, a computer-readable medium is provided, in which a computer program is stored, which computer program, when being executed by a processor, is adapted to control or carry out the above-mentioned method.

Moreover, according to still another exemplary embodiment of the invention, a program element is provided, which program element, when being executed by a processor, is adapted to control or carry out the above-mentioned method.

The data processing according to embodiments of the invention can be realized by a computer program, that is to say by software, or by using one or more special electronic optimization circuits, that is to say in hardware, or in hybrid form, that is to say by means of software components and hardware components.

The measures according to exemplary embodiments of the invention provide the advantage that a partially decrypted and partially encrypted data stream may be processed in a manner that different frames are split up at boundary portions and subsequently, the split frames may be connected again in a manner so as to enable slow-forward or slow-backward or stand still, more general slow-motion, trick-play reproduction. Therefore, plaintext portions between adjacent frames may serve as indicators at which positions to disconnect the different frames, to repeat the various frames a plurality of times so as to provide a slow-motion feature, and to put together the replicated frame sequences so that an appropriate sound and/or picture may be obtained.

According to an exemplary embodiment, a frame splitting algorithm and the gluing of the (split and replicated) frames is made possible. With an algorithm according to an exemplary embodiment, a partially encrypted "hybrid" slow-forward DVB ("Digital Video Broadcasting") stream may be generated from a fully encrypted normal play (for instance MPEG) stream. Such a procedure may include replacing selectively only those encrypted packets of the transport stream, which contain picture frame boundaries with their corresponding plaintext packets to facilitate slow-forward. Furthermore, the packets may be split at the picture frame boundaries, and the slow-forward stream may be generated by replicating frames. Packets at the picture frame boundary may be stuffed if needed. Then, the places may be identified at which the picture start code is spanning across two packets, and a corresponding correction may be applied to them, which process may be denoted as gluing.

According to an exemplary embodiment, a storage device for storing MPEG transport streams with a digital interface to an MPEG compliant decoder is provided which decoder is capable of providing an MPEG compliant transport stream for slow-forward play mode of encrypted DVB streams. In special scenarios, the simple process of decrypting and producing a plaintext slow-forward stream may be inappropriate, since all information would become plaintext. This may be undesired from a security point of view. Furthermore, the use of a DVB encryptor in a consumer device may not be permitted. This entails that processing has to be performed on the encrypted DVB transport stream.

Thus, according to an exemplary embodiment of the invention, a hybrid transport stream may be used comprising a small (particularly a minimum) amount of plaintext information necessary to allow the creation of a slow-forward MPEG compliant transport stream whilst ensuring that the majority of information remains encrypted. One aspect in this context is that individual frames in the encrypted transport stream are repeated to provide the slow-forward mode. This entails the frame splitting and subsequent gluing of individual frames being necessary, in special cases, to correct MPEG picture start codes traversing packet boundaries. In this application, possibilities of realizing the gluing are disclosed.

Thus, exemplary embodiments of the invention may include splitting of packets in order to separate frames. This may include replicating frames to repeat B-frames, as well as the option to use empty frames to repeat original I- or P-frames.

Furthermore, it is possible to start with a partially encrypted start code, and to implement an algorithm to determine the amount of start code bytes present in the (not-) encrypted packet may be provided. As a result, gluing of packets may be made possible. In case the concatenation of packets results in a start code of more than a predetermined threshold value of, for instance, 4 bytes, the algorithm may calculate an amount of bytes to be removed. In case the concatenation results in a start code of less than the predetermined threshold value, for instance 4 bytes, it is possible to insert extra gluing packets.

Therefore, an exemplary embodiment of the invention is directed to the detection of the picture start code for encrypting streams, which lead to splitting and gluing of packets.

Gluing may be performed at positions of the data stream at which a part of the start code is present and may include inserting an extra packet. An Adaptation Field (AF) may be inserted for stuffing, particularly for transport stream level stuffing. Alternatively, elementary stream level stuffing may be possible, for instance including inserting one or more plain "zeros" in the stream.

The portion of the data stream, which is decrypted in order to allow for the data stream processing, may be in the order of 1% or less, so that 99% or more of the stream may remain encrypted.

Next, further exemplary embodiments of the invention will be described.

In the following, exemplary embodiments of the device for processing a data stream will be explained. However, these embodiments also apply for the method of processing a data stream, for the computer-readable medium and for the program element.

The device may comprise a decryption unit for selectively replacing encrypted frame boundary portions between adjacent frames of an (entirely or partially) encrypted data stream by the decrypted frame boundary portions so as to form the partially decrypted data stream. In other words, it is possible that a fully encrypted data stream is processed in such a manner that encrypted portions between neighbored frames are replaced by corresponding decrypted portions. The decryption unit may be located separately from a storage device (for instance a hard disk or a flash memory) storing the encrypted content, or may be integrated in such a storage device. It is also possible that such a storage device already stores the partially decrypted and partially encrypted data stream, which may also be denoted as a hybrid stream.

Particularly, the decryption unit may be adapted for selectively replacing exclusively the encrypted frame boundary portions between adjacent frames of an encrypted data stream by the decrypted frame boundary portions, and for maintaining all other frame portions encrypted. Therefore, only necessary parts of the encrypted data stream are decrypted so that the generation of a trick-play stream may be made possible based on these plaintext portions. However, a part, in many cases the main or major part, of the stream remains encrypted so that a high level of security may be obtained.

The decryption unit may be adapted for selectively replacing the encrypted frame boundary portions by the decrypted frame boundary portions so as to form the partially decrypted data stream as a basis for generating a trick-play stream with a small, preferably with a minimum, amount of decrypted portions. According to this embodiment, it is possible to have simultaneously an almost completely encrypted data stream with only those portions being selectively decrypted which are needed for generating a trick-play stream like a slow-motion stream, that may particular be a slow-forward stream or a slow-reverse stream.

The splitting unit may be adapted for inserting a plaintext packet at the beginning of each split frame and/or may be adapted for stuffing of the split packet. Therefore, after having split the different frames, a plaintext packet may be inserted at the end and/or at the beginning of each of the split frames. Such a packet may contain information needed to identify or characterize the corresponding frame or may simply stuff the border between adjacent frames. In more detail, splitting is not really inserting, it is the stuffing of the split packet, first the last part of the previous frame, then the first part of the current frame. It may be stuffed with an adaptation field.

Such a plaintext packet may comprise a header and/or an Adaptation Field (AF). The term Adaptation Field originates from the field of MPEG encoding.

The connection unit may be adapted for connecting the replicated split frames based on identifying places where a frame boundary portion (for instance a picture start code) is spanning across two frames and based on correcting such identified places. Therefore, any possible problems when putting together the replicated split frames in the context of a slow-motion trick-play may be removed or eliminated by inspecting the gluing portions. This will improve the quality of reproduction in the trick-play mode.

The connection unit may particularly be adapted for determining the size of the frame boundary portions of the split frames and for connecting the split frames based on the determined size. When the size is determined to be too large, for instance exceeds a threshold value of, for example, 4 bytes, the frame boundary portions or picture start codes are correspondingly shortened so as to be in accordance with the predetermined threshold value. In another case, when the size of the frame boundary portions is smaller than a predetermined threshold value of, for instance, 4 bytes, the size is correspondingly increased, for instance by inserting extra portions in the frame boundary portions. By taking this measure, the picture start codes may be tailored to a desired length, which may improve the controllability and operability of the entire system.

The device may comprise a storing unit for storing the data stream. Such a storing unit may be a harddisk or a memory card, which may capable of storing the data stream, for instance including audio and/or video content.

The device may be adapted to process a fully encrypted data stream. In other words, the entire data stream may be completely encrypted and therefore secured against unauthorized access. Then, specially defined portions between adjacent frames are selectively substituted by corresponding plaintext portions. However, it is also in the context of the invention, that the stream based on which the processing is carried out is partially or entirely decoded.

The device may be adapted to process at least one frame of the group consisting of an intra-coded frame (I-frame), a forward predictive frame (P-frame) and a bi-directional predictive frame (B-frame). In MPEG 2, an I-frame is an independently decodable frame. A P-frame requires information of a preceding I-frame or P-frame. A B-frame is dependent on information of a preceding and/or a subsequent I-frame or P-frame.

The device may be adapted to process a data stream of video data and/or audio data. However, such media content is not the only type of data that may be processed with the scheme according to embodiments of the invention. Trick-play generation and similar applications may be an issue for both, video (audiovisual) data processing and (pure) audio data processing.

The device may further be adapted to process a data stream of digital data.

Furthermore, the device may comprise a reproduction unit for reproducing or playing back the processed data stream, wherein the reproduction unit may be connected to (an output of) the connecting unit. Such a reproduction unit may comprise a loudspeaker or earphones or headphones and/or an optical display device so that both, audio and visual data can be reproduced perceivable for a human being.

Moreover, the device may comprise a generation unit for processing the data stream for reproduction in a trick-play reproduction mode. Such a trick-play generation unit adapted to generate a data stream for reproduction in a trick-play reproduction mode may be adjusted by a user by selecting corresponding options via a user interface, for instance buttons of a device, a keypad or a remote control. The trick-play reproduction mode selected by a user may be one of the group consisting of a slow motion reproduction mode (particularly a slow-forward mode or a slow-reverse mode), a stand still mode, a fast forward reproduction mode, a fast reverse reproduction mode, a freeze frame reproduction mode, an instant replay reproduction mode, and a reverse reproduction mode. Other trick-play streams are however possible. For trick-play in accordance with a trick-play factor, only a portion of the data may be used for output (for example trick-play factor larger than one), or one and the same content may be played back several times (for example trick-play factor smaller than one).

The device according to exemplary embodiments of the invention may be adapted to process an MPEG2 data stream. MPEG2 is a designation for a group of audio and video coding standards agreed upon by MPEG (Moving Pictures Experts Group), and published as the ISO/IEC 13818 International Standard. For example, MPEG2 is used to encode audio and video for broadcast signals including digital satellite and cable TV, but may also be used for DVD.

The device according to embodiments of the invention may be realized as one of the group consisting of a digital video recording device, a network-enabled device, a conditional access system, a portable audio player, a portable video player, a mobile phone, a DVD player, a CD player, a hard-disk-based media player, an internet radio device, a public entertainment device, and an MP3 player. However, these applications are only exemplary.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

FIG. 18 to FIG. 22 show different data streams obtained during carrying out a method of processing a data stream according to an exemplary embodiment of the invention.

Figure 1:
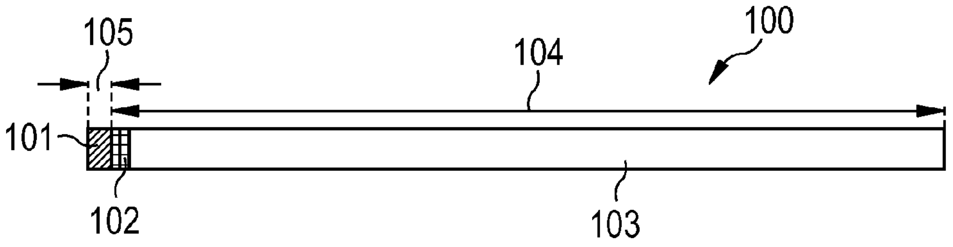
FIG. 1 illustrates a time-stamped transport stream packet.

The Figures are schematically drawn and not true to scale, and the identical reference numerals in different Figures refer to corresponding elements. It will be clear for those skilled in the art, that alternative but equivalent embodiments of the invention are possible without deviating from the true inventive concept, and that the scope of the invention will be limited by the claims only.

DETAILED DESCRIPTION OF THE INVENTION

In the following, referring to FIG. 1 to FIG. 13, different aspects of trick-play implementation for transport streams according to exemplary embodiments of the invention will be described.

Particularly, several possibilities to perform trick-play on an MPEG2 encoded stream will be described, which may be partly or totally encrypted, or non-encrypted. The following description will target methods specific to the MPEG2 transport stream format. However, the invention is not restricted to this format.

Experiments were actually done with an extension, the so-called time-stamped transport stream. This comprises transport stream packets, all of which are pre-pended with a 4 bytes header in which the transport stream packet arrival time is placed. This time may be derived from the value of the program clock reference (PCR) time-base at the time the first byte of the packet is received at the recording device. This is a proper method to store the timing information with the stream, so that playback of the stream becomes a relatively easy process.

One problem during playback is to ensure that the MPEG2 decoder buffer will not overrun nor underflow. If the input stream was compliant to the decoder buffer model, restoring the relative timing ensures that the output stream is also compliant. Some of the trick-play methods described herein are independent of the time stamp and perform equally well on transport streams with and without time stamps.

FIG. 1 illustrates a time stamped transport stream packet 100 having a total length 104 of 188 Bytes and comprising a time stamp 101 having a length 105 of 4 Bytes, a packet header 102, and a packet payload 103 having a length of 184 Bytes.

This following description will give an overview of the possibilities to create an MPEG/DVB (digital video broadcasting) compliant trick-play stream from a recorded transport stream and intends to cover the full spectrum of recorded streams from those that are completely plaintext, so every bit of data can be manipulated, to streams that are completely encrypted (for instance according to the DVB scheme), so that only transport stream headers and some tables may be accessible for manipulation.

When creating trick-play for an MPEG/DVB transport stream, problems may arise when the content is at least partially encrypted. It may not be possible to descend to the elementary stream level, which is the usual approach, or even access any packetized elementary stream (PES) headers before decryption. This also means that finding picture frames is not possible. Known trick-play engines need to be able to access and process this information.

In the frame of this description, the term "ECM" denotes an Entitlement Control Message. This message may particularly comprise secret provider proprietary information and may, among others, contain encrypted Control Words (CW) needed to decrypt the MPEG stream. Typically, Control Words expire in 10-20 seconds. The ECMs are embedded in packets in the transport stream.

In the frame of this description, the term "keys" particularly denotes data that may be stored in a smart card and may be transferred to the smart card using EMMs, that is so-called "Entitlement Management Messages" that may be embedded in the transport stream. These keys may be used by the smart card to decrypt the Control Words present in the ECM. An exemplary validity period of such a key is one month.

In the frame of this description, the term "Control Words" (CW) particularly denotes decryption information needed to decrypt actual content. Control words may be decrypted by the smart card and then stored in a memory of the decryption core.

Some aspects related to trick-play on plaintext streams will now be described.

It is preferable that any MPEG2 streams created are MPEG2 compliant transport streams. This is because the decoder may not only be integrated within a device, but may also be connected via a standard digital interface, such as an IEEE1394 interface, for example.

Figure 2:
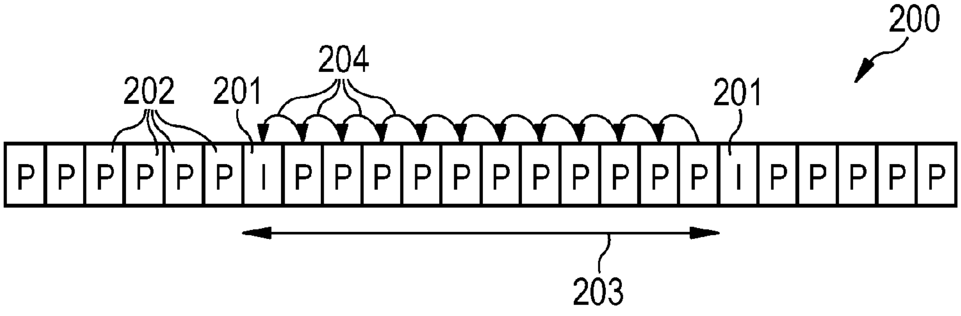
FIG. 2 shows an MPEG2 group of picture structure with intra-coded frames and forward predictive frames.

Account should also be taken of any problems that may occur when using a video coding technique like MPEG2 that exploits the temporal redundancy of video to achieve high compression ratios. Frames may no longer be decoded independently. A structure of a plurality of groups of pictures (GOPs) is shown in FIG. 2. Particularly, FIG. 2 shows a stream 200 comprising several MPEG2 GOP structures with a sequence of I-frames 201 and P-frames 202. The GOP size is denoted with reference numeral 203. The GOP size 203 is set to 12 frames, and only I-frames 201 and P-frames 202 are shown here.

Figure 3:
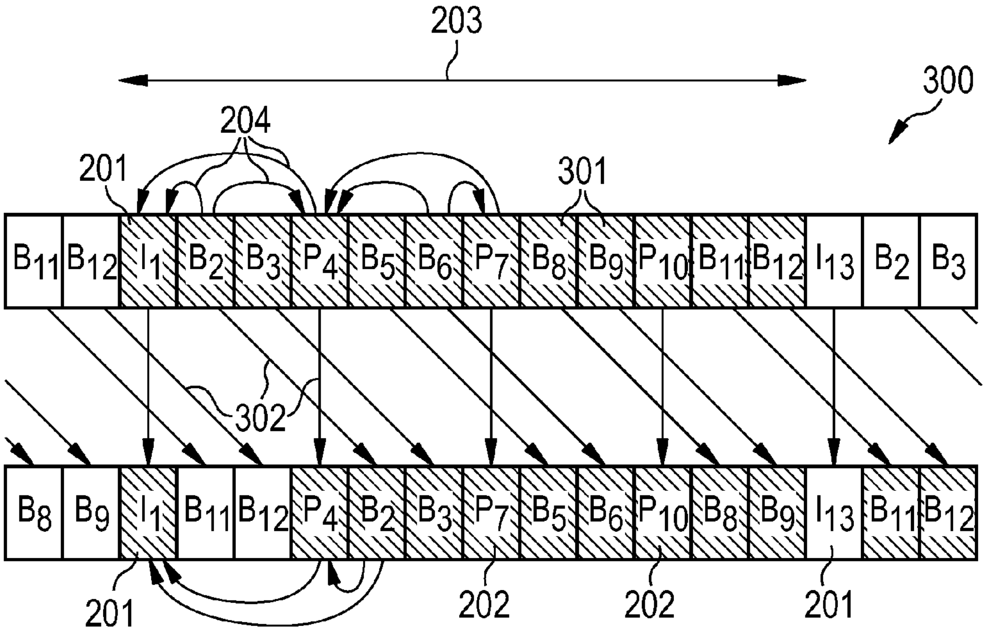
FIG. 3 illustrates an MPEG2 group of picture structure with intra-coded frames, forward predictive frames and bi-directional predictive frames.

In MPEG, a GOP structure may be used in which only the first frame is coded independently of other frames. This is the so-called intra-coded or I-frame 201. The predictive frames or P-frames 202 are coded with a unidirectional prediction, meaning that they only rely on the previous I-frame 201 or P-frame 202 as indicated by arrows 204 in FIG. 2. Such a GOP structure has typically a size of 12 or 16 frames 201, 202. Another structure 300 of a plurality of GOPs is shown in FIG. 3. Particularly, FIG. 3 shows the MPEG2 GOP structure with a sequence of I-frames 201, P-frames 202 and B-frames 301. The GOP size is again denoted with reference numeral 203.

It is possible to use a GOP structure containing also bi-directionally predictive frames or B-frames 301 as shown in FIG. 3. A GOP size 203 of 12 frames is chosen for the example. The B-frames 301 are coded with a bi-directional prediction, meaning that they rely on a previous and a next I- or P-frame 201, 202 as indicated for some B-frames 301 by curved arrows 204. The transmission order of the compressed frames may be not the same as the order in which they are displayed.

To decode a B-frame 301, both reference frames before and after the B-frame 301 (in display order) are needed. To minimize the buffer demand in a decoder, the compressed frames may be reordered. So in transmission, the reference frames may come first. The reordered stream, as it is transmitted, is also shown in FIG. 3, lower part. The reordering is indicated by straight arrows 302. A stream containing B-frames 301 can give a nice looking trick-play picture if all the B-frames 301 are skipped. For the present example, this leads to a trick-play speed of 3× forward.

Even if an MPEG2 stream is not encrypted (that is to say plaintext), trick-play is not trivial. The possibility of a slow-reverse based on I-frames only is briefly mentioned. An efficient frame based slow-reverse is more difficult though, due to the necessary inversion of the MPEG2 GOP. Slow-forward which is also known as slow motion forward is a mode in which the display picture runs at a lower than normal speed. A rudimentary form of slow-forward is already possible with the technique making use of a fast-forward algorithm that generates trick-play GOPs. Setting the fast-forward speed to a value between zero and one results in a slow-forward stream based on a repetition of fast-forward trick-play GOPs. For a plaintext stream this is no problem but for an encrypted stream it can lead to the erroneous decryption of part of the I-frame in certain specific conditions. There are several options to solve this problem but the most suitable way is not to repeat the fast-forward trick-play GOP but to extend the size of the trick-play GOP by the addition of empty P-frames. This technique in fact also enables slow-reverse, because it is based on the trick-play GOPs used for fast-forward/reverse and therefore on the independently decodable I-frames. However, it is not preferred to make use of this kind of I-frame based slow-forward or slow-reverse for the following reason. The distance between I-frames in normal play is around half a second and for slow-forward/reverse it is multiplied with the slow motion factor. So this type of slow-forward or slow-reverse is not really the slow motion consumers are used to but in fact it is more like a slide show with a large temporal distance between the successive pictures.

In another trick-play mode called still picture mode the display picture is halted. This can be achieved by adding empty P-frames to the I-frame for the duration of the still picture mode. This means that the picture resulting from the last I-frame is halted. When switching to still picture from normal play, this can also be the nearest I-frame according to the data in the CPI file. This technique is an extension of the fast-forward/reverse modes and results in nice still pictures especially if interlace kill is used. However the positional accuracy is often not sufficient when switching from normal play or slow-forward/reverse to still picture.

The still picture mode can be extended to implement a step mode. The step command advances the stream to some next or previous I-frame. The step size is at minimum one GOP but can also be set to a higher value equal to an integer number of GOPs. Step forward and step backward are both possible in this case because only I-frames are used.

The slow-forward can also be based on a repetition of every frame, which results in a much smoother slow motion. The best form of slow-forward would in fact be a repetition of fields instead of frames because the temporal resolution is doubled and there are no interlace artifacts. This is however practically impossible for the intrinsically frame based MPEG2 streams and even more so if they are largely encrypted. The interlace artifacts can be significantly reduced for the I- and P-frames by using special empty frames to force the repetition. Such an interlace reduction technique is not available for the B-frames though. Whether the use of interlace kill for the I- and P-frames is still advantageous in this case or in fact leads to a more annoying picture for the viewer can only be verified by experiments.

Slow-reverse on the basis of individual frames is in fact very complicated for MPEG signals due to the temporal predictions. A complete GOP has to be buffered and reversed. There is no simple method that we know of to recode the frames in a GOP to the reverse order. So an almost complete decoding and encoding might be necessary with an inversion of the frame order between these two. This asks for the buffering of a complete decoded GOP as well as an MPEG decoder and encoder.

Still picture mode can be defined as an extension of the frame-based slow-forward mode. It is based on a repeated display of the current frame for the duration of the still picture mode whatever the type of this frame is. This is in fact a slow-forward with an infinite slow motion factor if this indicates the factor with which the normal play stream is slowed down. No interlace kill is possible if the picture is halted on a B-frame. In that sense this still picture mode is worse than the trick-play GOP based still picture mode. This can be corrected by only halting the picture at an I- or P-frame at the cost of a somewhat less accurate still picture position. Discontinuities in the temporal reference and the PTS can also be avoided in this case. Moreover, the bit rate is significantly reduced because the repetition of an I- or P-frame is forced by the insertion of empty frames instead of a repetition of the frame data itself as is necessary for the B-frames. So, technically speaking, the halting of a picture at an I- or P-frame is the best choice.

The still picture mode can also be extended with a step mode. The step command advances the stream in principle to the next frame. Larger step sizes are possible by stepping to the next P-frame or some next I-frame. A step backward on frame basis is not possible. The only option is to step backward to one of the previous I-frames.

Two types of still picture mode have been mentioned, namely trick-play GOP based and frame based. The first one is most logically connected to fast-forward/reverse whereas the second one is related to slow-forward. When switching from some mode to still picture, it is preferable to choose the related still picture mode to minimize the switching delay. The streams resulting from both methods look very alike because they are both based on the insertion of empty frames to force the repetition of an anchor frame. But on detailed stream construction level there are some differences.

In the following, some aspects related to a CPI ("characteristic point information") file will be described.

Finding I-frames in a stream usually requires parsing the stream, to find the frame headers. Locating the positions where the I-frame starts can be done while the recording is being made, or off-line after the recording is completed, or semi on-line, in fact being off-line but with a small delay with respect to the moment of recording. The I-frame end can be found by detecting the start of the next P-frame or B-frame. The meta-data derived this way can be stored in a separate but coupled file that may be denoted as characteristic point information file or CPI file. This file may contain pointers to the start and eventually end of each I-frame in the transport stream file. Each individual recording may have its own CPI file.

Figure 4:
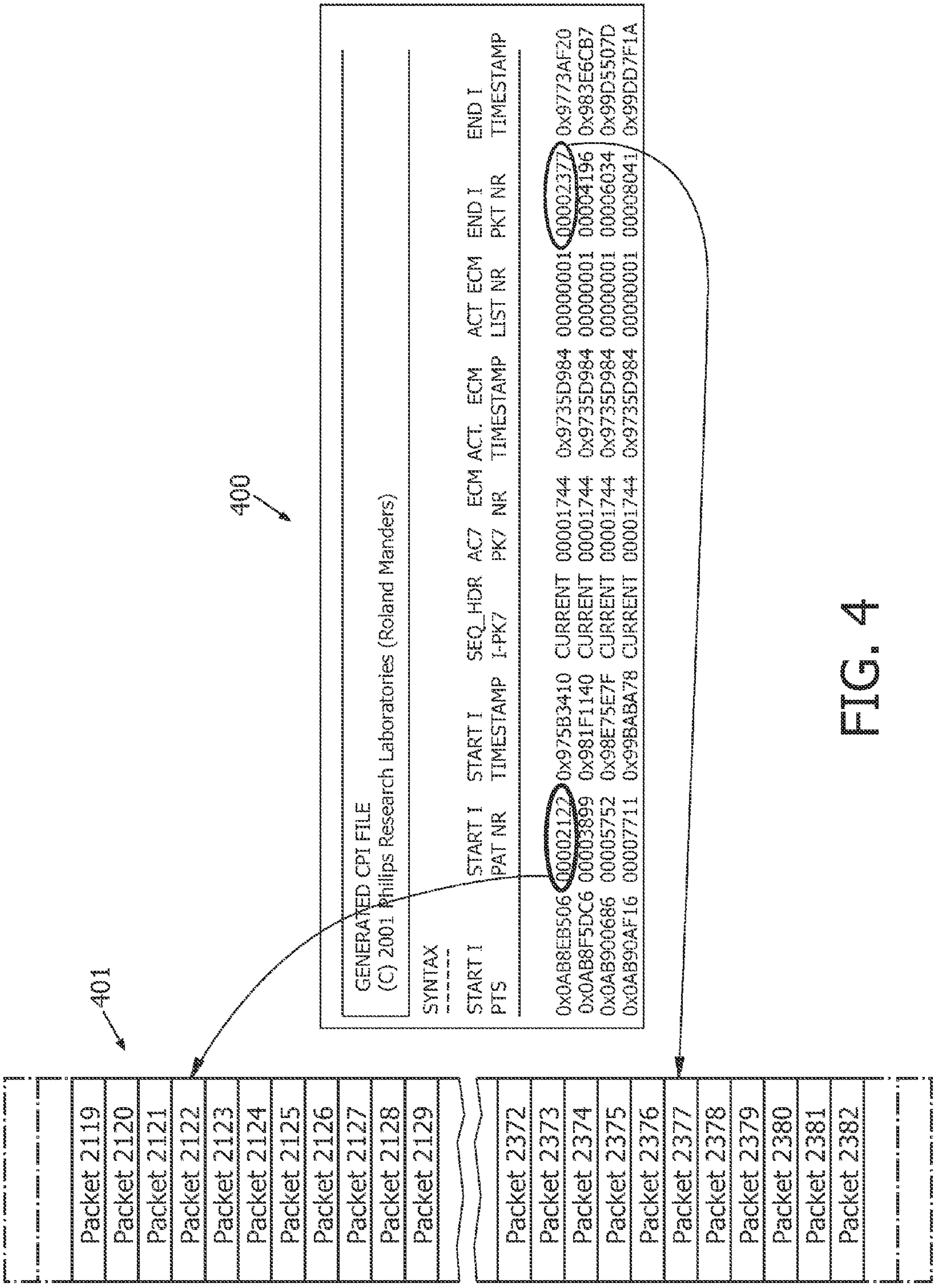
FIG. 4 illustrates a structure of a characteristic point information file and stored stream content.

The structure of a characteristic point information file 400 is visualized in FIG. 4.

Apart from the CPI file 400, stored information 401 is shown. The CPI file 400 may also contain some other data that are not discussed here.

With the data from the CPI file 400 it is possible to jump to the start of any I-frame 201 in the stream. If the CPI file 400 also contains the end of the I-frames 201, the amount of data to read from the transport stream file is exactly known to get a complete I-frame 201. If for some reason the I-frame end is not known, the entire GOP or at least a large part of the GOP data is to be read to be sure that the entire I-frame 201 is read. The end of the GOP is given by the start of the next I-frame 201. It is known from measurements that the amount of I-frame data can be 40% or more of the total GOP data.

It is known that reducing the trick-play picture refresh rate can be achieved by displaying each I-frame 201 several times. The bit rate will be reduced accordingly. This may be achieved by adding so-called empty P-frames 202 between the I-frames 201. Such an empty P-frame 202 is not really empty but may contain data instructing the decoder to repeat the previous frame. This has a limited bit cost, which can in many cases be neglected compared to an I-frame 201. From experiments it is known that trick-play GOP structures like IPP or IPPP may be acceptable for the trick-play picture quality and even advantageous at high trick-play speeds. The resulting trick-play bit rate is of the same order as the normal play bit rate. It is also mentioned that these structures may reduce the required sustained bandwidth from the storage device.

Here some aspects related to timing issues and stream construction will be described.

Figure 5:
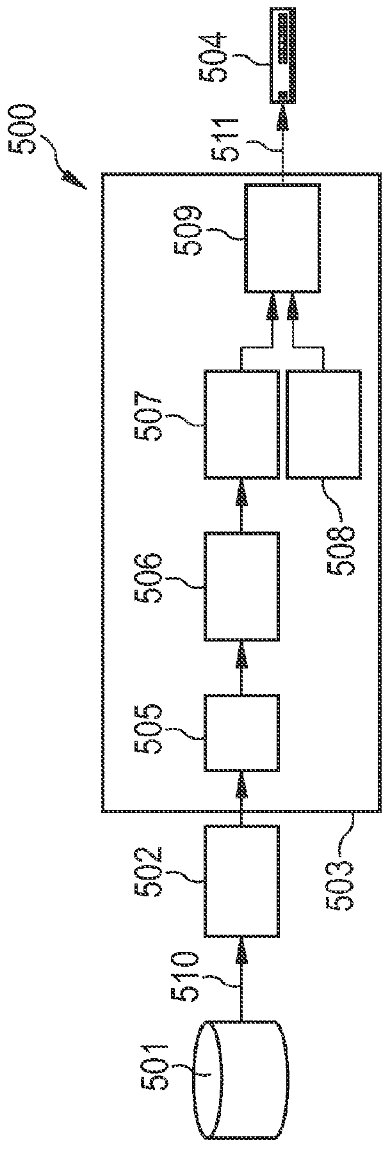
FIG. 5 illustrates a system for trick-play on a plaintext stream.

A trick-play system 500 is schematically depicted in FIG. 5.

The trick-play system 500 comprises a recording unit 501, an I-frame selection unit 502, a trick-play generation block 503 and an MPEG2 decoder 504. The trick-play generation block 503 includes a parsing unit 505, an adding unit 506, a packetizer unit 507, a table memory unit 508 and a multiplexer 509.

The recording unit 501 provides the I-frame selection unit 502 with plaintext MPEG2 data 510. The multiplexer 509 provides the MPEG2 decoder 504 with an MPEG2 DVB compliant transport stream 511.

The I-frame selector 502 reads specific I-frames 201 from the storage device 501. Which I-frames 201 are chosen depends on the trick-play speed as will be described below. The retrieved I-frames 201 are used to construct an MPEG-2/DVB compliant trick-play stream that is then sent to the MPEG-2 decoder 504 for decoding and rendering.

The position of the I-frame packets in the trick-play stream cannot be coupled to the relative timing of the original transport stream. In trick-play, the time axis may be compressed or expanded with the speed factor and additionally inversed for reverse trick-play. Therefore, the time stamps of the original time stamped transport stream may not be suitable for trick-play generation.

Moreover, the original PCR time base may be disturbing for trick-play. First of all it is not guaranteed that a PCR will be available within the selected I-frame 201. But even more important is that the frequency of the PCR time base would be changed. According to the MPEG2 specification, this frequency should be within 30 ppm from 27 MHz. The original PCR time base fulfils this requirement, but if used for trick-play it would be multiplied by the trick-play speed factor. For reverse trick-play this even leads to a time base running in the wrong direction. Therefore, the old PCR time base has to be removed and a new one added to the trick-play stream.

Finally, I-frames 201 normally contain two time stamps that tell the decoder 504 when to start decoding the frame (decoding time stamp, DTS) and when to start presenting, for instance displaying, it (presentation time stamp, PTS). Decoding and presentation may be started when DTS respectively PTS are equal to the PCR time base, which is reconstructed in the decoder 504 by means of the PCRs in the stream. The distance between, e.g., the PTS values of 2 I-frames 201 corresponds to their nominal distance in display time. In trick-play this time distance is compressed or expanded with the speed factor. Since a new PCR time base is used in trick-play, and because the distance for DTS and PTS is no longer correct, the original DTS and PTS of the I-frame 201 have to be replaced.

To solve above-mentioned complications, the I-frame 201 may first be parsed into an elementary stream in the parsing unit 505. Then the empty P-frames 202 are added on elementary stream level. The obtained trick-play, GOP is mapped into one PES packet and packetized to transport stream packets. Then corrected tables like PAT, PMT, etc. are added. At this stage, a new PCR time base together with DTS and PTS are included. The transport stream packets are pre-pended with a 4 bytes time stamp that is coupled to the PCR time base such that the trick-play stream can be handled by the same output circuitry as used for normal play.

In the following, some aspects related to trick-play speeds will be described. In this context, firstly, fixed trick-play speeds will be discussed.

As mentioned before, a trick-play GOP structure like IPP may be used in which the I-frame 201 is followed by two empty P-frames 202. It is assumed that the original GOP has a GOP size 203 of 12 frames and that all the original I-frames 201 are used for trick-play. This means that the I-frames 201 in the normal play stream have a distance of 12 frames and the same I-frames 201 in the trick-play stream a distance of 3 frames. This leads to a trick-play speed of 12/3=4×. If the original GOP size 203 in frames is denoted by G, the trick-play GOP size in frames by T and the trick-play speed factor by $N_b$, the trick-play speed in general is given by:

$$N_b = G/T \tag{1}$$

$N_b$ will also be denoted as the basic speed. Higher speeds can be realized by skipping I-frames 201 from the original stream. If every second I-frame 201 is taken, the trick-play speed is doubled, if every third I-frame 201 is taken, the trick-play speed is tripled and so on. In other words, the distance between the used I-frames 201 of the original stream is 2, 3 and so on. This distance may be always an integer number. If the distance between the I-frames 201 used for trick-play generation is denoted by D (D=1 meaning that every I-frame 201 is used), then the general trick-play speed factor N is given by:

$$N=D*G/T \quad (2)$$

This means that all integer multiples of the basic speed can be realized, leading to an acceptable set of speeds. It should be noticed that D is negative for reverse trick-play and that D=0 results in a still picture. Data can only be read in a forward direction. Therefore, in reverse trick-play, data is read forward and jumps are made backwards to retrieve the preceding I-frame 201 given by D. It should also be noticed that a larger trick-play GOP size T results in a lower basic speed. For instance, IPPP leads to a finer grained set of speeds than IPP.

Figure 6:
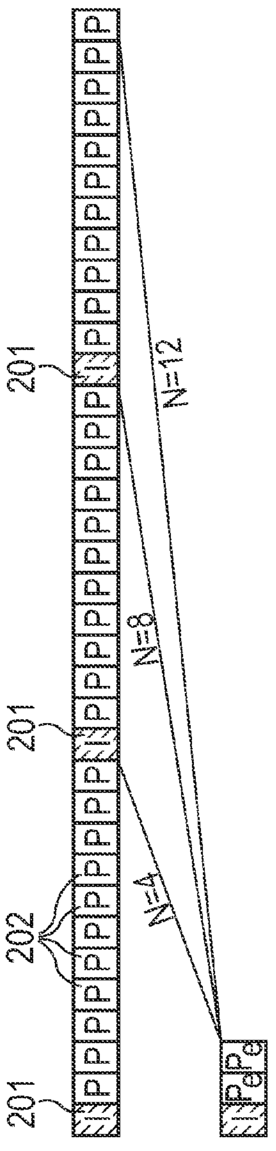
FIG. 6 illustrates time compression in trick-play.

Referring to FIG. 6, time compression in trick-play will be explained.

FIG. 6 shows the situation for T=3 (IPP) and G=12. For D=2, an original display time of 24 frames is compressed into a trick-play display time of 3 frames resulting in N=8. In the given example, the basic speed is an integer but this is not necessarily the case. For G=16 and T=3, the basic speed is 16/3=5⅓ which does not result in a set of integer trick-play speeds. Therefore, the IPPP structure (T=4) is better suited for a GOP size of 16 resulting in a basic speed of 4×. If a single trick-play structure is desired that fits to the most common GOP sizes of 12 and 16, IPPP may be chosen.

Secondly, arbitrary trick-play speeds will be discussed.

In some cases, the set of trick-play speeds resulting from the method described above is satisfying, in some cases not. In the case of G=16 and T=3 one probably still would prefer integer trick-play speed factors. Even in the case of G=12 and T=4 it might be preferred to have a speed not available in the set like for instance 7×. Now, the trick-play speed formula will be inverted and the distance D will be calculated which is given by:

$$D=N*T/G \quad (3)$$

Using the above example with G=12, T=4 and N=7 results in D=2⅓. Instead of skipping a fixed number of I-frames 201, an adaptive skipping algorithm might be used that chooses the next I-frame 201 based on the fact what I-frame 201 best matches the required speed. To choose the best matching I-frame 201, the next ideal point Ip with the distance D may be calculated and one of the I-frames 201 may be chosen closest to this ideal point to construct a trick-play GOP. In the following step, again the next ideal point may be calculated by increasing the last ideal point by D.

Figure 7:
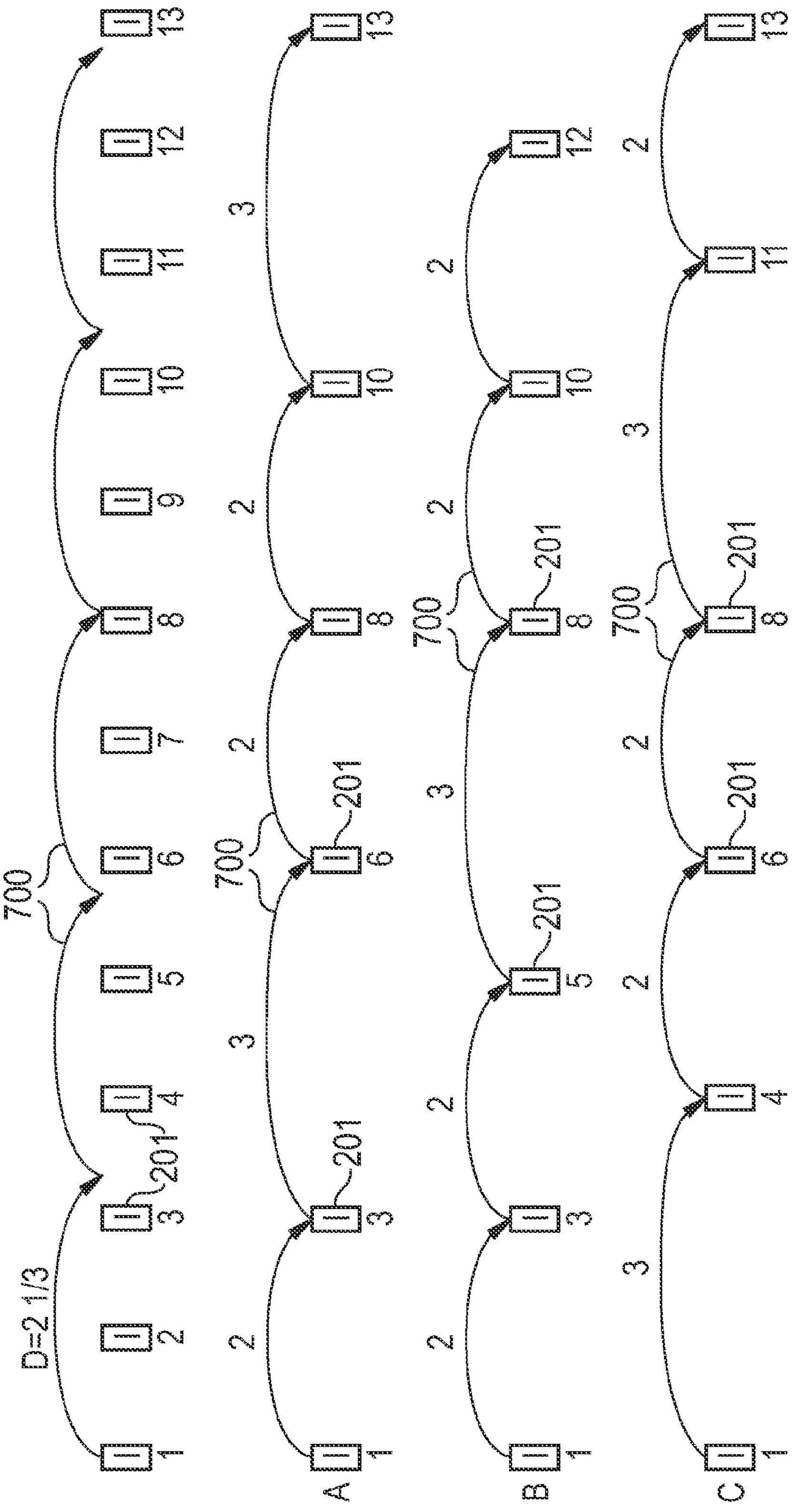
FIG. 7 illustrates trick-play with fractional distance.

As visualized in FIG. 7 illustrating trick-play with fractional distances, there are particularly three possibilities to choose the I-frame 201:

A. The I-frame closest to the ideal point; I=round(Ip)

B. The last I-frame before the ideal point; I=int(Ip)

C. The first I-frame after the ideal point; I=int(Ip)+1

As can clearly be seen, the actual distance is varying between int(D) and int(D)+1, the ratio between the occurrences of the two being dependent on the fraction of D, such that the average distance is equal to D. This means that the average trick-play speed is equal to N, but that the actually used frame has a small jitter with respect to the ideal frame. Several experiments have been performed with this, and although the trick-play speed may vary locally, this is not visually disturbing. Usually, it is not even noticeable especially at somewhat higher trick-play speeds. It is also clear from FIG. 7 that it makes no essential difference whether to choose method A, B or C.

With this method, trick-play speed N does not need to be an integer but can be any number above the basic speed $N_b$. Also speeds below this minimum can be chosen, but then the picture refresh rate may be lowered locally because the effective trick-play GOP size T is doubled or at still lower speeds even tripled or more. This is due to a repetition of the trick-play GOPs, as the algorithm will choose the same I-frame 201 more than once.

Figure 8:
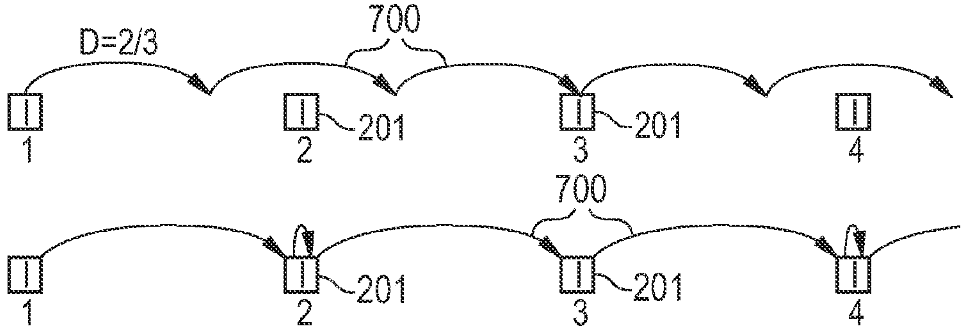
FIG. 8 illustrates low speed trick-play.

FIG. 8 shows an example for D=⅔ which is equivalent to N=⅔ $N_b$. Here, the round function is used to select the I-frames 201 and as can be seen frames 2 and 4 are selected twice.

Anyway, the described method will allow for a continuously variable trick-play speed. For reverse trick-play a negative value is chosen for N. For the example of FIG. 7 this simply means that the arrows 700 are pointing in the other direction. The method described will also include the sets of fixed trick-play speeds mentioned earlier and they will have the same quality, especially if the round function is used. Therefore, it might be appropriate that the flexible method described in this section should always be implemented whatever the choice of the speeds will be.

Now some aspects related to the refresh rate of the trick-play picture will be discussed.

The term "refresh rate" particularly denotes the frequency with which new pictures are displayed. Although not speed dependent, it will be briefly discussed here because it can influence the choice of T. If the refresh rate of the original picture is denoted by R (25 Hz or 30 Hz), the refresh rate of the trick-play picture ($R_t$) is given by:

$$R_t=R/T \quad (4)$$

With a trick-play GOP structure of IPP (T=3) or IPPP (T=4), the refresh rate $R_t$ is 8⅓ Hz respectively 6¼ Hz for Europe and 10 Hz respectively 7½ Hz for the USA. Although the judgment of trick-play picture quality is a somewhat subjective matter, there are clear hints from experiments that these refresh rates are acceptable for low speeds and even advantageous at higher speeds.

In the following, some aspects related to encrypted stream environments will be described.

Here some information about encrypted transport streams is presented as a basis for the description of trick-play on encrypted streams. It is focussed on the Conditional Access System used for broadcast.

Figure 9:
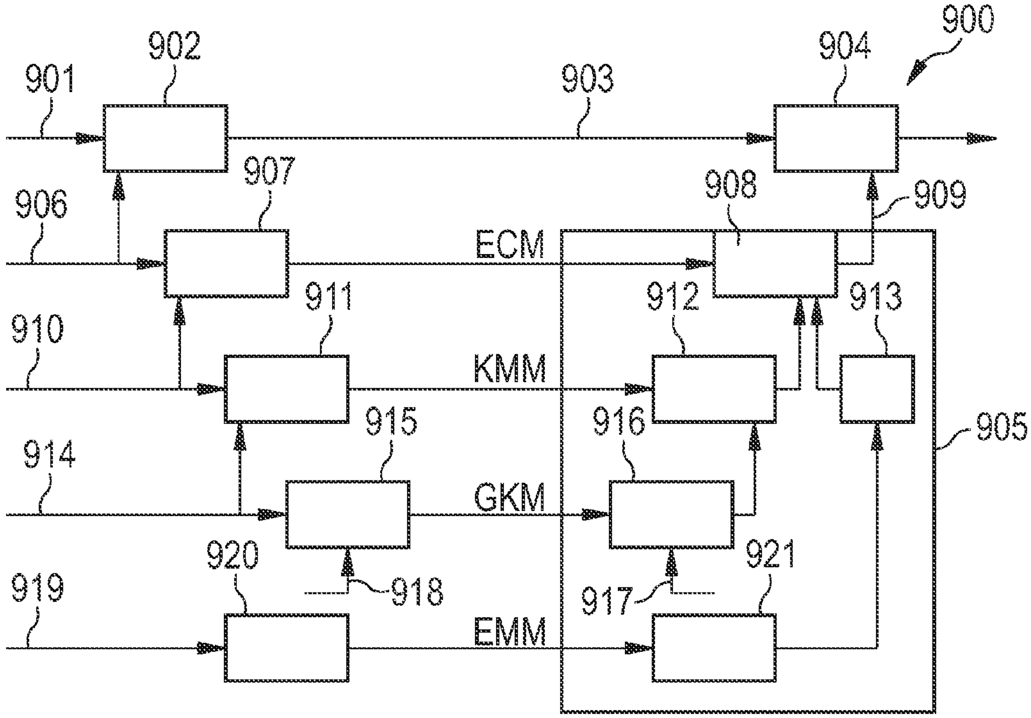
FIG. 9 illustrates a general conditional access system structure.

FIG. 9 illustrates a conditional access system 900 which will now be described.

In the conditional access system 900, content 901 may be provided to a content encryption unit 902. After having encrypted the content 901, the content encryption unit 902 supplies a content decryption unit 904 with encrypted content 903. In this specification it has been stated that ECM denotes Entitlement Control Messages. Furthermore, it is meant that KMM denotes Key Management Messages, GKM denotes Group Key Messages and EMM denotes Entitlement Management Messages. A Control Word 906 may be supplied to the content encryption unit 902 and to an ECM generation unit 907. The ECM generation unit 907 generates an ECM and provides the same to an ECM decoding unit 908 of a smart card 905. The ECM decoding unit 908 generates from the ECM a Control Word that is decryption information that is needed and provided to the content encryption unit 904 to decrypt the encrypted content 903.

Furthermore, an authorization key 910 is provided to the ECM generation unit 907 and to a KMM generation unit 911, wherein the latter generates a KMM and provides the same to a KMM decoding unit 912 of the smart card 905. The KMM decoding unit 912 provides an output signal to the ECM decoding unit 908.

Moreover, a group key 914 may be provided to the KMM generation unit 911 and to a GKM generation unit 915 which may further be provided with a user key 918. The GKM generation unit 915 generates a GKM signal GKM and provides the same to a GKM decoding unit 916 of the smart card 905, wherein the GKM decoding unit 916 gets as a further input a user key 917.

Beyond this, entitlements 919 may be provided to an EMM generation unit 920 that generates an EMM signal and provides the same to an EMM decoding unit 921. The EMM decoding unit 921 located in the smart card 905 is coupled with an entitlement list unit 913 which provides the ECM decoding unit 908 with corresponding control information.

In many cases, content providers and service providers want to control access to certain content items through a conditional access (CA) system.

To achieve this, the broadcasted content 901 is encrypted under the control of the CA system 900. In the receiver, content is decrypted before decoding and rendering if access is granted by the CA system 900.

The CA system 900 uses a layered hierarchy (see FIG. 9). The CA system 900 transfers the content decryption key (Control Word CW 906, 909) from server to client in the form of an encrypted message, called an ECM. ECMs are encrypted using an authorization key (AK) 910. For security reasons, the CA server 900 may renew the authorization key 910 by issuing a KMM. A KMM is in fact a special type of EMM, but for clarity the term KMM may be used. KMMs are also encrypted using a key that for instance can be a group key (GK) 914, which is renewed by sending a GKM that is again a special type of EMM. GKMs are then encrypted with the user key (UK) 917, 918, which is a fixed unique key embedded in the smart card 905 and known by the CA system 900 of the provider only. Authorization keys and group keys are stored in the smart card 905 of the receiver.

Entitlements 919 (for instance viewing rights) are sent to individual customers in the form of an EMM and stored locally in a secure device (smart card 905). Entitlements 919 are coupled to a specific program. An entitlements list 913 gives access to a group of programs depending on the type of subscription. ECMs are only processed into keys (Control Words) by the smart card 905 if an entitlement 919 is available for the specific program. Entitlement EMMs are subject to an identical layered structure as the KMMs (not depicted in FIG. 9).

In an MPEG2 system, encrypted content, ECMs and EMMs (including the KMM and GKM types) are all multiplexed into a single MPEG2 transport stream. The description above is a generalized view of the CA system 900. In digital video broadcasting, only the encryption algorithm, the odd/even Control Word structure, the global structure of ECMs and EMMs and their referencing are defined. The detailed structure of the CA system 900 and the way the payloads of ECMs and EMMs are encoded and used are provider specific. Also the smart card is provider specific. However, from experience it is known that many providers follow essentially the structure of the generalized view of FIG. 9.

In the following, DVB Encryption/Decryption topics will be discussed.

The applied encryption and decryption algorithm is defined by the DVB standardization organization. In principle two encryption possibilities are defined namely PES level encryption and TS level encryption. However, in real life mainly the TS level encryption method is used. Encryption and decryption of the transport stream packets is done packet based. This means that the encryption and decryption algorithm is restarted every time a new transport stream packet is received. Therefore, packets can be encrypted or decrypted individually. In the transport stream, encrypted and plaintext packets are mixed because some stream parts are encrypted (e.g. audio/video) and others are not (e.g. tables). Even within one stream part (e.g. video) encrypted and plaintext packets may be mixed.

Figure 10:
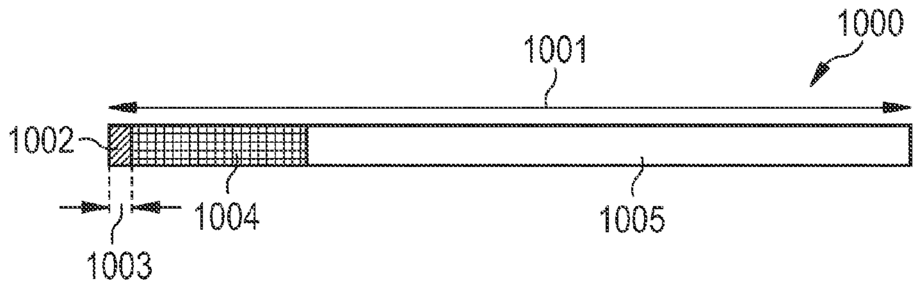
FIG. 10 illustrates a digital video broadcasting encrypted transport stream packet.

Referring to FIG. 10, a DVB encrypted transport stream packet 1000 will be described.

The stream packet 1000 has a length 1001 of 188 Bytes and comprises three portions. A packet header 1002 has a size 1003 of 4 Bytes. Subsequent to the packet header 1002, an adaptation field 1004 may be included in the stream packet 1000. After that, a DVB encrypted packet payload 1005 may be sent.

Figure 11:
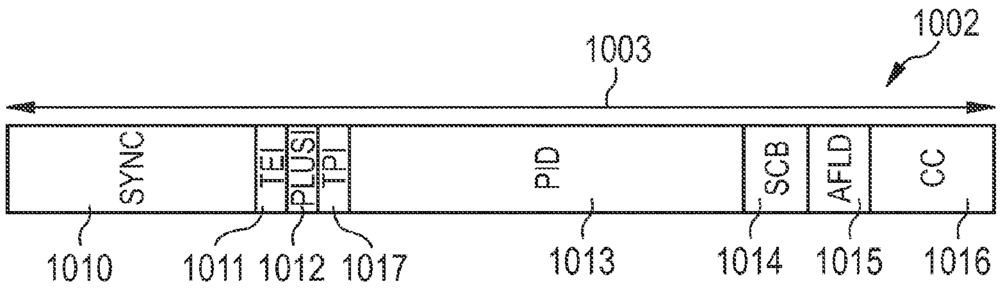
FIG. 11 illustrates a transport stream packet header of the digital video broadcasting encrypted transport stream packet of FIG. 10.

FIG. 11 illustrates a detailed structure of the transport stream packet header 1002 of FIG. 10.

The transport stream packet header 1002 comprises a synchronization unit (SYNC) 1010, a transport error indicator (TEI) 1011 which may indicate transport errors in a packet, a payload unit start indicator (PLUSI) 1012 which may particularly indicate a possible start of a PES packet in the subsequent payload 1005, a transport priority unit (TPI) 1017 indicating priority of the transport, a packet identifier (PID) 1013 used for determining the assignment of the packet, a transport scrambling control (SCB) 1014 is used to select the CW that is needed for decrypting the transport stream packet, an adaptation field control (AFLD) 1015, and a continuity counter (CC) 1016. Thus, FIG. 10 and FIG. 11 show the MPEG2 transport stream packet 1000 that has been encrypted and which comprises different parts:

Packet header 1002 is in plaintext. It serves to obtain important information such as a packet identifier (PID) number, presence of an adaptation field, scrambling control bits, etc.

Adaptation field 1004 is also in plaintext. It can contain important timing information such as the PCR.

DVB Encrypted Packet Payload 1005 contains the actual program content that may have been encrypted using the DVB algorithm.

In order to select the correct CW that is needed to decrypt the broadcasted program it is necessary to parse the transport stream packet header. A schematic overview of this header is given in FIG. 11. An important field for the decryption of the broadcasted program is the scrambling control bits (SCB) field 1014. This SCB field 1014 indicates which CW the decryptor must use to decrypt the broadcasted program. Moreover, it indicates whether the payload of the packet is encrypted or in plaintext. For every new transport stream packet, this SCB 1014 must be parsed since it changes over time and can change from packet to packet.

In the following, some aspects related to trick-play on fully encrypted streams will be described.

The first reason why this is an interesting topic is that trick-play on plaintext and fully encrypted streams are the two extremes of a range of possibilities. Another reason is that there exist applications in which it may be necessary to record fully encrypted streams. Thus, it would be useful to have a technique at hand to perform trick-play on a fully encrypted stream. A basic principle is to read a large enough block of data from the storage device, decrypt it, select an I-frame in the block and construct a trick-play stream with it.

Figure 12:
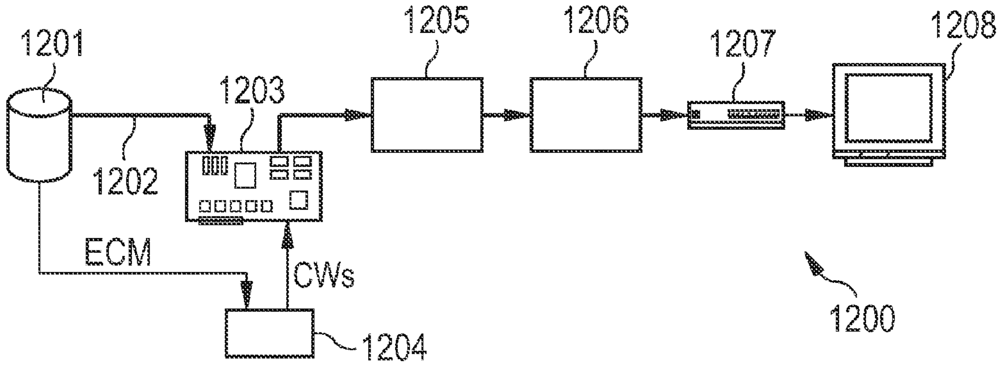
FIG. 12 illustrates a system allowing the performance of trick-play on a fully encrypted stream.

Such a system 1200 is depicted in FIG. 12

FIG. 12 shows the basic principle of trick-play on a fully encrypted stream. For this purpose, data stored on a hard disk

1201 are provided as a transport stream 1202 to a decryptor 1203. Further, the hard disk 1201 provides a smart card 1204 with an ECM, wherein the smart card 1204 generates Control Words from this ECM and sends the same to the decryptor 1203.

Using the Control Words, the decryptor 1203 decrypts the encrypted transport stream 1202 and sends the decrypted data to an I-frame detector and filter 1205. From there, the data are provided to an insert empty P frame unit 1206 which conveys the data to a set top box 1207. From there, data are provided to a television 1208.

Some aspects will be mentioned with respect to the question of what a recording contains.

Making a recording of a single channel, the recording must contain all the data required to playback the recording of the channel at a later stage. One can resort to just record everything on a certain transponder, but this way one would record far more than one needs to playback the program intended to record. This means that both bandwidth and storage space would be wasted. So instead of this, only the packets really needed should be recorded. For each program this means one must record all the MPEG2 mandatory packets like PAT (program association table), CAT (conditional access table), and obviously for each program the video and audio packets as well as the PMT (program map table) that describes which packets belong to a program. Furthermore, the CAT/PMT may describe CA packets (ECMs) needed for decryption of the stream. Unless the recording is made in plaintext after decryption, those ECM packets have to be recorded as well.

Figure 13:
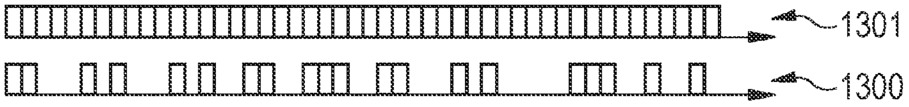
FIG. 13 illustrates a full transport stream and a partial transport stream.

If the recording made does not consist of all packets from the full multiplex, the recording becomes a so-called partial transport stream 1300 (see FIG. 13). Further, FIG. 13 illustrates a full transport stream 1301. The DVB standard requires that if a partial transport stream 1300 is played, all normal DVB mandatory tables like NIT (network information table), BAT (bouquet association table) etc. are removed. Instead of these tables, the partial stream should have SIT (selection information table) and DIT (discontinuity information table) tables inserted.

In the following, some aspects related to dealing with ECMs will be described.

Jumping to the next block during trick-play can mean jumping back in the stream. It will be explained that this may not be only the case for trick-play reverse but also for trick-play forward at moderate speeds. The situation for forward trick-play with forward jumps and for reverse trick-play with inherently backward jumps will be explained afterwards.

Specific problems may occur caused by the fact that data has to be decrypted. A conditional access system may be designed for transmission. In normal play, the transmitted stream may be reconstructed with original timings. But trick-play may have severe implications for the handling of cryptographic metadata due to changed timings. The data may be compressed or expanded in time due to trick-play, but the latency of the smart card may remain constant.

To create a trick-play stream, the mentioned data blocks may go through a decryptor. This decryptor needs the Control Words used in the encryption process to decrypt the data blocks. These Control Words may also be encrypted and stored in ECMs. In a normal set-top-box (STB), these ECMs may be part of the program tuned to. A conditional access module may extract the ECMs, send them to a smart card, and, if the card has rights or an authorization to decrypt these ECMs, may receive the decrypted Control Words from it. Control Words usually have a relatively short lifetime of, for instance, approximately 10 seconds. This lifetime may be indicated by the Scrambling Control Bit, SCB 1014, in the transport stream packet headers. If it changes, the next Control Word has to be used. This SCB change or toggle is indicated in FIG. 14 by a vertical line and with a reference numeral 1402.

Figure 14:
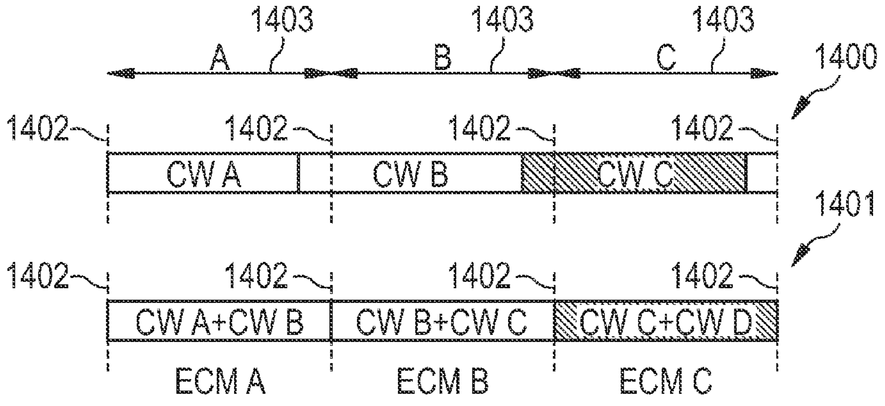
FIG. 14 illustrates Entitlement Control Messages for a stream type I and for a stream type II.

Referring to FIG. 14, particularly two different scenarios or stream types may be distinguished:

According to a stream type I shown in a lower row 1401 in FIG. 14, two Control Words (CWs) are provided per ECM.

According to a stream type II shown in an upper row 1400 in FIG. 14, only one Control Word (CW) is provided per ECM.

FIG. 14 illustrates the two data streams 1400, 1401 comprising subsequently arranged periods or segments A, B, C denoted with reference numeral 1403. In the scenario illustrated in the upper row 1400 of FIG. 14, essentially one Control Word per corresponding ECM is provided. In contrast to this, in the lower row 1401, each ECM comprises two Control Words, namely the Control Word relating to the current period or ECM, and additionally the Control Word of the subsequent period or ECM. Thus, there is some redundancy concerning the provision of the Control Words.

During the short lifespan, items of the decryption information may be transmitted several times, so that tuning to such a channel halfway through the lifespan of such a Control Word does not mean waiting for the next Control Word. The conditional access module may only send the first unique ECM it finds to the smart card to reduce or minimize the traffic to the card, as it may have a fairly slow processor.

This shows that there may be a limitation of trick-play on encrypted streams. There may be an implicit upper speed limit, coming from the limited speed of the processing capability of the smart card. In trick-play, the Control Word lifetime of 10 seconds may be compressed or expanded with the trick-play speed factor. Sending an ECM to a smart card and receiving the decrypted Control Words may take approximately half a second. The way Control Words are packed into an ECM may be provider-specific and particularly different for stream type I and stream type II, as depicted in FIG. 14.

CW A denotes the CW that was used to encrypt period A, CW B denotes the CW that was used to encrypt period B, and so on. Horizontally, the transmission time axis is plotted. ECM A may be defined as being the ECM that is present during the major part of period A. It can be seen that, in that case, ECM A holds the CW for the current period A and for stream type I additionally for the next period B. In general, an ECM may hold at least the CW for the current period and might hold the CW for the next period. Due to zapping, this may probably be true for all or many providers.

Before going on, more information will be provided about a decryptor and how it may handle the CWs. The decryptor may contain two registers, one for the "odd" and one for the "even" CW. "Odd" and "even" does not have to mean that the values of the CWs themselves are odd or even. The terms are particularly used to distinguish between two subsequent CWs in the stream. Which CW has to be used for the decryption of a packet is indicated by the SCB 1014 in the packet header. So the CWs used to encrypt the stream are alternating between odd and even. In FIG. 14 this means that, for instance, CW A and CW C are odd, whereas CW B and CW D are even. After the decryption by the smart card, CWs may be written to the corresponding registers in the decryptor overwriting previous values, as indicated in FIG. 15.

Figure 15:
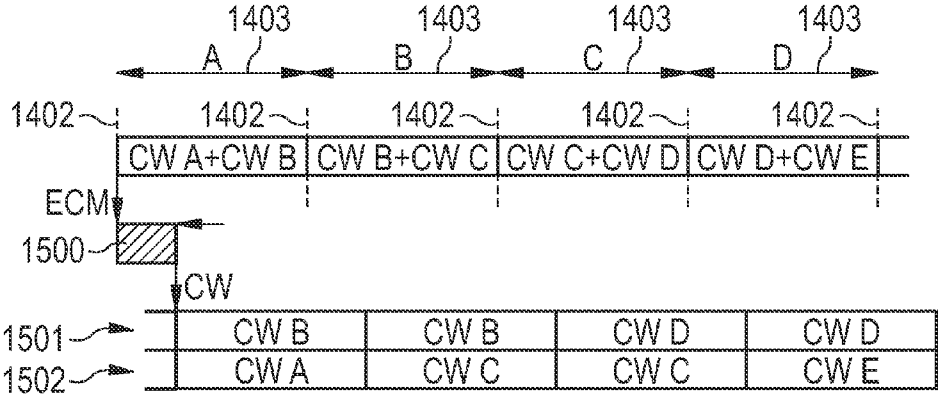
FIG. 15 illustrates writing Control Words to a decryptor.

FIG. 15 illustrates the two registers 1501, 1502 containing even CWs (register 1501) and containing odd CWs (register 1502). Further, smart card latency 1500, that is a time needed by the smart card to retrieve or decrypt a CW from an ECM, is illustrated in FIG. 15.

In the case of stream type I, each ECM holds two CWs and as a result both registers 1501, 1502 may be overwritten after the decryption of the ECM. One of the registers 1501, 1502 is active and the other is inactive. Which one is active depends on the SCB 1014. In the example, the SCB 1014 will indicate during period B that the even register 1501 is the active one. The active register may only be overwritten with a CW identical to the one it already holds because it is still needed for decryption of the remainder of that particular period. Therefore, only the inactive register may be overwritten with a new value.

Taking a closer look at period B in trick-play. Assuming that an ECM is sent to the smart card at the start of this period so at the moment the SCB toggle 1402 is crossed. The question is what ECM could then be sent to the smart card?

This ECM should hold CW C to ensure a timely decryption by the smart card for usage at the start of period C.

It may also hold CW B without disturbing the correct availability of CWs in the decryptor.

Looking again at FIG. 14, it can be seen that for stream type I this means sending ECM B and for stream type II ECM C at the start of period B. In general, the current ECM can be sent in case it holds two CWs, and one period in advance if it holds only one CW. Sending an ECM one period in advance may be contradictory though to the embedded ECMs, so the latter have to be removed from the stream in that case. For a more generalized approach it may be preferred that the original ECMs are always removed from the stream by the trick-play generation circuitry or software. However, this cannot always be true.

Figure 16:
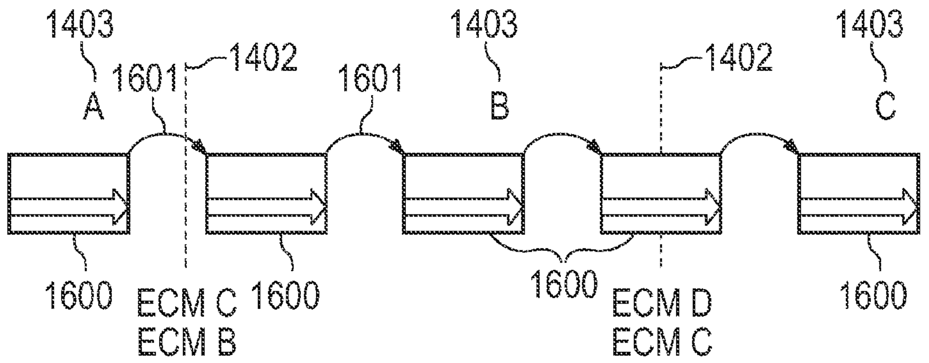
FIG. 16 illustrates Entitlement Control Message handling in a fast forward mode.

FIG. 16 shows ECM handling in a fast forward mode.

In a plurality of subsequent periods 1403 separated by SCB toggles 1402, a plurality of data blocks 1600 are reproduced, wherein a switching 1601 occurs between different data blocks.

For stream type I, an ECM B is sent at a border between periods A and B. For stream type II, an ECM C is sent at a border between period A and period B. Furthermore, according to stream type I, an ECM C is sent at a border between period B and period C. For a stream type II, an ECM D is sent at a border between period B and period C.

For ECMs to be available for trick-play at the correct moment, the ECMs may be stored in a separate file. In this file it may also be indicated to which period an ECM belongs (which part of the recorded stream). The packets in the MPEG stream file may be numbered. The number of the first packet of a period (SCB toggle 1402) may be stored alongside with the ECM for this same period 1403. The ECM file may be generated during recording of the stream.

The ECM file is a file that may be created during the recording. In the stream, ECM packets may be located which may contain the Control Words needed to decrypt the video data. Every ECM may be used for a certain period, for instance 10 seconds, and may be transmitted (repeated) several times during this period (for instance 100 times). The ECM file may contain every first new ECM of such a period. The ECM data may be written into this file, and may be accompanied by some metadata. First of all, a serial number (counting up from 1) may be given. As a second field, the ECM file may contain the position of the SCB toggle. This may denote the first packet that can use this ECM to correctly decrypt its content. Then the position in time of this SCB toggle may follow as the third field. These three fields may be followed by the ECM packet data itself.

Using the SCB toggles stored in the ECM file, it may be easy to detect if such toggle is crossed even if this would be during a jump. To send the correct ECM, it may be required to know whether the ECMs contain one or two CWs. In principle, this is not known because it is provider-specific and secret. However, this can easily be determined experimentally by sending ECMs at various moments and observing the results on the display. An alternative method that is particularly suitable for implementation in the storage device itself is as follows. Send one single ECM to the smart card at the moment of an SCB toggle, decrypt the stream and check for PES headers in the coming two periods. With one PES header per GOP, there are around twenty PES headers in each period. The position of a PES header may be easily detected because a PLUSI bit in the plaintext header of the packet may indicate its presence. If correct PES headers are only found during the first period (after the latency of the smartcard), the ECM contains one CW. If they are also found during the second period, it contains two CWs.

Figure 17:
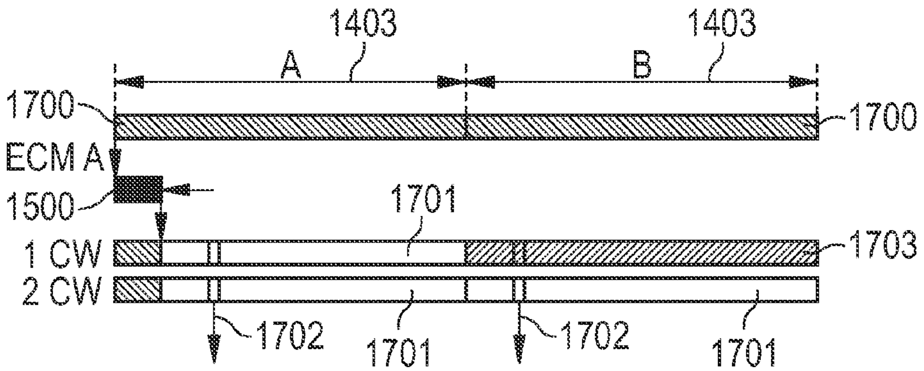
FIG. 17 illustrates detection of one or two Control Words.

Such a situation is depicted in FIG. 17.

FIG. 17 illustrates a situation for one CW detection and for two CW detection. As can be seen, different periods 1403 of encrypted content 1700 are provided. With a smartcard latency 1500, an ECM A may be decrypted to generate corresponding CWs. By decrypting the encrypted content 1700, decrypted content 1701 may be generated. Further shown in FIG. 17 are PES headers 1702, namely a PES header A in period A (left) and a PES header B in period B (right).

The area 1703 of period B for one CW in FIG. 17 indicates that the data is decrypted with the wrong key and therefore scrambled. This checking could be done while recording, in which case it will take for instance 20 to 30 seconds. It could also be done off-line and, because only two packets indicated by the PLUSIs (one in each period) would have to be checked, it could be very quick. In the unlikely event that adequate PES headers are not available, the picture headers could be used instead. In fact, any known information may be useable for detection. Anyway, a one/two CW indication may be stored in the ECM file.

In the following, some aspects related to dealing with slow-forward streams in particular will be described.

Next, trick-play GOP based slow-forward, still picture and step mode will be explained.

Slow-forward which may also be denoted as slow motion forward is a mode in which the display picture runs at a lower than normal speed. One form of slow-forward is already possible with the technique explained above referring to FIG. 7 and FIG. 8. Setting the fast-forward speed to a value between zero and one results in a slow-forward stream based on a repetition of fast-forward trick-play GOPs. For a plaintext stream, this is a proper solution, but for an encrypted stream it may lead to the erroneous decryption of a part of the I-frame in certain specific conditions. One option to solve this problem is not to repeat the fast-forward trick-play GOP but to extend the size of the trick-play GOP by the addition of empty P-frames. This technique in fact may also enable slow-reverse, because it is based on the trick-play GOPs used for fast-forward/reverse and therefore on the independently decodable I-frames.

Such an I-frame based slow-forward or slow-reverse may be inappropriate in special cases for the following reason. The distance between I-frames in normal play is around half a second and for slow-forward/reverse it is multiplied with the slow motion factor. So this type of slow-forward or slow-reverse is not exactly what is usually understood as the slow motion but in fact more like a slide show with a large temporal distance between the successive pictures.

In a still picture mode, the display picture may be halted. This can be achieved by adding empty P-frames to the I-frame for the duration of the still picture mode. This means that the picture resulting from the last I-frame is halted. When switching from normal play to still picture, this can also be the nearest I-frame according to the data in the CPI file. This technique is an extension of the fast-forward/reverse modes and results in nice still pictures especially if interlace kill is used. However, the positional accuracy is not always satisfactory when switching from normal play or slow-forward/reverse to still picture.

The still picture mode can be extended to implement a step mode. The step command advances the stream to some next or previous I-frame. The step size is at minimum one GOP but can also be set to a higher value equal to an integer number of GOPs. Step forward and step backward are both possible in this case because only I-frames are used.

For the construction of a slow-forward stream many considerations apply. For example, the construction of a slow-forward stream on elementary stream level can only be performed on fully plaintext data. As a consequence, the slow-forward stream will be fully plaintext, even if the normal play stream was originally encrypted. Such a situation may be unacceptable to a copyright holder. Furthermore, this is worse than in the case of fast-forward/reverse stream because all information, i.e. each and every frame, is present in plaintext in the slow-forward stream and not just a subset of the frames as is the case for true fast-forward/reverse streams. Therefore a plaintext normal play stream can easily be reconstructed from a plaintext slow-forward stream. So the slow-forward stream should be encrypted if the normal play stream is encrypted. Since a DVB encryptor is not permissible in a consumer device this can only be realized if the slow-forward stream is constructed on transport stream level using the encrypted data packets from the originally transmitted encrypted data stream.

In the following, referring to FIG. 18 to FIG. 63, systems will be described which are capable of processing a data stream in a system according to exemplary embodiments of the invention.

It is emphasized that the systems described in the following can be implemented in the frame of and in combination with any of the systems described referring to FIG. 1 to FIG. 17.

In the following, referring to FIG. 18 to FIG. 22, a method of processing a data stream according to an exemplary embodiment of the invention will be described.

FIG. 18 shows a fully encrypted MPEG2 data stream 1800, that is a data stream which is, for security reasons, entirely encoded during a transition from a data source to a playback device.

In order to provide for a slow-forward trick-play mode, that is a slow motion replay of the media content related to the encrypted data stream 1800, various manipulation steps may be carried out which will be described in the following in more detail.

As a first step, as can be seen in FIG. 19, the fully encrypted MPEG2 data stream 1800 is processed to form a partially decrypted and partially encrypted hybrid data stream 1900. The hybrid data stream 1900 may be obtained by selectively replacing encrypted frame boundary portions 1901 between adjacent encrypted frames 1902 of the encrypted data stream 1800 by corresponding decrypted frame boundary portions 1901 so as to form the partially decrypted and partially encrypted hybrid data stream 1900. In more detail, a part of the decrypted frame boundary portions 1901 are formed by picture start code portions 1903. A frame boundary portion 1901 may be the smallest portion which may be decrypted individually, and a part thereof is a (desired) picture start code portion 1903. This procedure may be carried out so that the packets 1901 containing the picture start codes 1903 (complete or partially) between subsequent frames of the video content become plaintext (that is the portions 1901 become decrypted), whereas the remaining (in many cases the main) portion of the data stream 1900 remains encrypted, namely the actual audio or video content 1902. However, the picture start codes 1903 are present in a decoded manner so as to make a trick-play proceeding possible, as will be described in the following.

As can be taken from FIG. 20, the hybrid data stream 1900 is further processed by splitting adjacent frames 1902 of the hybrid data stream 1900 at the frame boundary portions 1901/picture start code portions 1903. In other words, the consecutive and contiguous hybrid data stream 1900 is separated into different portions including a respective frame boundary portion 1901 and a corresponding frame 1902.

Furthermore, as can be taken from FIG. 21, some of the split frames 2000, namely the B-frames, are repeated a number of times, in the present embodiment three times, in accordance with a predetermined slow-forward rate. Anchor frames (I-frames and P-frames) are repeated using empty frames 2001. In the present case, the slow-forward rate is a factor of 3. This means that the video content of the encrypted data stream 1800 shall be reproduced in the slow-forward mode with a velocity of ⅓ as compared to a normal play operation mode.

It is mentioned that it is possible as well to repeat also anchor frames (instead of inserting empty frames) a plurality of times so as to achieve a trick-play stream.

By the multiple repetition of the individual partially encrypted and partially decrypted portions 2000, and by subsequently connecting the replicated split frames 2000 to one another, it may happen that adjacent portions resulting from the different groups of picture start code 1901 and frame 1902 do not fit to one another in a suitable manner. For this purpose, these portions are glued together by selectively modifying, if desired, connection portions 2200 so as to have a hybrid data stream 2201 suitable for trick-play, as shown in FIG. 22.

In the following, referring to FIG. 23, a processing device 2300 according to an exemplary embodiment of the invention will be described.

By means of the processing device 2300, it is possible to perform the various method steps as described referring to FIG. 18 to FIG. 22.

Figure 23:
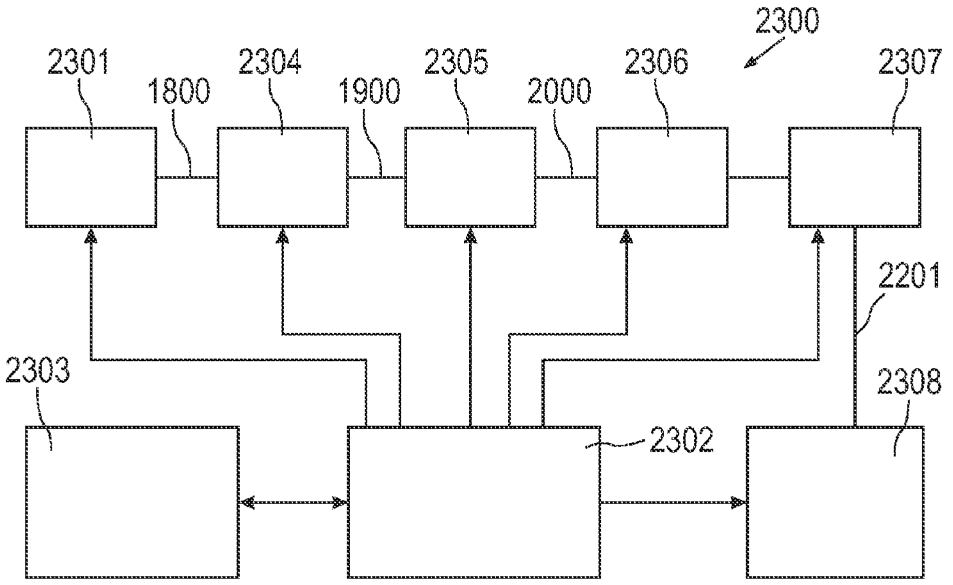
FIG. 23 illustrates a device for processing a data stream according to an exemplary embodiment of the invention.

FIG. 23 shows a harddisk 2301 in which encrypted audiovisual content to be reproduced is stored.

The processing device 2300 may be controlled by a control unit like a central processing unit (CPU) 2302 which, in turn, can be controlled by a human user by means of a user interface 2303. By means of the user interface 2303, a human user may control the operation of the processing device 2300, for instance may initiate a normal play mode or a trick-play operation mode like a slow-forward mode.

When a corresponding control signal is sent from the central processing unit 2302 to the harddisk 2301, audiovisual content in an encrypted form is sent from the harddisk 2301 to a decryptor 2304. The decryptor 2304 is adapted for selectively replacing encrypted frame boundary portions between adjacent frames 1902 of the encrypted data stream 1800 by the decrypted frame boundary portions 1901 to generate the partially decrypted data stream 1900.

The partially decrypted data stream 1900 is supplied to a splitting unit 2305 for splitting adjacent frames 1902 of the partially decrypted data stream 1900 at the frame boundary portions 1901. The sequence of separated hybrid stream portions 2000 are supplied to a replication unit 2306 for replicating the split frames 2000 a number of times (in the example FIG. 18 to FIG. 22 three times) in accordance with a predetermined replication rate which may be defined or determined by the microprocessor 2302 and/or by a user operating the user interface 2303.

The individual portions shown in FIG. 21 may then be supplied from the replication unit 2306 to a gluing unit or connection unit 2307 which connects the replicated split frames of FIG. 21 so as to generate a trick-play capable stream 2201.

This stream may be supplied to a reproduction unit 2308 like a monitor having loudspeakers, wherein reproduction of this content is possible under control of the microprocessor 2302 and/or under control of the user via the user interface 2303.

It is possible that a further decryption unit (not shown) is foreseen within the reproduction unit 2308 so as to decrypt the encrypted data stream 2201 for playback.

The decryption unit 2304 selectively replaces only the encrypted frame boundary portions between adjacent frames 1902 of the encrypted data stream 1800 by the decrypted packets containing the frame boundary portions 1901, and maintains all other frame portions 1902 encrypted. This ensures a high level of security, since only selected portions are decrypted which have to be in plaintext for generating a trick-play stream 2201.

As will be described below in more detail, the splitting unit 2305 is capable of converting a plaintext packet, which may include data of two consecutive frames into two packets, each containing only data from one of the frames and stuffing each of the packets. The gluing unit 2307 may connect the replicated split frames of FIG. 21 based on identifying positions 2200 where a frame boundary portion 1901 is spanning across two frames 1902 and based on correcting the identified positions.

Such a correction may include the determination of parts of the size of the frame boundary portions 1901. If the size is too large, it may be shortened, and if the size is small, it may be increased in length.

The frames 1902 may be intra-coded frames (I-frames), forward predictive frames (P-frames) or bi-directional predictive frames (B-frames). The processed content 1800 may be a data stream of video data and/or audio data. The reproduction unit 2308 is capable of reproducing the data stream connected to the connection unit 2307. The encrypted data stream 1800 may be an encrypted MPEG2 data stream.

In the following, referring to FIG. 24, a data processing device 2400 according to another exemplary embodiment of the invention will be described.

Figure 24:
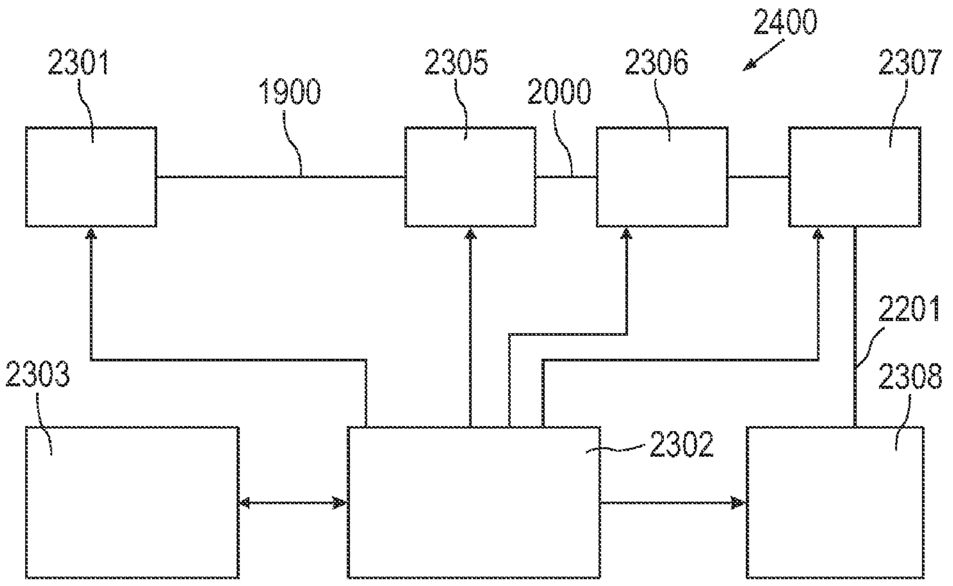
FIG. 24 illustrates another device for processing a data stream according to an exemplary embodiment of the invention.

The data processing device 2400 distinguishes from the data processing device 2300 in that no decryption unit 2304 is foreseen in the case of FIG. 24. In this case, the hybrid data stream 1900 is directly provided from the hard disk 2301. This means that either a decryption unit 2304 is integrated within the harddisk 2301, or the data is already stored on the harddisk 2301 in a manner as shown in FIG. 19.

In the following, further details concerning the slow-forward trick-play reproduction according to exemplary embodiments of the invention will be explained.

Next, splitting of the stream into separate frames will be explained.

To be able to construct a slow-forward stream on transport level it is advantageous that each individual frame is available as a series of transport stream packets. In case of one PES packet per frame this comes natural. A PES packet is contained in a series of transport stream packets because PES and transport stream packets are aligned. In the case of one PES packet per GOP this is only the case for the start of the I-frame. All other frame boundaries are mostly located somewhere inside a packet. This packet contains information from the two frames. So first this packet may be split up into two packets, the first one containing the data from the first frame and the second one of the data from the next frame. Each of the two packets resulting from the splitting may be stuffed with an Adaptation Field (AF).

Figure 25:
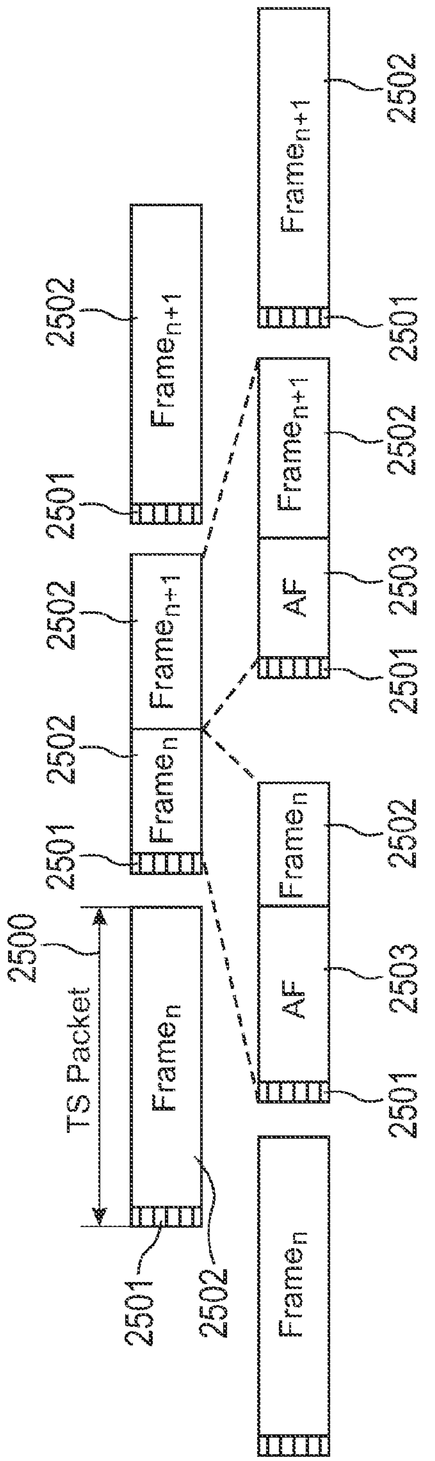
FIG. 25 illustrates splitting of the packet at a frame boundary.

This situation is indicated in FIG. 25.

FIG. 25 shows splitting of the packet at a frame boundary. Particularly, FIG. 25 illustrates a plurality of TS packets 2500 each comprising a header 2501 and a frame portion 2502. As can be taken from a central portion of the data stream shown in FIG. 25, a packet comprising a header 2501 and two subsequent frames 2502 is split up into two separate portions each having a separate header 2501 followed by an Adaptation Field 2503 and followed by the corresponding frame 2502.

Figure 26:
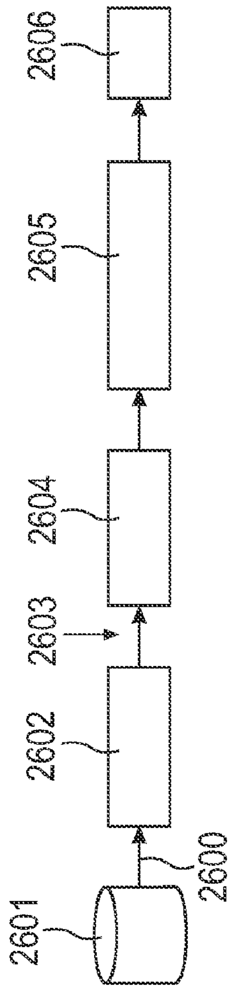
FIG. 26 illustrates slow-forward construction after decryption of normal play data.

The splitting of packets is not difficult for a plaintext stream. A first option is to fully decrypt the normal play data as depicted in FIG. 26. FIG. 26 shows a slow-forward construction after decryption of normal play data. Encrypted normal play data 2600 from a harddisk 2601 are supplied to a decryptor 2602 generating a plaintext stream 2603. The plaintext stream 2603 is supplied to a frame splitting unit 2604 for splitting the different frames in a manner as shown in FIG. 25. Then, this data is supplied to a slow-forward construction unit 2605 constructing a slow-forward stream, which is then supplied to a set top box 2606.

The decryption and slow-forward mode of a stored fully encrypted stream 2600 or a stored hybrid stream is not difficult because no stream data is skipped or duplicated in the stream by the decryptor 2602. The stored stream 2600 (fully encrypted or hybrid) is simply fed at a lower than normal rate through the decryptor 2602 which also means that there are no problems with embedded ECMs (Entitlement Control Messages). The plaintext stream 2603 coming from the decryptor unit 2602 can then be used to split the packets or in fact to perform any necessary stream manipulation in the frame splitting unit 2604. The resulting slow-forward stream is a plaintext stream in this case.

Figure 27:
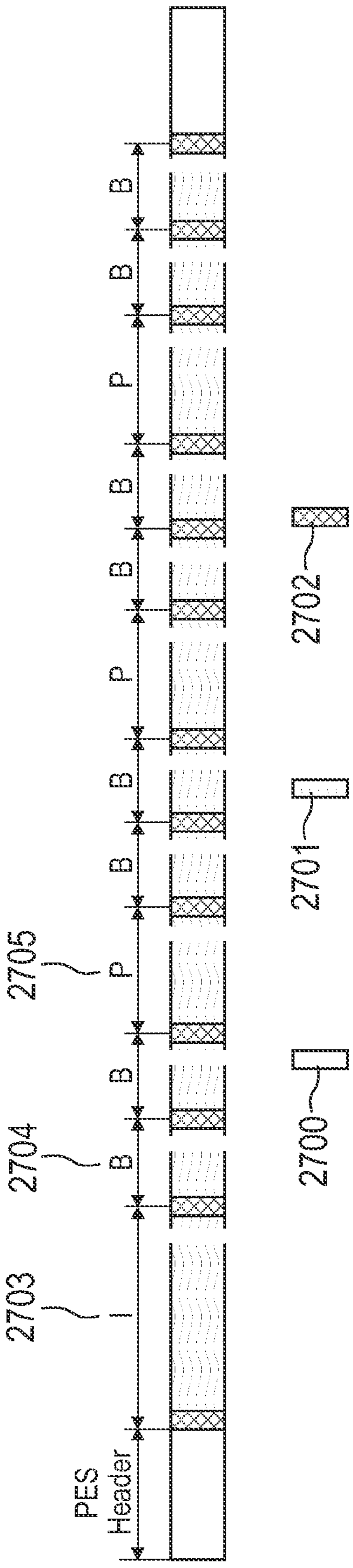
FIG. 27 illustrates a hybrid stream with plaintext packets on each frame boundary.

The construction of an encrypted slow-forward stream from an encrypted normal play stream is performed on transport level because the use of a DVB (Digital Video Broadcasting) encryptors in consumer devices may not be allowed in special cases. For this, a hybrid stream (see FIG. 27) with only a few plaintext packets 2700 and 2702 on all frame boundaries are needed. FIG. 27 furthermore shows encrypted packets 2701 which belong to the I-frames 2703, B-frames 2704 or P-frames 2705.

Below, it will be described how such a stream could be generated on the playback side of the storage device if the stored stream is fully encrypted. In this case, the decryptor unit 2602 in FIG. 26 may be a selective type that only decrypts the necessary packets. But preferably the stream is already stored as a hybrid stream as indicated in FIG. 28.

Figure 28:
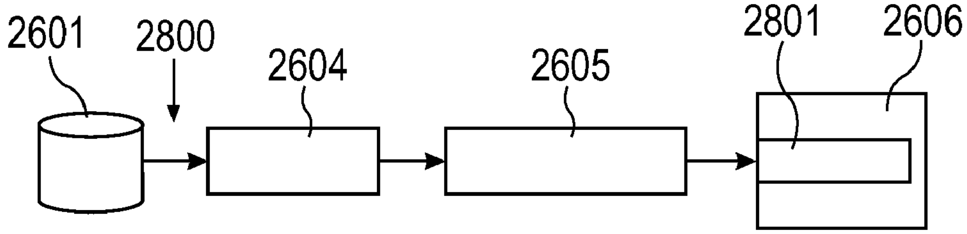
FIG. 28 illustrates slow-forward construction on a stored hybrid stream.

FIG. 28 illustrates slow-forward construction on a stored hybrid stream 2800. In the array shown in FIG. 28, no decryption unit 2602 is foreseen between the harddisk 2601 and the frame splitting unit 2604. However, a decryptor unit 2801 may then be foreseen in the set top box 2606.

The plaintext packets 2700, 2702 in the hybrid stream should now also allow for the splitting of packets containing data from the two frames. This may be guaranteed by a criteria which will be described below in more detail. However, some part of the sequence header code or picture start code can still be located in an encrypted packet. In this case, an ideal splitting is not easily possible. In fact the split may be made between the encrypted and plaintext packets. Solutions for these problems will be described below in more detail. In that situation only empty P-frames are concatenated to an I-frame and vice versa. For a frame based slow-forward, also other types of concatenation may be considered among which the concatenation of B-frames to B-frames. This may result in some kind of gluing algorithm at these frame boundaries as will be clarified referring to FIG. 29.

Figure 29:
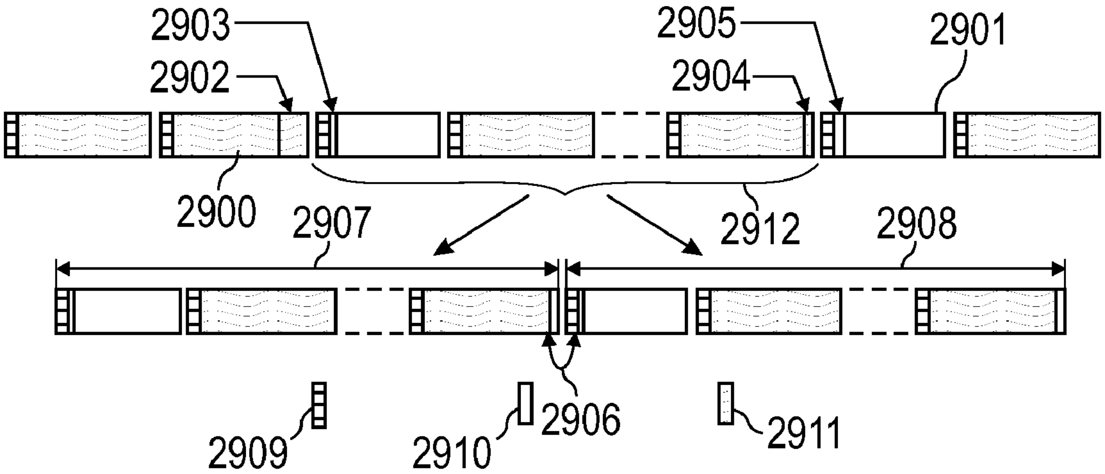
FIG. 29 illustrates an incomplete picture start code at the concatenation point.

FIG. 29 illustrates a data stream in which a previous frame 2900, a current frame 2912 and a next frame 2901 are shown. At the end of the previous frame 2900, three bytes of picture start code 2902 are provided. Furthermore, at the beginning of the current frame 2912 one byte of picture start code 2903 is foreseen. Coming now to the next frame 2901, the frame end of the packet before comprises one byte of picture start code 2904. At the beginning of the next frame 2901, three bytes of picture start code 2905 are provided. FIG. 29 shows that an incomplete picture start code may be present at the concatenation point. This may make a gluing necessary at a connection region 2906. Thus, gluing should be performed between the B-frame 2907 and a repetition of the B-frame 2908.

FIG. 29 particularly illustrates a packet header 2909, plaintext data 2910 and encrypted data 2911. In the example of FIG. 29, there is only one byte of the picture start code at the start and the end of the B-frame. As a result, two bytes are missing at the concatenation point. The gluing algorithm, which will be described below in more detail, may heal such a problem. For this gluing it should be known how the picture start code is split. This information may be obtained with a method that will be described below in more detail.

In the following, repetition of the frames will be described in more detail.

In a slow-forward mode, the decoder has somehow to be forced to repeat the display of a picture in accordance with the slow-forward factor. Empty P-frames may be used to force the repetition of a picture resulting from an I-frame. This technique can also be applied for pictures resulting from P-frames. However, this technique cannot be easily applied for B-frames because empty P-frames always point to an anchor frame being an I-frame or a P-frame. This is in fact the case for any type of empty frame. So the repetition of a picture resulting from a B-frame has to be realized in another way. A possible method is to repeat the B-frame data itself. Since the repeated B-frames point to the same anchor frames as the original B-frame the resulting pictures will be identical. The amount of data for a B-frame is usually much more than for an empty P-frame but in general it is still significantly less than for an I-frame. Anyway, the transmission is also multiplied with the slow-motion factor so there need not be an increasing bit rate at least on average.

The empty frames used to force the repetition of pictures resulting from an I-frame or a P-frame can be of the interlace kill type thus reducing interlace artefacts for these pictures. But such a reduction is not easily possible for pictures resulting from the B-frames because the repetition is not forced by an empty frame but the repetition of the B-frame data itself. So the B-frames will have the original interlace effects. If interlace kill would be used for the I-frames and P-frames this might look very awkward because pictures with and without interlace effects are sequentially present in the stream of displayed pictures. It is presently believed that it might be better to only use empty frames without interlace kill to construct the slow-forward stream.

The repetition of the I- and P-frames may be enforced by the insertion in the transmission stream for empty P-frames after the original I-frame or P-frame. Such a method may be used for the fast forward/reverse stream comprising I-frames followed by empty P-frames. However, this method may be not absolutely correct for a stream that also includes B-frames, as in the case for a slow-forward stream constructed from a stored transmission stream with B-streams. Due to the reordering from transmission data to display stream, the I-frames and P-frames will be repeated in the wrong position thus disturbing the normal display order of the frames. This is illustrated in FIG. 30 and FIG. 31.

Figure 30:
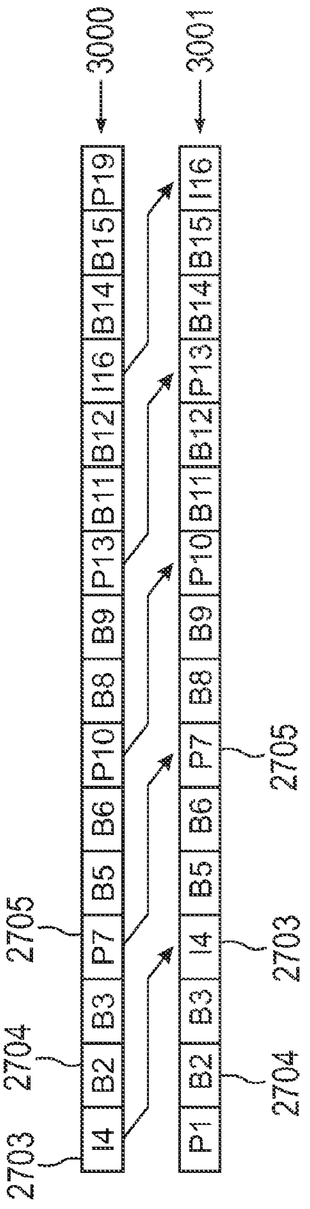
FIG. 30 illustrates the effect of reordering in normal play.
Figure 31:
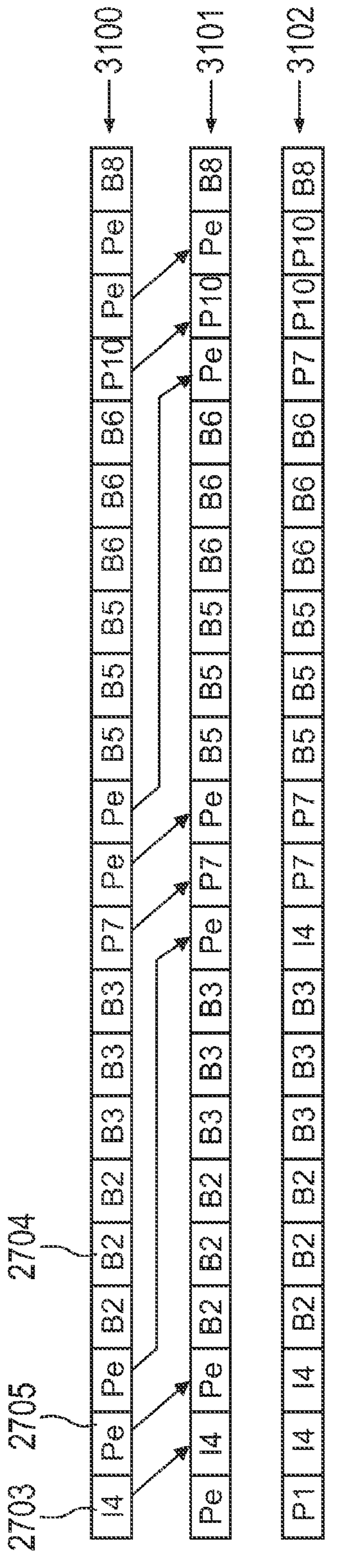
FIG. 31 illustrates the effect of reordering in slow-forward mode.

FIG. 30 illustrates the effect of reordering in normal play. FIG. 30 shows a transmission order 3000 and a display order 3001. Particularly, FIG. 30 depicts the effect of reordering in normal play. The top line shows a normal play transition stream 3000 with a GOP size of 12 frames comprising I-frames 2703, P-frames 2705 and B-frames 2704. The first four frames of the next transmission GOP are also shown for clarity. The bottom line of FIG. 30 shows the stream 3001 after reordering to the display order. The index indicates the display frame order. According to the MPEG2 standard ISO/IEC 13818-2: 1995(E) (see particular pages 24 and 25), the reordering may be performed as follows:

B-frames keep their original position;

Anchor frames (that is I-frames and P-frames) are shifted to the position of the next anchor frame.

FIG. 31 shows the effect of reordering in slow-forward mode. Particularly, FIG. 31 illustrates the transmission order 3100, an order after the reordering 3101 and an order of the displayed pictures 3102. Looking at the slow-forward stream constructed from the normal play stream in more detail, the top line of FIG. 31 shows the transmission order 3100 of the first part of the slow-motion stream for this case, assuming a slow-motion factor of three. Empty P-frames may be inserted after the I-frames and the P-frames, and the B-frames may be repeated. The middle line of FIG. 31 shows the effect of the reordering. The bottom line of FIG. 31 shows how the I-frames and the P-frames are repeated by the empty P-frames in this case. An empty P-frame may result in a display picture that is a copy of the picture resulting from the previous anchor frame, which itself could also be an empty P-frame. It is visible in FIG. 31 that the normal display order 3102 indicated by the index is disturbed because the display of frame 14 is split up into two parts. Only the last time frame 14 is displayed in the correct position. This also means that the B-frames may be decoded erroneously.

Figure 32:
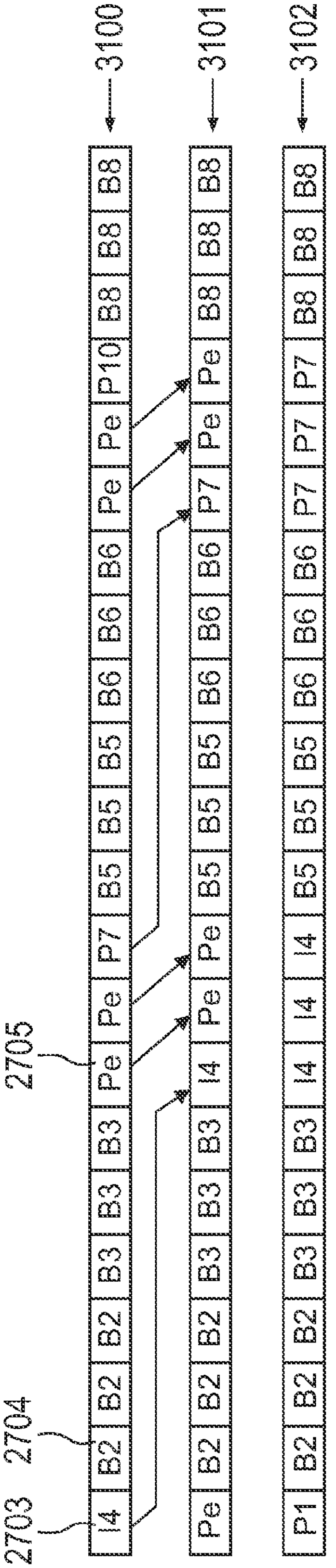
FIG. 32 illustrates the insertion of empty P-frames before the anchor frames.

In the following, several options will be described how to correct such deficiencies. One possibility is shown in FIG. 32. FIG. 32 shows the insertion of empty P-frames before the anchor frames. The three rows in FIG. 32 are similar to the three lines of FIG. 31. In FIG. 32, the empty P-frames are inserted before the anchor frames in the transmitted stream extracted from the storage device as is shown in the top line 3100. In the reordered stream 3101, the empty P-frames are now positioned after the anchor frames. This is where they should be for a correct repetition of the anchor frames as is clear from the display pictures 3102 of FIG. 32.

However, there are arguments why it may be appropriate to avoid empty P-frames. One is related to the propagation of errors within a GOP. P-frames depend on the previous anchor frame and B-frames depend on the surrounding anchor frames. A data error during the transfer to the set top box results in coding errors and therefore disturbances in the picture. If this error is an anchor frame it propagates until the end of the GOP because subsequent P-frames depend on this anchor frame. Also the B-frames are affected because they use the pictures from the disturbed surrounding anchor frames for the decoding. This may have the consequence that the picture disturbances gradually increase towards the end of the GOP. This may be especially important for slow-forward where the GOP size can be very large and therefore very long in time. On the other hand, a data error in a B-frame has only a very limited effect because no other frames depend on it. So the picture disturbances are restrained to this B-frame and its repetitions. One might argue that data errors should not occur on a digital interface but there may be a second advantage in preventing the use of empty P-frames. If these are of the interlace kill type they change at the decoded picture by nature resulting in decoding errors for the subsequent frames. So interlace kill may be not possible.

Referring to the construction of empty frames, several types of empty B-frames can be constructed. They may have the advantage that no additional error propagation is introduced and that interlace kill can be used.

Possible types of empty B-frames are the forward predictive empty B-frames (which may be denoted as Bf frames) and backward predictive empty B-frames (which may be denoted as Bb frames).

A B-frame is normally bi-directionally predictive, but uni-directional predictive B-frames can also exist. In the latter case they can be forward or backward predictive. Forward predictive means that an anchor frame is used to predict the following B-frames during encoding. So the picture resulting from a forward predictive B-frame is reconstructed during decoding from the previous anchor frame. This means that the Bf-frame forces the repetition of the previous anchor frame. Therefore, it has the same effect as an empty P- or Pe-frame. The Bb-frame has the opposite effect. It forces the display of the anchor frame following it. For both types of empty B-frames, an interlace kill version is possible as well.

In the following, it will be described how to use such empty B-frames for the construction of a slow-forward stream.

Figure 33:
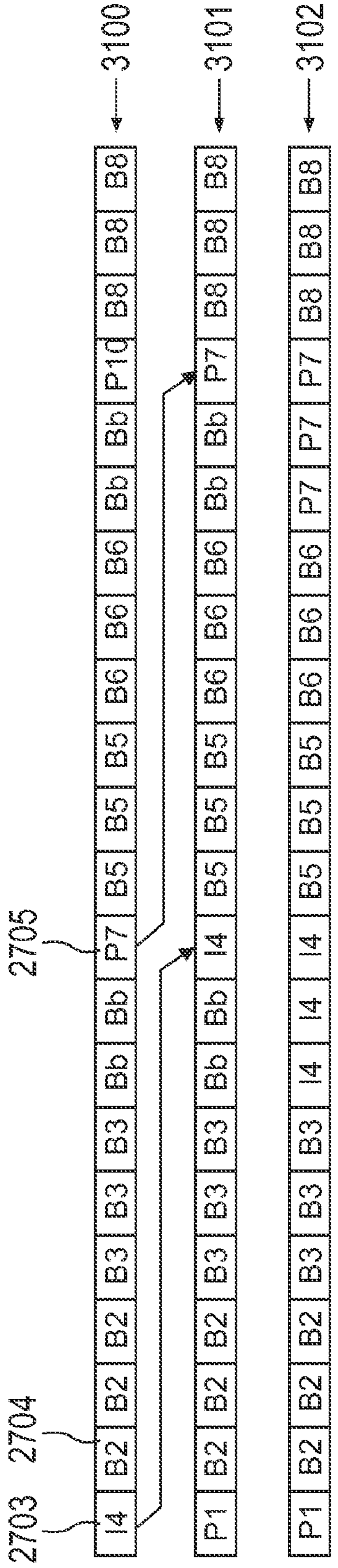
FIG. 33 illustrates the use of backward predictive empty B-frames.

A first possibility on the basis of Bb-frames is depicted in FIG. 33.

The Bb-frames are inserted before the anchor frames and keep their position during the reordering. The anchor frames are shifted to the position of the next anchor frame. The Bb frame forces the display of the anchor frame following it in the reordered stream.

Figure 34:
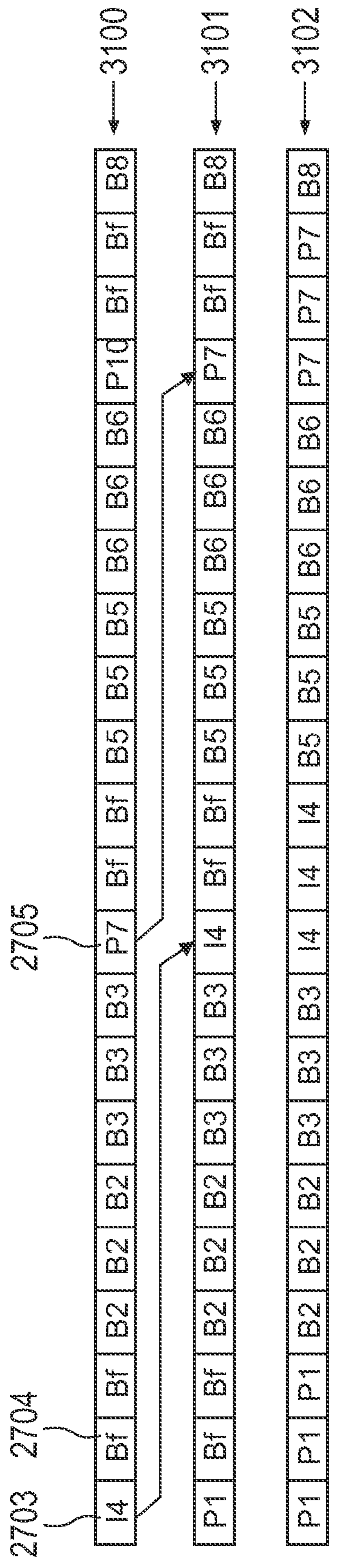
FIG. 34 illustrates the use of forward predictive empty B-frames.

Another option is the use of Bf-frames as shown in FIG. 34.

The Bf-frames are inserted after the anchor frames in the transmission stream. The repeated display of the anchor frames in the reordered stream is forced by the Bf-frames that follow them.

The use of Bf-frames is similar to the use of empty P-frames for the construction of fast-forward and fast-reverse streams. In fact the use of Bf-frames is also possible in that case thus commonising the trick-play generation even further. But when Bf-frames are used for fast-forward and fast-reverse, the effect of reordering should be considered. This means that some parameters in the fast-forward/reverse stream like PTS/DTS and temporal reference have to be chosen appropriately.

Next, gluing of the individual frames will be described.

Particularly, the gluing of frames in the case of incomplete picture start codes will be discussed. In order to determine the required gluing activities at the concatenation point in the slow-forward stream, it should first be clear where the original stream is explicitly split into individual frames. In the following, the practical situation of one PES packet per GOP or per frame will be considered.

Figure 35:
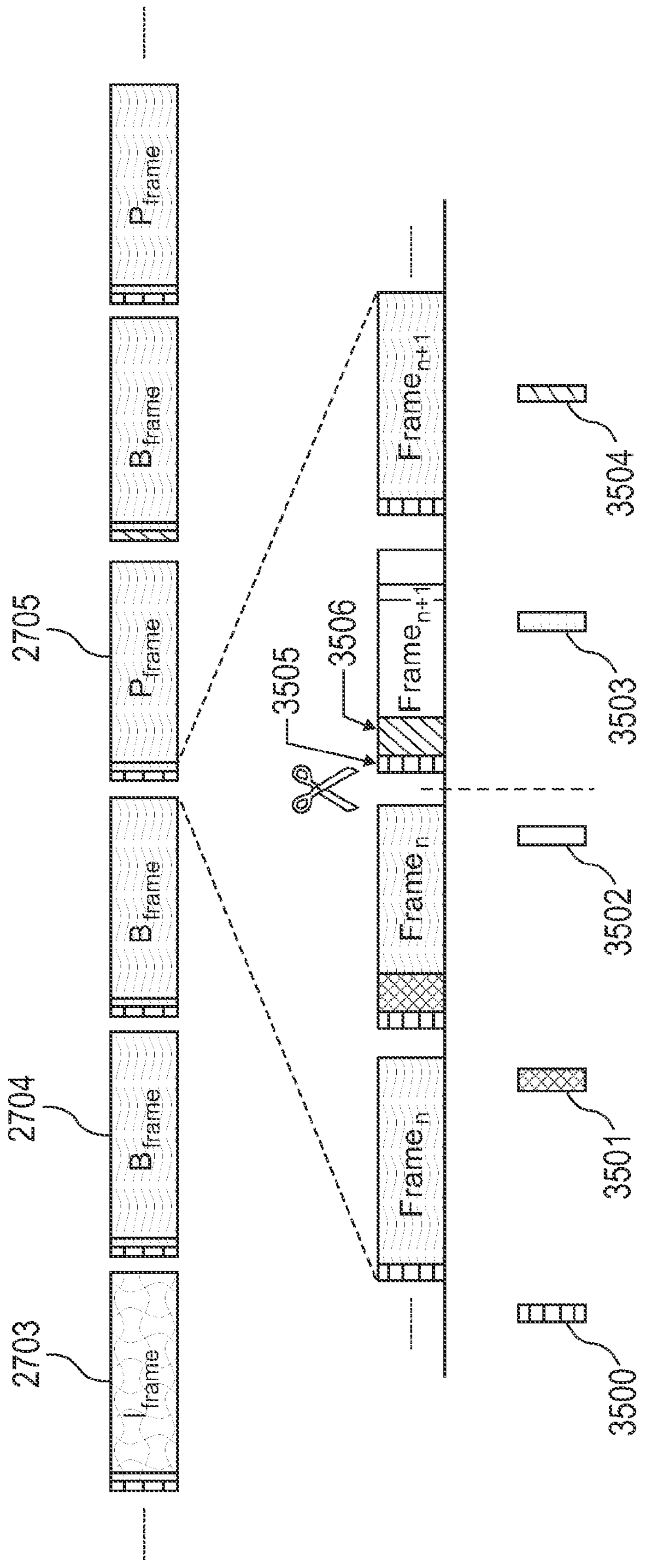
FIG. 35 illustrates the splitting of the stream for one PES packet per frame.
Figure 36:
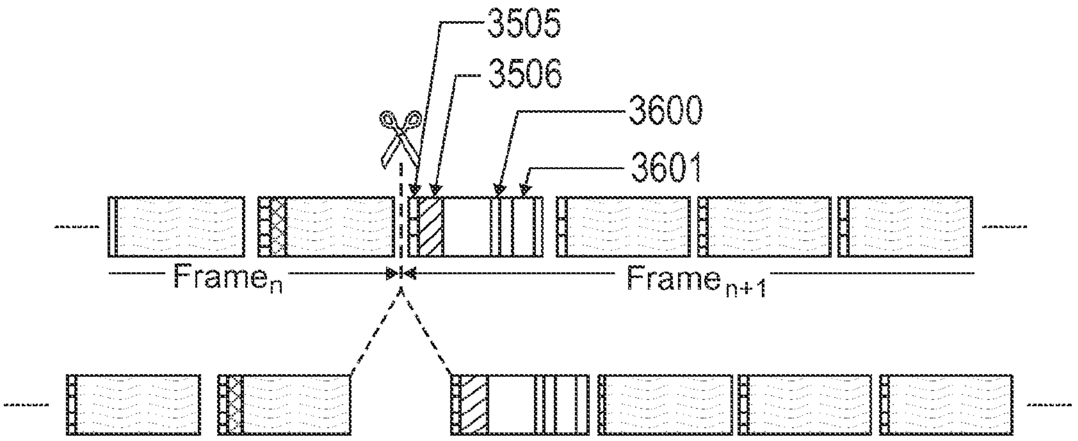
FIG. 36 illustrates the splitting of the stream at the start of a PES header.

In the case of one PES packet per frame, the original stream may be split between the packet with the PLUSI and the preceding packet, as indicated in FIG. 35.

In FIG. 35, the splitting of the stream for one PES packet per frame is illustrated. The data streams shown in FIG. 35 include plaintext packet headers 3500, Adaptation Fields 3501, plaintext data 3502, encrypted data 3503 and plaintext PES header 3504. Furthermore, a PLUSI present is denoted with reference numeral 3505, and a PES header is denoted with reference numeral 3506.

The individual frames comprise a number of complete original packets. So no packet splitting is necessary. This frame splitting could also be performed in a completely encrypted stream, but access to some plaintext data is still necessary for the construction of the slow-forward stream. The splitting at the start of a packet with a PLUSI also means that there are no picture start codes that are spread over two packets. Each individual frame contains its own correct and complete picture start code. Therefore, no gluing activity is necessary in this case.

However, in the case of one PES packet per GOP, the situation is different. The split between frames is made at the picture start code of a new frame, unless a PES header precedes it.

Figure 37:
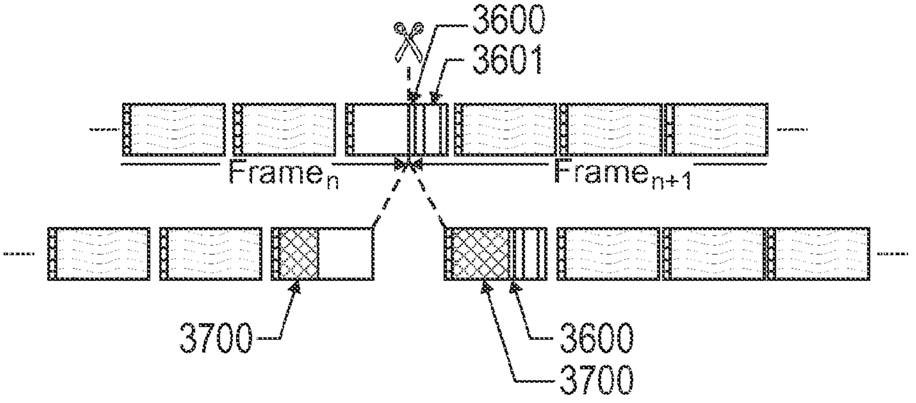
FIG. 37 illustrates the splitting of the stream at the start of a Picture Start Code.
Figure 38:
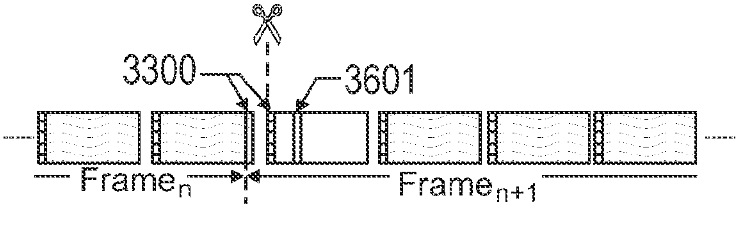
FIG. 38 illustrates the splitting of the stream within a Picture Start Code.

The following algorithm may be used to determine the splitting point:

1. The original stream is simultaneously researched for a packet with a PLUSI bit set, a picture start code and a picture coding extension;

2. If the packet with the PLUSI bit set is encountered first, the split is made at the start of this packet (see FIG. 36, including a picture start code 3600 and a picture code extension 3601). Subsequently, the stream is searched for the picture coding extension. After this is found, the search is continued as described in point 1.;

3. If the picture start code is encountered first, the split is made at the start of the picture start code. In many cases this means that the packet containing the picture start code has to be split in two packets of which the first is assigned to the previous frame and the second to the subsequent frame (see FIG. 37 illustrating splitting of a stream at the start of a picture start code 3600, wherein places of insertion of an Adaptation Field are denoted with reference numeral 3700). Both packets are stuffed with an Adaptation Field 3700. The payload of the second packet then starts with the picture start code 3600. The recording time stamp of the original packet is copied to each of the two packets resulting from the split. Whether the two packets from the split or the original packet will be used at a concatenation point of two frames depends on the specific situation as will be explained below. Subsequently, the stream is searched for the picture coding extension 3601. After having found this, the search is continued as described in point 1.;

4. If the picture coding extension is encountered first, the picture start code must be undetectable because it is partially encrypted. This means that the current plaintext area starts with some bytes of the picture start code. In this case the split is made at the start of the first plaintext packet of the current plaintext area (see FIG. 38 showing the splitting of the stream within a picture start code 3600, and illustrating bytes of picture start code 3800 as well as picture code extension 3601). The search which is described in point 1. is continued after having found picture coding extension 3601.

The described algorithm would also result in the correct splitting points for a stream with one PES packet per frame. Moreover, the algorithm is designed for application to plaintext streams as well as the hybrid streams mentioned above.

Gluing is only necessary in the case of incomplete picture start codes that can only result from point 4. of the given algorithm. So only point 4. leads to a non-ideal splitting point. A plaintext stream contains only ideal splitting points because the picture start code is always found. So no gluing is necessary in this case. But hybrid streams will contain non-ideal splitting points. A method described below may be used to determine how many bytes of the picture start code are on either side of the non-ideal splitting points. The effects of a non-ideal splitting point will be explained in detail hereinafter.

Next, the situation will be considered that empty P-frames of any type are inserted at such a non-ideal splitting point. How to handle the first empty frame will be explained below. A number of bytes equal to the part of the picture start code after the splitting point is removed from the picture start code of the first empty frame. The intermediate empty frames are unchanged. The last empty frame has to be corrected for the missing part of the picture start code of the subsequent frame. So this missing part may be added to the end of the last empty frame. No changes are necessary to empty frames that are inserted at ideal splitting points.

In the following, the repetition of the B-frames will be considered. In case the B-frame has ideal splitting points on both sides, no gluing action is necessary for the repetition. But if a non-ideal splitting point is present on either side of the frame, gluing actions may be necessary or advantageous. The original frame and its repetition form a series of identical B-frames. No gluing action is necessary at the start or end of the series because here the frame is either connected to the same frame as in the normal play stream or to an empty frame. In the first case there is no discontinuity because normal order of the data is restored at this point. The solution for the second case has been given above. So only the intermediate concatenation points have to be considered where the end of a B-frame is connected to the start of the same B-frame. The example described here refers to the example given above referring to FIG. 29 and is repeated in more detail in FIG. 39 for clarity.

Figure 39:
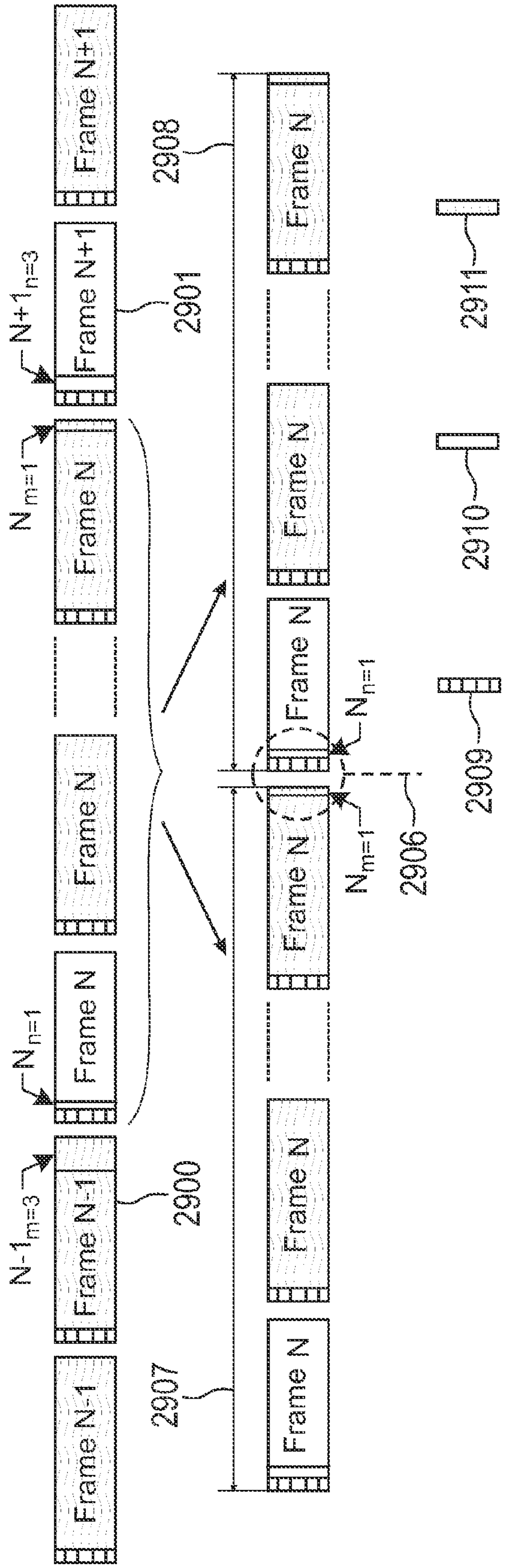
FIG. 39 illustrates an incomplete picture start code at the concatenation point.

FIG. 39 illustrates incomplete picture start code at the concatenation point.

For a correct gluing it is necessary to know the number of bytes of the picture start code (within MPEG2 the start code may be 4 bytes in length) at the end and the start of the B-frame. Denoting the number of bytes at the end by n and at the start by m, for an ideal splitting point n=0 and m=4. In the case of a non-ideal splitting point, the number n for one frame and the number m for the subsequent frame may be determined with a method which will be illustrated below.

It is evident that n can never be equal to 4 because then the split would have been made at the start of the picture start code resulting in n=0. On the other hand, m can never be 0 because in that case the picture start code would be completely in a previous frame and the split would have been made in the ideal position thus leading to m=4. So $0 \leqq n \leqq 3$ and $1 \leqq m \leqq 4$ is a usual situation.

In order to get the numbers n and m for one and the same frame N, these numbers have to be extracted from the information of the two splitting points surrounding the frame. So n and m now represent the number of bytes of the picture start code at the end and start of a B-frame that has to be repeated. As a consequence, they also represent a number of bytes of the picture start code before and after an intermediate concatenation point.

Next, it will be assumed that n+m=4. This is the case when both splitting points surrounding the B-frame are ideal. But it is already known that no gluing action is needed in that case. However, this can be also the case when both splitting points are non-ideal. This is the situation depicted in FIG. 40.

Figure 40:
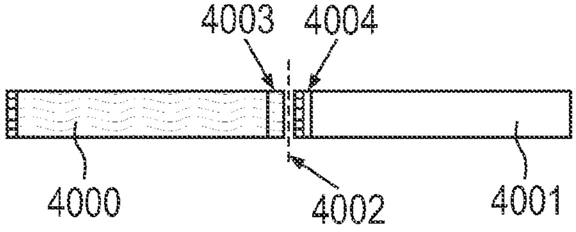
FIG. 40 illustrates an example of n+m=4.

FIG. 40 therefore illustrates the example of n+m=4.

The last packet of frame N is denoted with reference numeral 4000, and FIG. 40 further shows the first packet of frame N denoted with reference numeral 4001. No gluing action is necessary at a border 4002. The bytes of the picture start code (n=3) is denoted with reference numeral 4003, and the byte of picture start code (m=1) is denoted with reference numeral 4004.

The fact that n+m=4 means that the correct amount of picture start code bytes are present at the concatenation point and that no gluing action is necessary.

Figure 41:
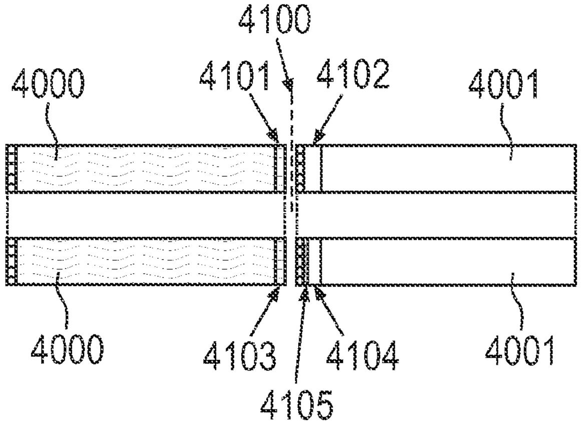
FIG. 41 illustrates an example of n+m>4.

However, FIG. 41 shows the situation with n+m>4.

This means that there are 1, 2 or 3 bytes too much at the concatenation point. In this case a number of bytes equal to n+m−4 is removed from the start of the second frame. This is accomplished by replacing these plaintext bytes by an Adaptation Field (AF) containing stuffing bytes. If an Adaptation Field is already present, its length has to be increased with m+n−4 and the data to be discarded is replaced by stuffing bytes that, according to the standard, have a hexadecimal value FF.

In the special cases of n+m−4 and n<3 it is also possible to do no gluing. Effectively, one gets elementary stream stuffing.

A point at which gluing action is necessary is denoted with reference numeral 4100. In the example, the bytes of picture start code (n=2) is denoted with reference numeral 4101. Bytes of picture start codes (m=3) are denoted with reference numeral 4102. Furthermore, bytes of picture start code (n=2) are denoted with reference numeral 4103 and bytes of picture start code (m=2) are denoted with reference numeral 4104. A position of replaced bytes using Adaptation Fields (n+m−4) is denoted with reference numeral 4105.

Figure 42:
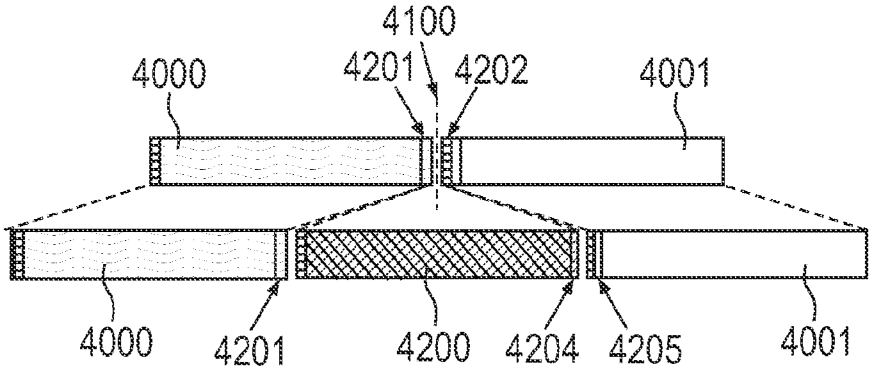
FIG. 42 illustrates an example of n+m<4.

Referring to FIG. 42, it is assumed that n+m<4.

This means that 1, 2 or 3 bytes are missing from the picture start code at the concatenation point. In this case it should be known which byte or bytes are missing. Because n and m are both known, the missing bytes can be uniquely identified. The missing bytes are now placed in a new packet that is further stuffed with Adaptation Field. This gluing packet is then placed between the two frames. This gluing packet is denoted with reference numeral 4200. Reference numeral 4201 denote bytes of picture start code (n=2), reference numeral 4202 denote bytes of picture start code (m=1). Reference numeral 4204 denotes inserted bytes (4−n−m). Reference numeral 4205 illustrates bytes of picture start code (m=1).

In the following, positioning of the frames and packets using time stamps will be described.

This description deals with the placement of frames and packets on the time axis of the slow-forward stream using the recording time stamps pre-pended to each packet. It starts with the placement of the original normal play frames. Then the repetition and compression of B-frames is described. Subsequently, the placement of empty frames is explained. Finally, some issues about the PCRs are discussed.

Next, positioning of the original normal play frames will be explained.

Decoding problems may occur if the decoding starts before the necessary data are received. Such a possible decoding problem may be avoided for the slow-forward stream if the distance of the end of the frame data to the DTS of this frame is identical for the slow-forward and the normal play stream. This may be achieved by keeping the distance at the start of the frame data of the corresponding DTS identical to the normal play stream and placing the packets of this frame with the same packet distance as from the original normal play stream.

Figure 43:
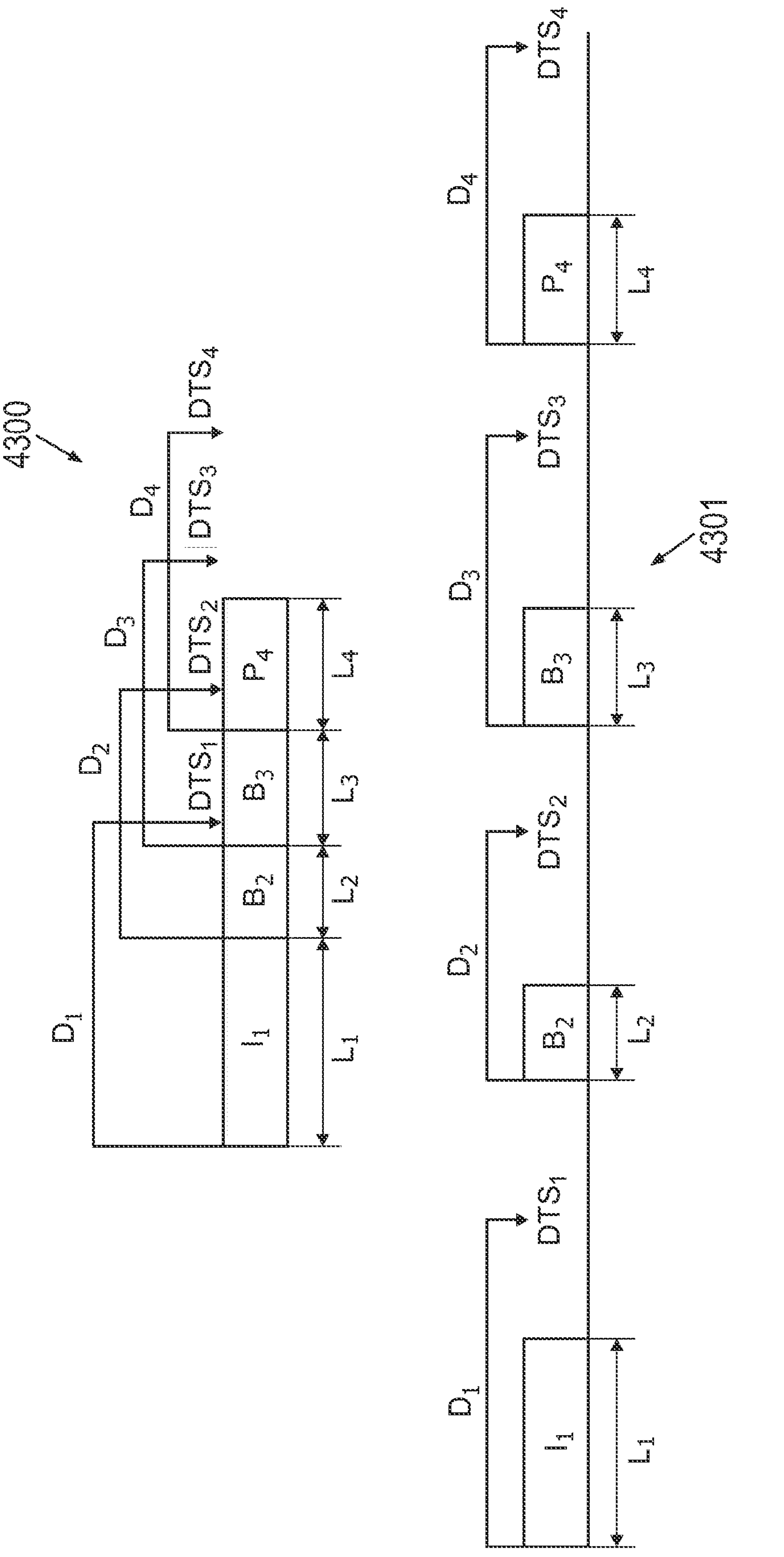
FIG. 43 illustrates an unmodified distance to DTS.

This situation is depicted in FIG. 43 illustrating the unmodified distance to DTS. The distance to the DTS can be much larger than shown in FIG. 43.

FIG. 43 shows the situation in normal play which is denoted with reference numeral 4300 and shows the situation in slow-forward which is denoted with reference numeral 4301.

The starting moment of the frame data is given by the value of the System Time Counter at the start of this frame. This is designated by a virtual PCR value PCRS. The superscripts N and S designate respectively the original value in the reordered normal play stream and the new value in the slow-forward stream. The placement rule for the start of a frame is then given by:

$$DTS^S - PCRS^S = DTS^N - PCRS^N \quad (5)$$

which can be rewritten to:

$$DTS^S - DTS^N = PCRS^S - PCRS^N \quad (6)$$

The offset of a frame in the slow-forward stream with respect to its original position in the normal play stream is given by:

$$\text{offset} = PCRS^S - PCRS^N \quad (7)$$

which can be translated to $$\text{offset} = DTS^S - DTS^N \quad (8)$$

The needed DTS values may be calculated for each slow-forward frame and also if necessary for the normal play frames within a GOP that do not have a DTS. Now that the DTS of all the original frames in the normal play stream as well as in the slow-forward stream are available, the offset of these frames can be calculated as the difference between their new and original DTS values. This offset is then used to position the frame and correct the PCR value of PCRS that are present within the data of this frame. The latter is easy; an offset is simply added to the original PCR base. The PCR extension is not changed. This ensures that no drift is introduced between the DTS and the PCR because the correction is in both cases equal to the offset. The relation between the new and original PCR base value is then given by:

$$PCRbase^S = PCRbase^N + \text{offset} \quad (9)$$

The positioning of the frame is somewhat more difficult. Positioning is accomplished by a correction of the 4 byte recording time stamp (TST) that is pre-pended to all packets. For this purpose, the offset may be recalculated from a 90 kHz to a 27 MHz basis. A straightforward choice would be to multiply the offset by 300. But here it has to be considered a possible jump in the PCR clock frequency when switching from normal play to slow-forward. Such a jump will never occur if the clock of the time stamp counter was locked to the PCRs during recording, as it should. But if for one reason or another the time stamps are not locked to the PCRs, a jumping PCR clock frequency can still be avoided by using an additional multiplication factor M. This factor is then equal to the ratio of the time stamps and the PCR values of the latest two packets containing a PCR in the recorded normal play stream. Latest means the last two PCR packets before the start of the current frame. This ratio is equal to one in the ideal case of a locked time stamp. Denoting these at least two PCR packets by $P_{(k-1)}$ and $P_k$, the offset for the time stamps of all packets of the frame is then given by:

$$TSToffset = 300 \times \text{offset} \times M \quad (10)$$

with $$M = (TST^N\{P_k\} - TST^N\{P_{(k-1)}\}) / (PCR^N\{P_k\} - PCR^N\{P_{(k-1)}\}) \quad (11)$$

The PCR values in this formula are in fact the total PCR value based on a 27 MHz clock. This may be calculated from the PCR base and extension in the following way:

$$PCR = 300 \times PCRbase + PCRext \quad (12)$$

It is clear that strange results can occur in the calculation of M if there is a wrap in the TST or PCR values between the packets $P_{(k-1)}$ and $P_k$. This can be simply avoided. If the value for packet $P_k$ is smaller than for the packet $P_{(k-1)}$, a value corresponding to the range of TST or PCR has to be added to the value for packet $P_k$ prior to this subtraction. This means that the registers for TST and PCR should be one bit wider than normally required. For TST this also means that the additional bit is set to one when this condition occurs and to zero otherwise. The remaining bits are always equal to the original TST bits.

The calculated TST offset is used to correct the time stamps of all packets of this frame. This means that the offset value is added to the recorded time stamps.

In the following, repetition of the B-frames will be explained.

The repetition of the displayed picture resulting from a B-frame is enforced by the repetition of the B-frame data. This results in a series of identical B-frames in the slow-forward stream. The placement of the first frame of this series is similar as in the case of dealing with the positioning of the original normal play frames. The remaining frames are called repeated B-frames. They can be treated in the same way as the first frame, which means that the offset is calculated as the difference between the DTS values in the slow-forward stream and the original recorded stream. The DTS of the recorded frame is identical for the complete series of identical B-frames. In the slow-forward stream, the DTS of a frame is always equal to the DTS of a previous frame increased by Delta. This means that the offset of the repeated B-frames $B_R$ can also be calculated with the following formula in which $B_L$ denotes the previous B-frame:

$$\text{offset}\{B_R\} = \text{offset}\{B_L\} + \text{Delta} \quad (13)$$

The offset is then used in the way described before to correct possibly present PCRs and (after conversion) the time stamps of the packet of the particular $B_R$ frame.

Figure 44:
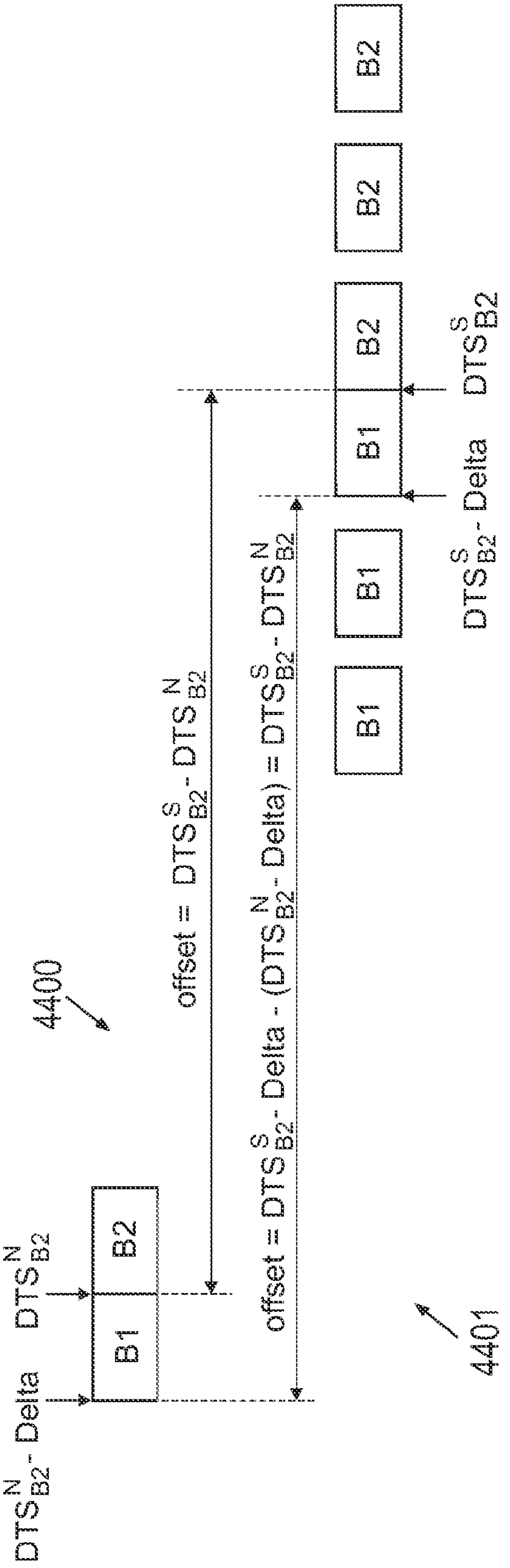
FIG. 44 illustrates an equal offset at the boundaries of a series of identical B-frames.

FIG. 44 illustrates an equal offset at the boundaries of a series of identical B-frames. The situation is denoted for normal play (reference numeral 4400) and for slow-forward (reference numeral 4401).

It can be shown that the offset of the first B-frame of a series is equal to the offset of the preceding frame in the slow-forward stream if no empty frames are inserted at this concatenation point. Two situations fulfil this requirement. The first one is when a B-frame is concatenated to a previous anchor frame in the case of pre-insertion of empty frames. The second one is when a B-frame is concatenated to a previous B-frame. FIG. 44 elucidates the effect for the concatenation of the two B-frames. The same is in fact true for the end of the series. Also here the offset of the two frames around the concatenation point is identical if no empty frames are inserted at this point. FIG. 44 also shows this for two concatenated B-frames. The other situation is the concatenation of a B-frame to a subsequent anchor frame in the case that post-insertion of Bf-frames is used.

This means that the two frames around such a concatenation point are connected in the same way as in the normal play stream. For this reason the original packets are always used at such a concatenation point and never the two packets resulting from a split in case the packet contains information from two frames. It is also evident that (as already explained above)

no gluing is necessary at such a point. At all other concatenation points the two packets from the split are used if present.

In the following, time compression of B-frames will be illustrated.

Figure 45:
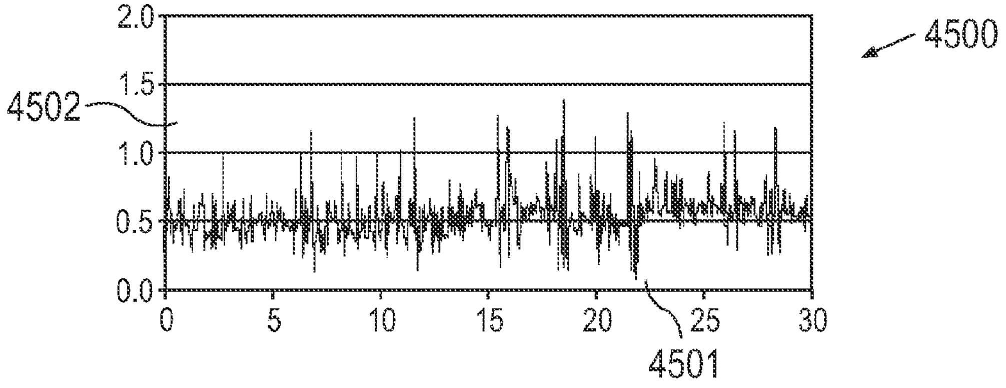
FIG. 45 illustrates B-frame data length.

It might be expected that the duration of B-frames will normally be less than one frame time. On average this is true but occasionally the transmission time of B-frames can be larger than one frame time. In a measurement with a duration of roughly 30 seconds, a B-frame of 1.4 frame times was detected. This measurement is depicted in FIG. 45. The average B-frame data length equals 0.6 frames, but regularly the duration of the B-frame data is larger than one frame time.

FIG. 45 shows a diagram 4500 having an abscissa 4501 along which the time in seconds is plotted. Along an ordinate 4502 of the diagram 4500, the length of a frame in number of frame times is plotted.

Figure 46:
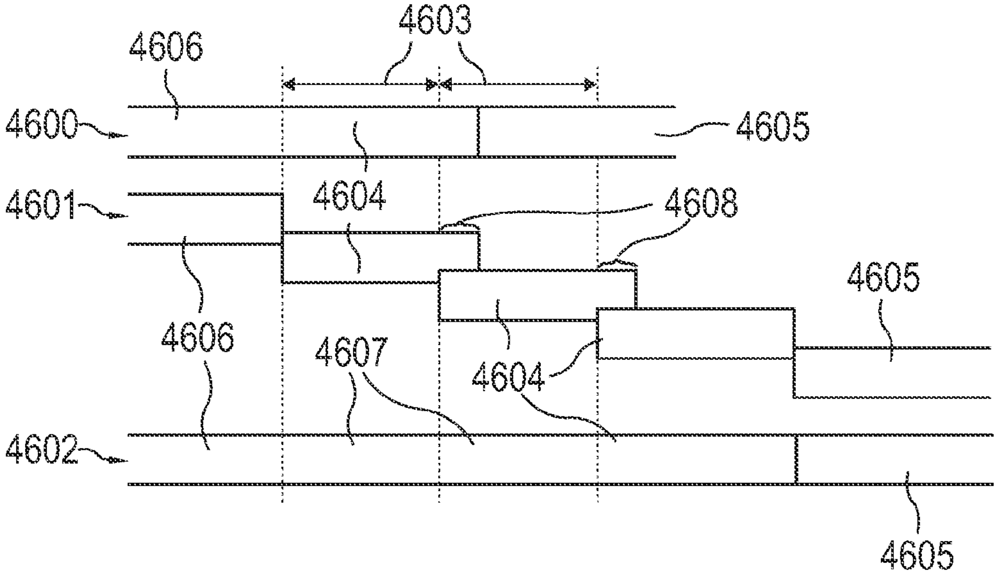
FIG. 46 illustrates an overlap of data in case the B-frame is larger than one frame time.

The positioning of the packets of B-frames by means of a correction of their time stamp with the TSToffset will lead to a correct result as long as the duration of the B-frame is smaller than one frame time. But if a B-frame in the slow-forward stream is larger than one frame time, the end of it will overlap with a subsequent frame because the start of the frames is placed with a distance of one frame time. This is not fully true because the last repeated B-frame would never overlap with the subsequent frame. The situation for a B-frame larger than one frame time is clarified in FIG. 46. FIG. 46 illustrates an overlap of data in case the B-frame is larger than one frame time.

FIG. 46 illustrates a normal play situation 4600, a slow-forward without compression situation 4601 and a slow-forward with compression situation 4602. The frame time is indicated with reference numeral 4603. B-frames have the reference numeral 4604, next frames have the reference numeral 4605, previous frames have the reference numeral 4606 and compressed B-frames are denoted with 4607. Furthermore, overlaps between adjacent frames are denoted with reference numeral 4608.

The type of the previous and next frame has no influence on the effect described. So they can be an anchor frame, a B-frame or even an empty frame.

This means that all the B-frames of a series of identical B-frames except the last have to be compressed in time. This compression can increase the local bit rate even to a level about the maximum bit rate of the total normal play stream. To limit this increase as much as possible, the packets of the B-frame are evenly distributed over the available frame time. The time stamp of the first packet of a B-frame is calculated with the offset rules given earlier. If the packets of the B-frame are denoted by $P_j$, in which the index j is the packet number within the B-frame, the time stamp of the first packet of a compressed B-frame in the slow-forward stream is given by:

$$\mathrm{TST}^S\{P_1\}=\mathrm{TST}^N\{P_1\}+\mathrm{TSToffset} \tag{14}$$

The increment of the time stamp for the subsequent packets of the frame is equal to a value corresponding to one frame time divided by the total number of packets of the frame. Additional packets at the end of the B-frame, like gluing packet and PCR packet, have to be included in this number. Denoting this number of packets by $N_b$, and the distance between the packets of the compressed B-frame by $d_b$, this distance is given by:

$$d_b=300\times\mathrm{Delta}/N_b \tag{15}$$

The time stamps of the remaining packets of a compressed B-frame and the slow-forward stream are then given by:

$$\mathrm{TST}^S\{P_j\}=\mathrm{TST}^S\{P_{(j-1)}\}+d_b \tag{16}$$

Figure 47:
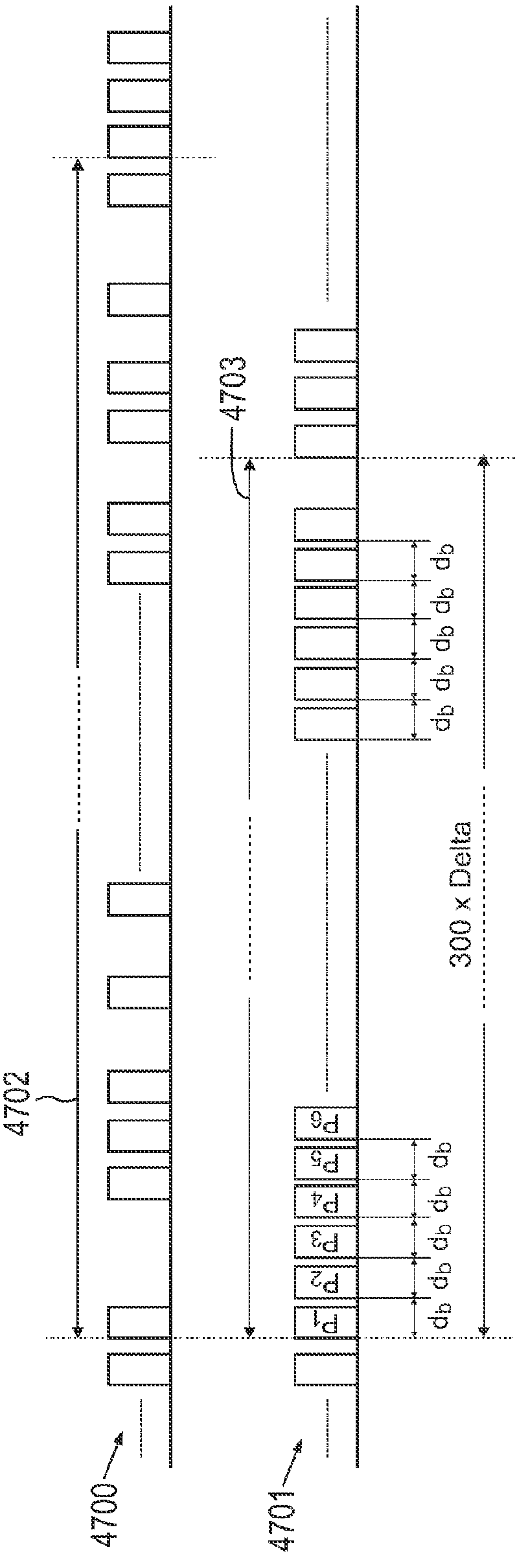
FIG. 47 illustrates compression of B-frame with evenly distributed packets.

In the non-ideal case, the multiplication factor 300 for the calculation of the distance can lead to a packet distance problem between the last packet of the compressed B-frame and the first packet of the subsequent frame. This could be solved by not taking the factor 300 but instead convert the Delta in the same way as described for the offset. But a pragmatic solution is to take the value of $N_b$ one larger than the real number of packets. FIG. 47 shows how a B-frame with irregular packet distance and a duration larger than one frame time is compressed to a B-frame with a duration of one frame time and a constant packet distance. One frame time corresponds to an increment in the time stamp of 300×Delta. The fact that $N_b$ is chosen to be one larger than the real number of packets results in some empty space at the end of the compressed B-frame.

Therefore, FIG. 47 illustrates compression of B-frames with evenly distributed packets.

FIG. 47 shows a non-compressed state 4700, a compressed state 4701, shows a B-frame 4702 and a B-frame compressed in one frame time 4703.

It is possible to use the method of equal packet distribution for the B-frames in all cases and not only if compression is needed. But in most cases this means that the B-frame is expanded. The application of the TSToffset to the first packet of a B-frame means that the distance of this packet to the DTS is equal to the normal play stream. The expansion then results in a smaller time distance than original between the end of the B-frame data and the corresponding DTS. But it can be understood that the DTS of a frame can never be earlier than one frame time of the start of the frame data. The reason is as follows: The DTS of a frame and the original stream is by definition always one frame time later than the DTS of the previous frame. The DTS of this previous frame can never be earlier than the end of the data of this frame and therefore never before the start of the data of the current frame. This means that a DTS of an arbitrary frame is at least one frame time later than the start of the data for this frame. This also means that a DTS is always after the end of the frame data, even if this data is evenly distributed in one frame time. So the described equal packet distribution should be applied to all B-frames except the last repeated one. For simplicity, a compressed as well as expanded frame may be named a compressed frame.

Gluing is only necessary between the B-frames of an identical series of B-frames. So a possible additional gluing packet will only be added to the end of a compressed B-frame and never anywhere else. An additional PCR packet is added to the end of the B-frames except to the end of the last repeated B-frame because there is no room at this point. This again means that the additional PCRs are only added at the end of compressed B-frames. So no special placement algorithm is necessary for these packets because they are all included in the compression algorithm.

A consequence from the compression of B-frames is that the correction of the value of a PCR within a frame data is no longer correct for such a B-frame. How this PCR value is corrected in this case and how the value of the PCRs added to the end of a compressed B-frame are calculated will be described in the following. Next, an insertion of the empty frames will be described.

It has to be decided where the inserted empty frames are positioned. Looking at the position of the other frames in the slow-forward stream it is clear that, especially for larger slow-motion factors, a major time gap exists at the point where the empty frames are to be inserted. To avoid problems with an excessive PCR distance, the empty frames should be distributed in this area and each empty frame should contain a PCR. For this reason the distance between successive empty frames is chosen to be one frame time. The first empty frame is directly concatenated to the previous frame. This is shown in FIG. 48.

Figure 48:
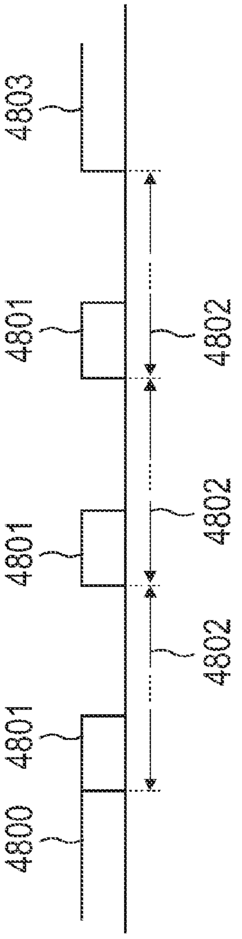
FIG. 48 illustrates placement of the empty frames.

FIG. 48 shows placement of the empty frames and illustrates the sequence of a previous frame 4800, an empty frame 4801, after a frame time 4802 a further empty frame 4801 is placed, and so on. A next frame is denoted with reference numeral 4803.

The placement algorithm is independent of pre- or post-insertion or the type of empty frame. It should be distinguished, however, between the placement of the first packet of the empty frame and the placement of the remaining packets.

In the following, placement of the first packet of an empty frame will be explained.

Figure 49:
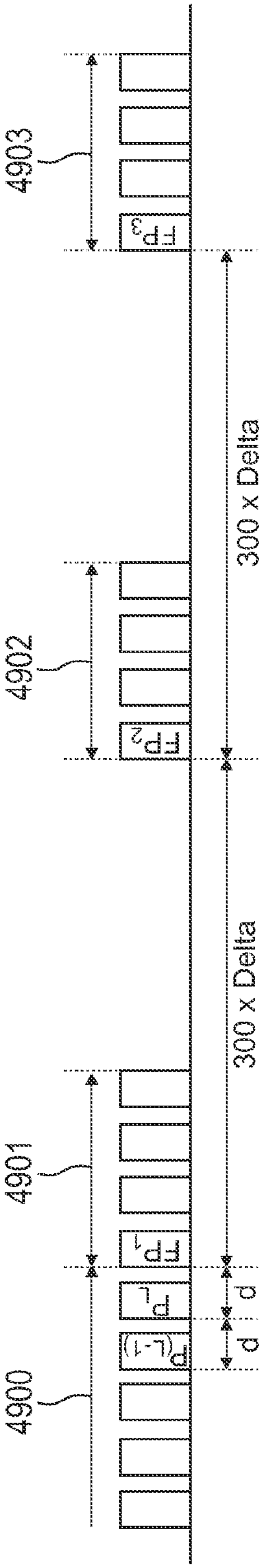
FIG. 49 illustrates positioning of the first packet of the empty frames.

As can be taken from FIG. 49, the positioning of the first packet of the empty frames is described here. A previous frame 4900 is followed by a plurality of empty frames 4901, 4902, 4903, and so on. The first packet of an empty frame is denoted by $FP_i$ in which i is the frame number of the empty frame within a sequence of empty frames.

Starting with the placement of $FP_1$, which is the first packet of the first empty frame, several options exist to derive the time stamp for this packet. One is to add a value d to the slow-forward time stamp of the last packet of the preceding frame. Denoting this last packet again as $P_L$, the time stamp of the first packet of the first empty frame is given by:

$$\mathrm{TST}^S\{FP_1\}=\mathrm{TST}^S\{P_L\}+d \quad (17)$$

The value of d can also be chosen in several ways. A possibility is to use the difference between the time stamps of the last two packets of the preceding frame as the value for d. The time stamps can then either be taken from the slow-forward stream or from the original recorded stream, because a compressed frame will never precede the empty frames anyway. Denoting the last two packets of the previous frame by $P_{L-1}$ and $P_L$, the value of d is given by:

$$d=TST\{P_L\}-\mathrm{TST}\{P_{(L-1)}\} \quad (18)$$

If the time stamps for the calculation of d are taken from the slow-forward stream, the formula for the calculation of $FP_1$ can also be written as:

$$\mathrm{TST}^S\{FP_1\}=2\times\mathrm{TST}^S\{P_L\}-\mathrm{TST}^S\{P_{(L-1)}\} \quad (19)$$

The time stamps of the first packets of the subsequent empty frames are acquired by a repeated addition of a value corresponding to one frame time to the time stamp of $FP_1$. This value can be chosen to be 300×Delta in this case. The time stamps of the first packets of subsequent empty frames are then given by:

$$\mathrm{TST}^S\{FP_i\}=\mathrm{TST}^S\{FP_{(i-1)}\}+300\times\mathrm{Delta} \quad (20)$$

In the following, the placement of the remaining packets of an empty frame will be explained.

The packets of an empty frame are denoted by $P_j$ in which j is the packet number within this empty frame. $P_1$ is the first packet of the empty frame which is denoted above by FP.

The position of the remaining packets is derived from the first packet of an empty frame. For this, it has to be decided on the distance between the packets. This is in fact not critical as long as the distance is not too short because there is ample space available. Two options will be mentioned here.

A first option is to again use the value of d mentioned earlier. This value is then used to increment the time stamps of the packets within the empty frames. These time stamps are then given by:

$$\mathrm{TST}^S\{P_j\}=\mathrm{TST}^s\{P_{(j-1)}\}+d \quad (21)$$

Figure 50:
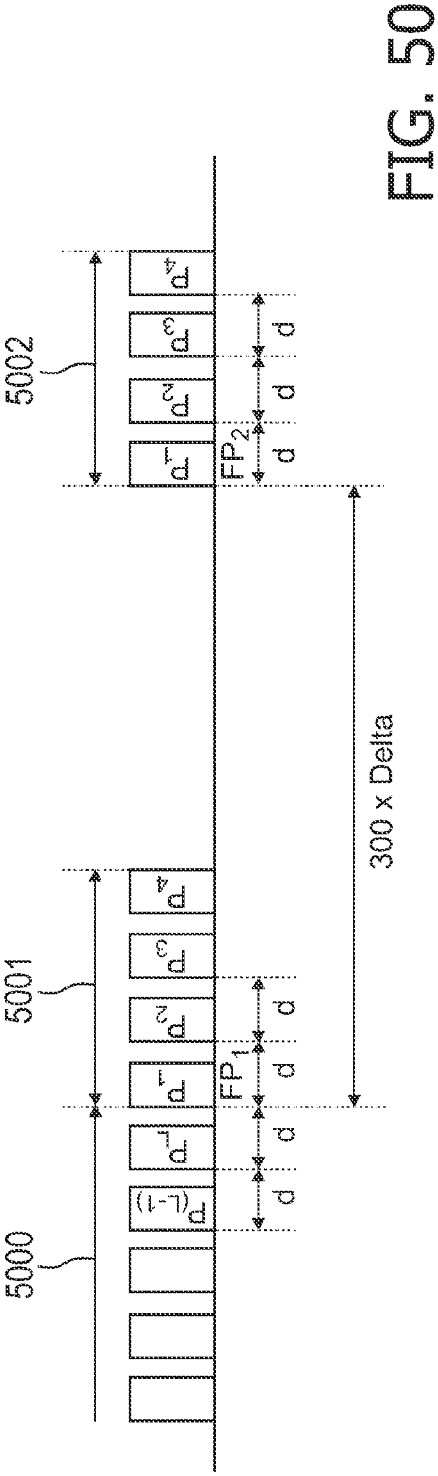
FIG. 50 illustrates Packet Distance of the empty frame based on previous frame.

This is depicted in FIG. 50 illustrating a sequence of a previous frame 5000, a first empty frame 5001 and a second empty frame 5002. Therefore, FIG. 50 illustrates the packet distance of the empty frames based on the previous frame.

A second option is to distribute the packets of an empty frame evenly over one frame time. In this case the increment is equal to a value corresponding to one frame time divided by the number of packets of the empty frame. Denoting this number of packets by $N_e$, and a distance between the packets by $d_e$, the distance is given by:

$$d_e=300\times\mathrm{Delta}/N_e \quad (22)$$

The time stamps of the packets within the empty frame are then given by:

$$\mathrm{TST}^S\{P_j\}=\mathrm{TST}^S\{P_{(j-1)}\}+d_e \quad (23)$$

This situation is also depicted in FIG. 51 again illustrating a previous frame 5000 followed by a first empty frame 5001 and a second empty frame 5002.

Figure 51:
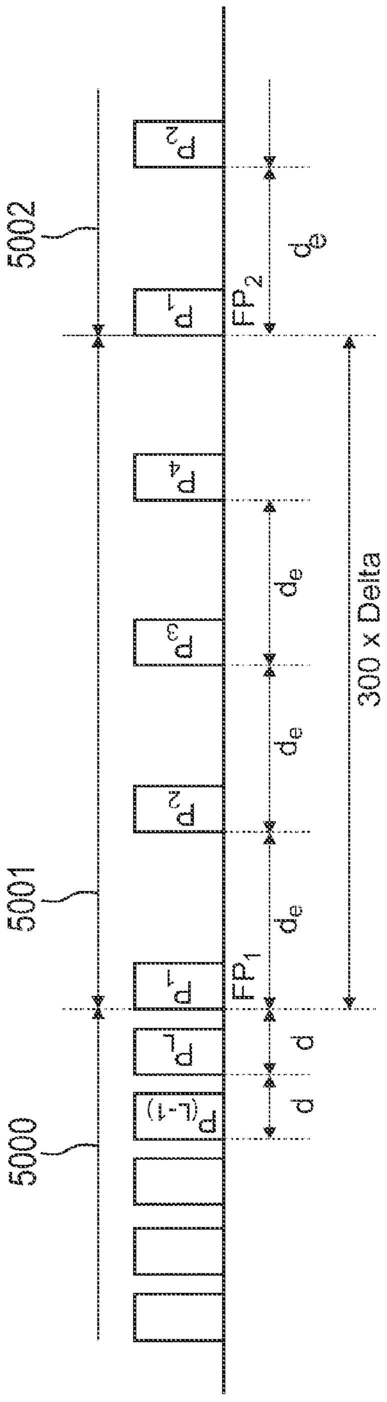
FIG. 51 illustrates packet of the empty frame evenly distributed over one frame time.

Therefore, FIG. 51 illustrates packets of the empty frame evenly distributed over one frame time.

Next, some aspects related to PCRs are explained.

First, it may be assumed that no additional PCRs are inserted in the slow-forward stream. Because the I-frame is normally much larger than one frame time, it is very probable that it will contain a PCR. For P-frames, the probability is already reduced. B-frames are mostly smaller than one frame time, so a lot of B-frames will not contain a PCR. This means that large gaps within a PCR will occur in the slow-forward stream even though the B-frames are repeated. In general, it is possible to say that the maximum distance between PCRs is increased by the slow-motion factor. This clearly demands for the insertion of additional PCRs in a slow-forward stream.

Apart from original PCRs embedded in the frame data, additional PCRs should be added to an empty frame and at the end of a B-frame. The latter holds with the exception of the end of the last repeated B-frame because there is no room at this point. With these measures it is still possible that the maximum distance exceeds the requirements of the DVB standard, but not to a problematic level. In general, the situation is even more favourable than for fast-forward/fast-reverse.

The correction of PCRs embedded in the frames is described earlier, at least for frames without compressions. Some other method is advantageous to calculate the PCR value of the additional PCRs in the empty frames and at the end of the B-frames as well as for the PCRs within a compressed B-frame. A first option is the following rule: A PCR value is equal to the value of the previous PCR in the slow-forward stream corrected with the difference between the actual slow-forward time stamps of the two packets containing these PCRs. Denoting the packets containing the current and previous PCRs by, respectively, PC and $P_{(c-1)}$, the current PCR in the slow-forward stream is given by:

$$\mathrm{PCR}^S\{P_c\}=\mathrm{PCR}^S\{P_{(c-1)}\}+\mathrm{TST}^S\{P_c\}-\mathrm{TST}^S\{P_{(c-1)}\} \quad (24)$$

Also here PCR stands for the total PCR value calculated from base and extension. This formula is perfect for the ideal case but leads to frequency variations and therefore substantial PCR jitter in the non-ideal case. This is avoided by applying the correction factor M calculated earlier. The current PCR has been given by:

$$PCR^S\{P_c\}=PCR^S\{P_{(c-1)}\}+(TST^S\{P_c\}-TST^S\{P_{(c-1)}\})/M \quad (25)$$

The PCR base and extension that have to be inserted in the packet are calculated from the PCR values as follows:

$$PCRbase=int(PCR/300) \quad (26)$$

$$PCRext=PCR-300\times PCRbase \quad (27)$$

Formulas (26), (27) could in fact be used to regulate all PCR values, so including those of the PCRs embedded in non-compressed original frames. However, the calculation with the correction factor may lead to rounding errors that may accumulate, thus resulting in a slow drift of the PCR time base with respect to the DTS. Therefore, in order to reset this drift to zero, the correction of embedded PCRs in non-compressed frames should be performed by an addition of the offset value as described earlier.

In the following, it will be described where a hybrid stream may be made.

The hybrid stream described herein can be created in several places. These are in fact the same locations possible for a stream with plaintext I-frames:

1. at the broadcaster or uplink in the case of satellite broadcast;

2. at the cable head-end in the case of a cable network;

3. at the residential gateway in the case of a secure authorized domain;

4. at the recording side of the storage device.

However, for a stream with only a few plaintext packets, a fifth location is possible, namely:

5. at the playback side of the storage device.

Figure 52:
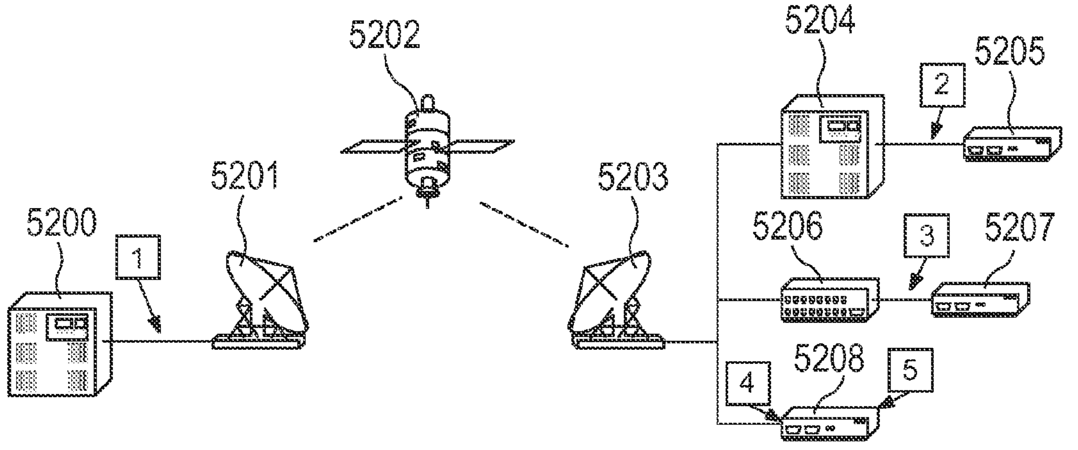
FIG. 52 illustrates locations for conversion to a hybrid stream.

FIG. 52 illustrates possible locations for conversion to a hybrid stream.

The situation of FIG. 52 is that a broadcaster 5200 broadcasts a signal to a satellite dish 5201. The satellite dish 5201 may transfer the signals to a satellite 5202, and a further satellite dish 5203 may receive these signals. Then, the signals may be supplied to a cable head end 5204 and from there to a storage device 5205. Or, the signals may be supplied to a residential gateway 5206 and from there to a storage device 5207. Alternatively, the signals may be supplied from the satellite dish 5203 to a storage device 5208. At the locations 1 to 5 of FIG. 52 conversion to a hybrid stream is possible.

Locations 1 and 2 might be difficult to realize because a provider may have a limited influence here. For the storage device it makes in fact no difference whether the transformation to a hybrid stream is realized in locations 1, 2 or 3. Option 3 is a good alternative. It might even improve the position of a provider in residential gateways for authorized domains. In all three cases the storage device receives a hybrid stream at its recording input. This means that no decryption and smart card are necessary in the storage device, at least not for normal play and the trick-play generation. But decryption is still necessary if a metadata extraction function is present inside the storage device that uses the detection of key frames etc.

A very probable location to construct the hybrid stream might be case 4 which is at the recording side of the storage device. Although this may ask for a partial decryption at the recording side it still has the advantage that no decryption is needed for trick-play generation. Anyway, it is preferred that the recorded stream is a hybrid one.

In case 5 where the recording is made with all packets encrypted it is still possible to create secure trick-play. Instead of a full decryption it is also possible to decrypt only these packets needed and leave the rest still encrypted (see FIG. 53).

Figure 53:
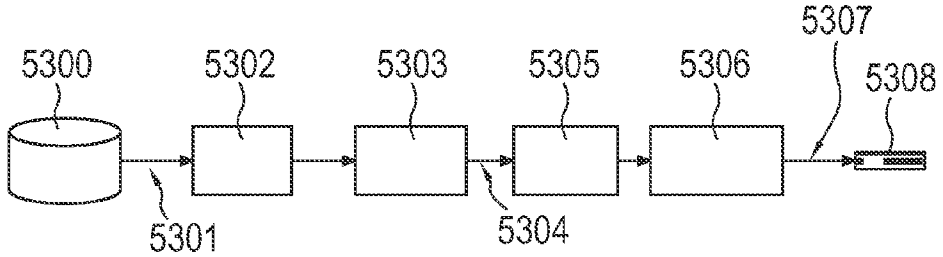
FIG. 53 illustrates generating secured trick-play from a fully encrypted recording.

FIG. 53 illustrates generating secure trick-play from a fully encrypted recording. A recording device 5300 provides encrypted MPEG2 data 5301 and supplies the latter to a block selector unit 5302. From there the data is supplied to a decryptor 5303 which generates partially encrypted MPEG2 data 5304. This partially encrypted MPEG2 data is provided to a frame selector 5305 and from there the data is supplied to a trick-play generation unit 5306. The trick-play generation unit 5306 generates MPEG2 DVB compliant transport stream partially encrypted data 5307 which may then be supplied to an MPEG2 decoder or a decryptor 5308.

However, advantages of creating a CPI (see FIG. 4) beforehand cannot be used as would be possible by recording with those packets and plaintexts. However, it is still possible to create a predominantly encrypted trick-play stream. The system configuration is so that the trick-play construction unit is generating an encrypted stream constructed on a transport stream level, and that the insertion of ECMs is no option but mandatory.

In the following, it will be explained how to select packets that should be in plaintext.

When a hybrid stream is constructed it should be decided which packets should be in plaintext. To enable the detection and selection of needed plaintext data the video stream may first be completely decrypted. Then the location of this data is determined in the plaintext stream and the plaintext packets in which it is located replace the encrypted packets and the original stream to form the hybrid stream.

To the selected plaintext data, three criteria may be used:

1. The DTS/PTS and the PES header may be changed if they are present. For this purpose, all of the PES header data may be put in plaintext. This means that the packets ranging from the one with the PLUSI bit set to the one containing the last byte of the PES header are all put in plaintext.

2. Some information from the sequence header and sequence extension may be needed. For this purpose, all of the data from the sequence header up to the picture start code is put in plaintext. Sequence header and picture start code are detected by checking for a four bytes code. These four bytes are not necessarily located in one and the same packet. Sequence header and picture start code are detected when the last of the four bytes is found. To avoid excessive buffering for the construction of the hybrid stream, the packets ranging from the one containing the fourth byte of the sequence header up to the one containing the fourth byte of the picture start code are all put in plaintext. This can lead to some peculiar situations when searching for a sequence header and picture start code in the resulting hybrid stream. This will be explained below.

3. The picture start code is needed to detect the frame boundaries. So a packet containing a picture start code should be put in plaintext. The two bytes following the picture start code should also be in plaintext. These bytes contain the temporal reference that might need to be changed and the picture coding type that identifies an I-frame, a P-frame or a B-frame. Moreover, some information is needed from the picture code extension. For this purpose, all of the data from the picture start code up to the end of the picture code extension is put in plaintext. The picture start code is detected when the fourth byte is found. To avoid excessive buffering, the packets ranging from the one containing the fourth byte of the picture start code up to the one containing the last byte of the picture coding extension will all be put in plaintext. This will result in plaintext packets on all frame boundaries, which is more than needed for the construction of particular trick-play streams. But it is necessary for the construction of a slow-motion forward stream.

Concerning the question what excessive buffering means and what it causes, it is possible to say that if a hybrid stream is constructed, packets from the original encrypted and the decrypted stream have to be combined in one stream. If done in real time, some buffering may be needed. Assuming that the picture start code is spread over two video packets, this four bytes picture start code is detected in the encrypted stream at the moment that the last byte is found. To have the complete picture start code and plaintext means that not only the video packet with this last byte should be in plaintext but also the preceding video packet.

Figure 54:
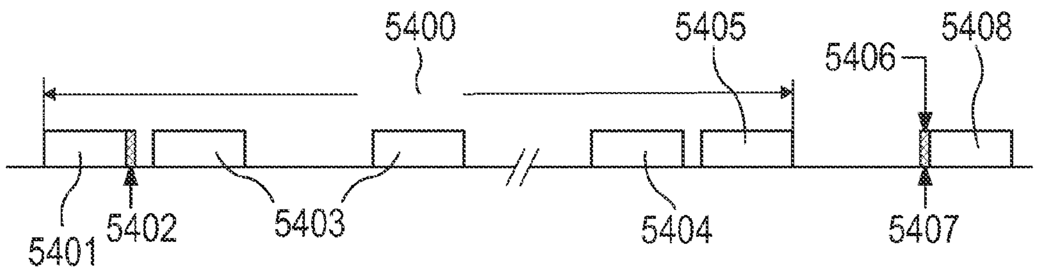
FIG. 54 illustrates buffering demand for completely plaintext picture start code.

Other data can be and regularly will be in between these two video packets. In principle, this can be a large amount of packets. FIG. 54 shows an example of such a situation where the picture start code at the end of the I-frame is spread over two video packets.

More particularly, FIG. 54 shows a buffer 5400 including an I-frame 5401 including a part of a picture start code 5402. Then, audio packets 5403 follow. Still included in the buffer 5400 is a PSI block 5404 and a data block 5405. A picture start code detection moment 5406, a part of a picture start code 5407 and a subsequent P-frame 5408 are further illustrated in FIG. 54.

In the case of FIG. 54, not only these two video packets have to be buffered but also all the packets with other data in between these two video packets. Although the picture start code is shown in the example, it is clear that the same argument is valid for the sequence header code. The given criteria reduce the necessary buffering to only one packet.

If one of the three defined criteria is met, the corresponding packets will be put in plaintext. The combination of the three criteria will often lead to only one plaintext packet at each frame boundary. However, in some practical cases for some streams it can also be a few packets. In fact, theoretically it can even be a large number of packets.

A first example is a stream consisting of only I-frames and P-frames of the GOP size of, for instance, 12 frames in one PES packet per GOP. In experiments performed, the number of plaintext packets at the start of the I-frame was always one. The number of plaintext packets at the end of the I-frame and in fact at all other frame boundaries was usually one but sometimes two. At the start of the I-frame everything from PES header to picture code extension is in one packet. The plaintext packet at other frame boundaries contains all data from the picture start code to the end of the picture coding extension. This data can be spread over two packets.

A second example is a stream comprising I-frames, P-frames and B-frames with an IBP structure, a varying GOP size with even values ranging from 2 to 12 in one PES packet per frame. Although this stream is in fact the plaintext stream it is used here as if it would be encrypted. The number of plaintext packets at the start of the I-frame would be mostly two and at the end of the I-frame and other frame boundaries always one. The two packets at the start of the I-frame are mainly due to the presence of a quantizing table and a sequence header. At the end of the I-frame and other frame boundaries the data from PES header to picture coding extension is all in one packet.

It should be noted that due to the PES structure it is not the last packet of the I-frame that is in plaintext but in fact the first packet of the next frame. This may also occur in other scenarios. However, this is no problem because the last packet of the I-frame only contains I-frame data in this case and does not need to be cleaned up.

It should also be noted that in practise the combination of the three selection criteria leads to one contiguous plaintext video area at each frame boundary. In theory, this needs not be the case. The combination of criteria 2 and 3 always leads to a contiguous area but theoretically the plaintext PES header area can be a separate one.

In the following, it will be explained how to find necessary information in the hybrid stream.

There is in practice one contiguous plaintext area at each frame boundary. At the start of the I-frame (GOP) the plaintext data runs from the first byte of the PES header to at least the last byte of the picture coding extension.

Figure 55:
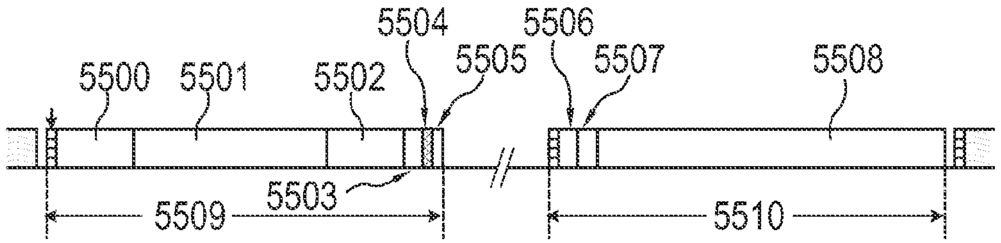
FIG. 55 illustrates a practical plaintext area at the start of the I-frame.

An example is given in FIG. 55.

FIG. 55 shows a practical plaintext area at the start of the I-frame. The data sequence shown in FIG. 55 includes a PES header 5500, a sequence header 5501, a sequence extension 5502, a GOP header 5503, a picture start code 5504, a picture header 5505, a further picture header 5506, a picture code extension 5507, and I-frame data 5508.

The components 5500 to 5505 relate to a first I-frame packet 5509, and the components 5506 to 5508 relate to a second I-frame packet 5510.

All necessary data is in this area and can be easily found by parsing this part of the stream that starts at a packet marked with a PLUSI.

At the end of the I-frame there are two possibilities:

1. In the case of one PES packet per frame the plaintext area edge (after) the end of the I-frame also starts with a first byte of the PES header and runs to at least the last byte of the picture coding extension. All necessary data is easily found and no cleaning of the last packet of the I-frame is needed (see FIG. 56 on the left).

2. In the case of one PES packet per GOP there is no PES header after the end of the I-frame. In practice, there is also no sequence header at this position. In this case the packets containing the fourth byte of the picture start code up to the last byte of the picture coding extension are in plaintext (see FIG. 56 on the right). The four bytes of the picture start code could be spread over two packets, for instance the first three bytes in one packet and the last byte in the next packet. In this case the first three bytes are still encrypted. This seems to implicate that this picture start code cannot be detected.

Figure 56:
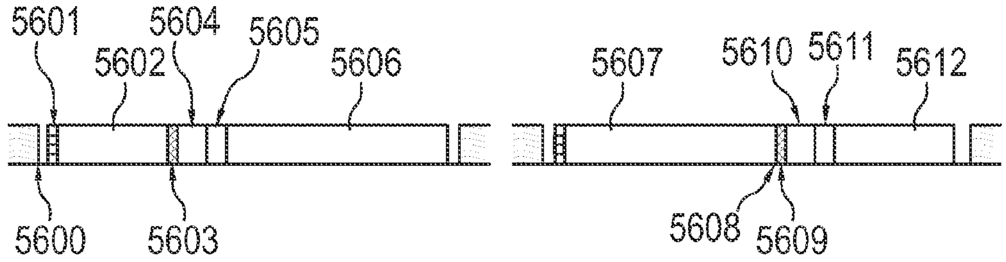
FIG. 56 illustrates practical plaintext areas.

FIG. 56 illustrates practical plaintext areas. In the sequence of FIG. 56, an end of an I-frame 5600 is shown, a PLUSI present 5601, a PES header 5602, a picture start code 5603, a picture header 5604, a picture coding extension 5605, P-frame or B-frame data 5606, last I-frame data 5607, an end of an I-frame 5608, a picture start code 5609, a picture header 5610, a picture code extension 5611, and P-frame or B-frame data 5612.

There is in fact a plaintext area at each frame boundary. So detecting the end of an I-frame means a search for the first picture start code after the one for the I-frame. It should be clear that only the plaintext video packet should be searched for this code to avoid a false positive match in the encrypted data. Whether a payload of a packet is in plaintext or not is indicated by the scrambling control bits in the packet header. The detection gives a positive match only when a given sequence of four bytes is found (0x00 0x00 0x01 0x00). The sequence corresponds to a picture start code disregarding the type of frame. Unfortunately, the picture start code does not have to be aligned on transport stream packet boundaries.

That means that if the picture start codes were spread over two packets, only the second one of those packets would be in plaintext.

Figure 57:
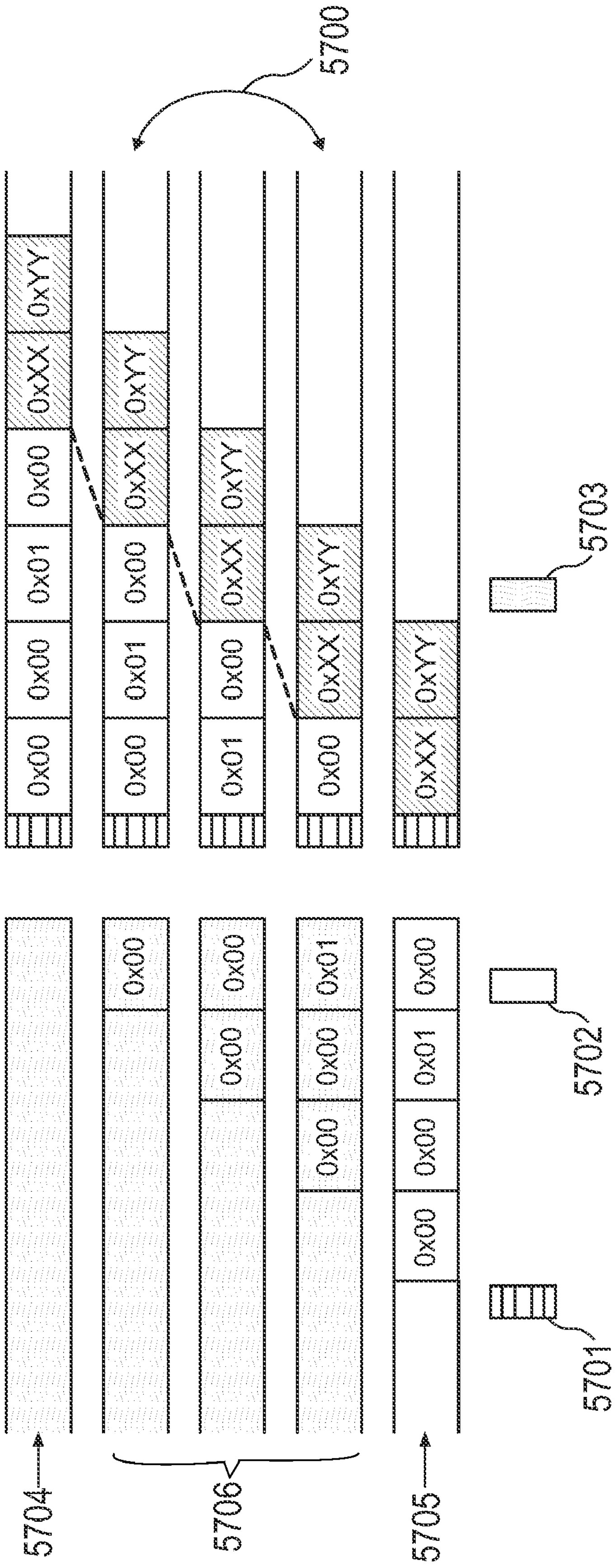
FIG. 57 illustrates a picture start code spread over two packets.

This is depicted in FIG. 57.

The question is whether the two parts denoted with reference numeral 5700 give a false positive match. In FIG. 57, a packet header is denoted with reference numeral 5701, a packet payload plaintext is denoted with reference numeral 5702 and a packet payload encrypted is denoted with reference numeral 5703.

The top line 5704 indicates a picture start code that is completely located in the second packet. For the bottom line 5705 it is completely in the first packet. The remaining lines 5706 indicate three possibilities for a spread picture start code.

One might expect that it is impossible to detect a partially encrypted picture start code. However, there is a way out of this dilemma. Each plaintext area should contain a picture start code or at least the last byte of it. So if no picture start code is found on a plaintext area, it is known that this area must start with some of the last bytes of the picture start code. This number of bytes can be 1, 2 or 3 as shown in FIG. 57. It is in fact possible to detect exactly how many bytes there are. In this respect it is important to notice that the three bits of the picture coding type can never be all zero because this is forbidden by the MPEG2 standard. Therefore, the second byte of the picture start code indicated by 0xYY in FIG. 57 can never be 0x00. So if the plaintext area starts with 0x00 0x010 0x00 these are the last three bytes of the picture start code. If it starts with 0x01 0x00 these are the last two bytes. If it starts with 0x00 but not with 0x00 0x01 0x00 there is only the last byte. In this way it is exactly known where the picture start code is located and the data following it can be parsed. The picture type can be read from byte 0xYY if needed or desired.

It is also possible to say that it seems to be not possible to clean up the last packet of an I-frame by removing all non-I-frame data if the picture start code is spread over two packets. This is in fact correct because it is not possible to remove the encrypted part of the picture start code. But in the trick-play stream construction an empty P-frame will be appended to the end of the I-frame. This empty P-frame will start with the picture start code. So the encrypted bytes of the picture start code can be reused because it is known how many of these bytes there are at the end of the last encrypted packet. This number of bytes is removed from the picture start code of the first empty P-frame to be added after the I-frame.

Figure 58:
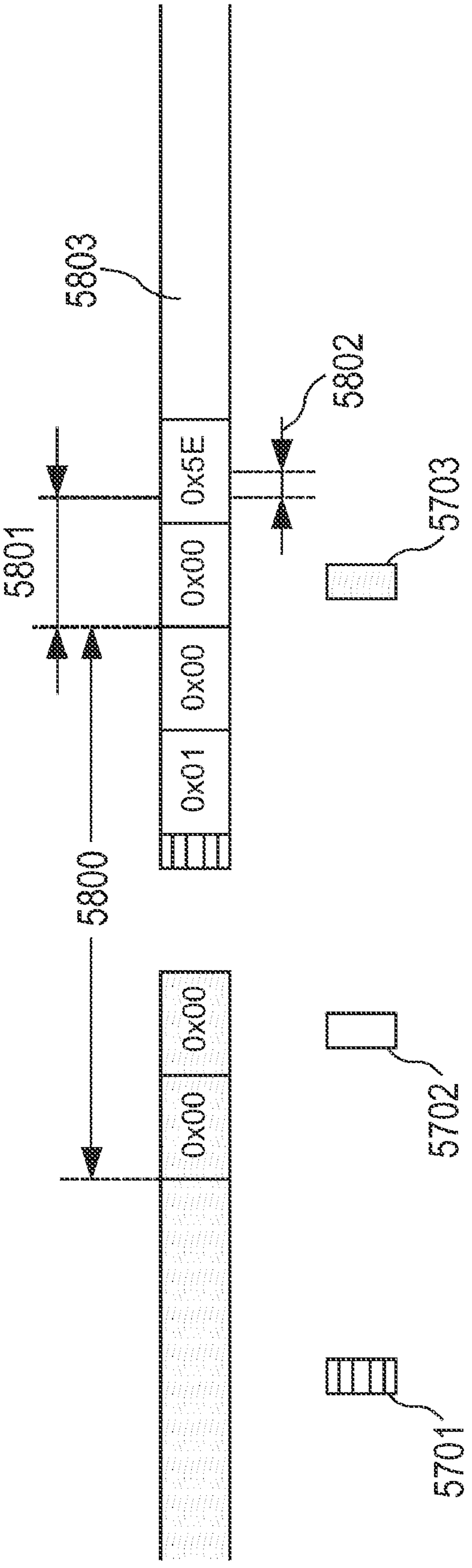
FIG. 58 illustrates an empty P-frame appended to partially encrypted picture start code.

FIG. 58 shows an example of such a situation.

In FIG. 58, an empty P-frame appended to a partially encrypted picture start code is shown. The picture start code is denoted with reference numeral 5800. A temporal reference 5801 is also shown in FIG. 58. Furthermore, a picture coding type is denoted with reference numeral 5802. Empty frame data is denoted with reference numeral 5803.

The situations that are to be expected in practice are described above but in theory some additional situations can occur. This originates from the fact that the plaintext PES header area and the plaintext areas resulting from criteria 2 and 3 in theory need not be connected but can be separated by encrypted video packets. For clarity, it should be mentioned that a contiguous plaintext area means that a sequence of video packets is in plaintext but that other encrypted packets can be in between.

In line with the criteria there are three important data areas that need to be accessed:

1. the PES header information;
2. the information in the sequence header and sequence extension;
3. the information from picture start code to picture coding extension.

Figure 59:
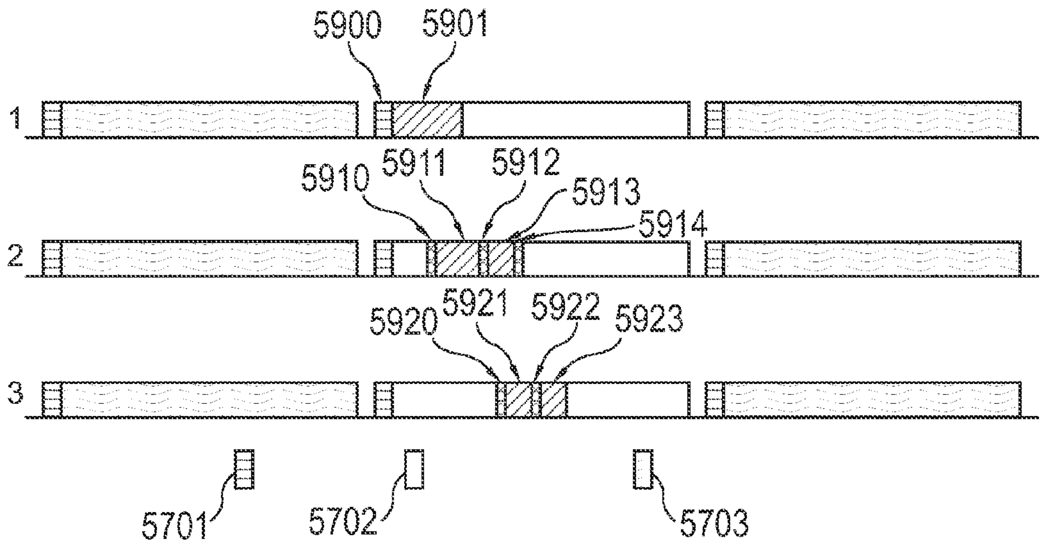
FIG. 59 illustrates plaintext data areas corresponding to three criteria.

These three data areas are depicted in FIG. 59.

FIG. 59 illustrates plaintext data areas corresponding to the three criteria. A first scheme shows a PLUSI present 5900 and a PES header 5901. A second image shows a sequence header code 5910, a sequence header 5911, a sequence extension code 5912 and a sequence extension 5913. A picture start code 5914 is further illustrated.

A third image in FIG. 59 shows a picture start code 5920, a picture header 5921, a picture coding extension code 5922 and a picture coding extension 5923.

Three items have to be found in the stream in order to locate and correctly pass this data:

1. the PLUSI bit in the packet header;
2. the sequence header code (0x00 0x00 0x01 0xB3);
3. the picture start code (0x00 0x00 0x01 0x00).

Finding item 1 is easy by just looking for the PLUSI bits and the packet header and if it is set to one, the packet will start with the PES header, which can then be passed. The situation for items 2 and 3 is more complicated because the sequence header code and picture start code can be spread over 2 packets resulting in partly encrypted codes. Therefore, a direct detection of these codes would lead to some loss of data. There is however a solution for this problem. In MPEG2, the presence of sequence extension and picture coding extension is mandatory as is depicted in FIG. 60.

Figure 60:
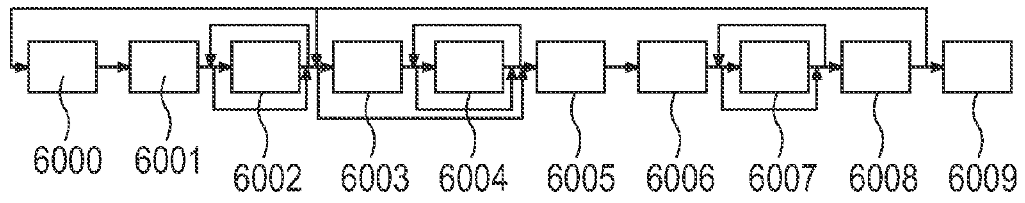
FIG. 60 illustrates a header structure in MPEG2.

FIG. 60 shows a header structure in MPEG2 including a sequence header unit 6000, a sequence extension unit 6001, extension and user unit 6002, a group of picture header unit 6003, a user unit 6004, a picture header unit 6005, a picture coding extension unit 6006, a user unit 6007, a picture data unit 6008 and a sequence end unit 6009.

Figure 61:
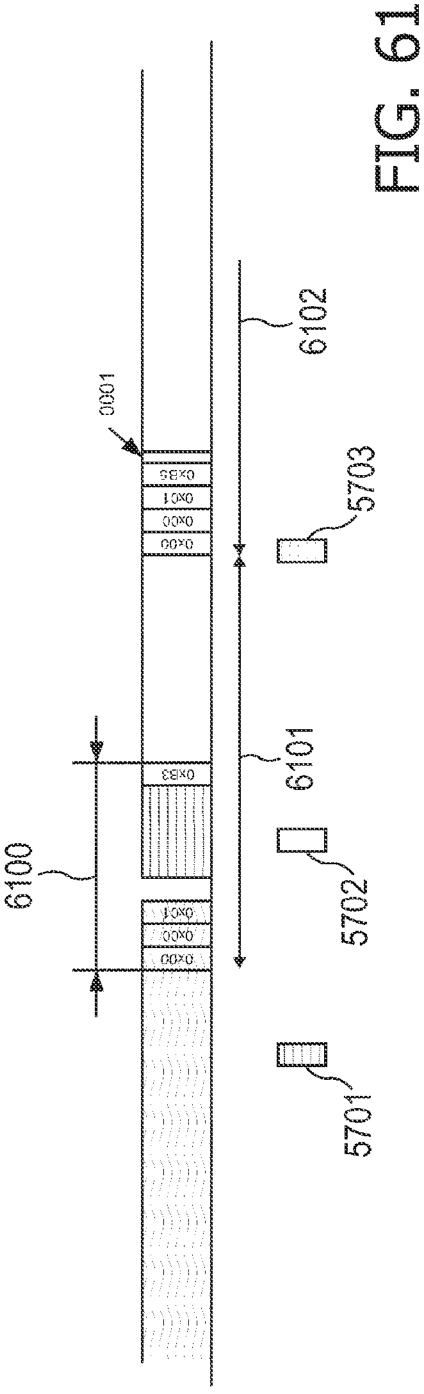
FIG. 61 illustrates a sequence extension and sequence header code.
Figure 62:
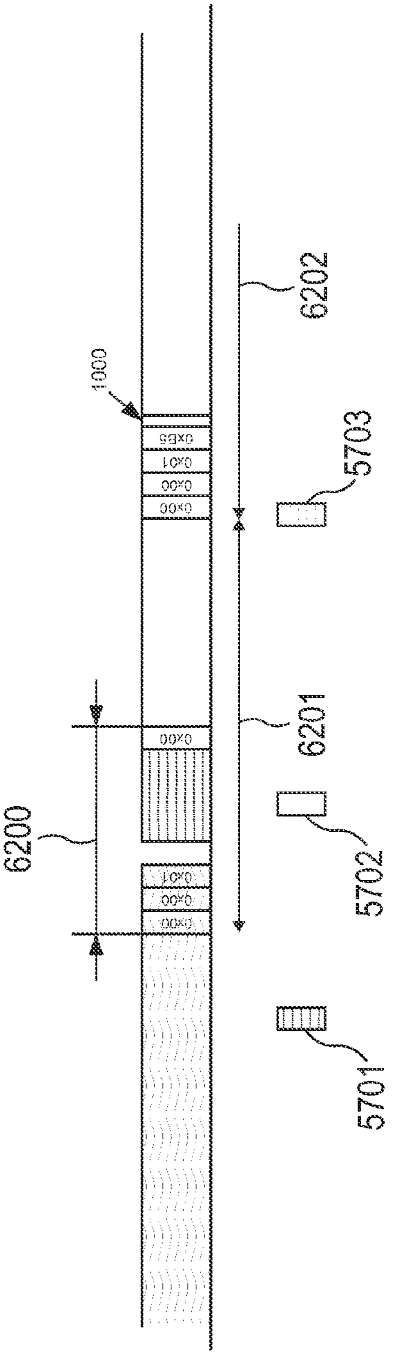
FIG. 62 illustrates picture coding extension and picture start code.

The way the criteria for plaintext packets are formulated may guarantee that these extensions will be fully in plaintext. They can be found by first searching for the extension start code being 0x00 0x00 0x01 0xB5. The next four bits are the extension start code identifier. These four bits are 0001 for the sequence extension and 1000 for the picture coding extension. If a sequence extension is present, the sequence header code should also be present and identically, if a picture code extension is present the picture start code should also be present. This leads to the following:

- if a sequence extension is found in a plaintext area and the sequence header code is not detected in the same area, then the sequence header code should be spread over two packets and the last byte or bytes of the sequence header code are the first bytes of this plaintext area disregarding a possible PES header (see FIG. 61 showing a sequence header code 6100, a sequence header 6101 and a sequence extension 6102).
- if a picture coding extension is found in a plaintext area and the picture start code is not detected in the same area, then the picture start codes should be spread over two packets and the last byte or bytes of the picture start code are the first bytes of this plaintext area disregarding a possible PES header (see FIG. 62 illustrating a picture start code 6200, a picture header 6201 and a picture coding extension 6202).

It should be noted that these two situations can never occur simultaneously in one plaintext area. If sequence extension and picture coding extension are both present, the picture start code that is located between these two will inevitably be fully in plaintext. Only the sequence header code can be partially encrypted in this case. Of course if a sequence header code or picture start code is fully in plaintext and therefore detected in a straightforward manner, the passing of the corresponding data can start immediately. However, if one of the above situations is encountered, it should first be known how many bytes of these codes are at the start of the plaintext area or after the PES header before a correct passing can start. A method to detect this for the picture start code can be applied for the sequence header code.

Figure 63:
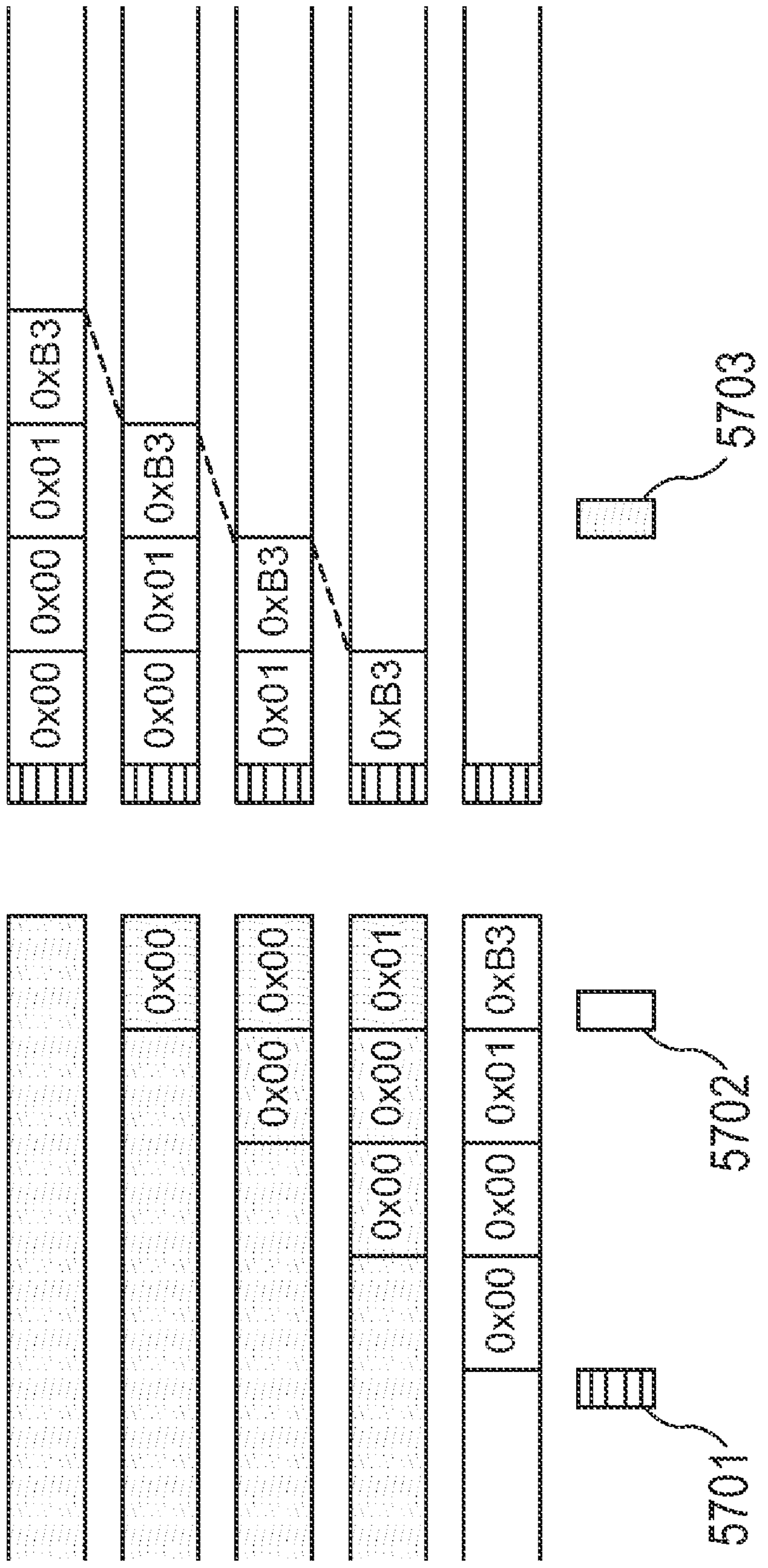
FIG. 63 illustrates sequence header code spread over two packets.

FIG. 63 shows a sequence header code spread over two packets.

The situation for the sequence header code is depicted in FIG. 63. The plaintext is only guaranteed from the fourth byte onwards. This byte is the last byte of the sequence header code that equals 0x00 0x00 0x01 0xB3. So if a sequence header code is present but not detected in this area, some of its last bytes must be present at the start of this area or after the PES header. As with the picture start code it is possible to detect exactly how many of these bytes there are. Detection will start at the first plaintext byte in the area disregarding the PES header. If the first bytes are 0x00 0x01 0xB3 there are three bytes, if they are 0x01 0xB3 there are two bytes and if the first byte is 0xB3 there is only this one byte. Knowing the number of bytes and therefore the location of the last byte of the sequence header code a picture start code enables a correct passing of the data following this code.

A list of abbreviations used in the specification is provided in Table 1.

TABLE 1

| Abbreviations of terms related to trick-play | |
|---|---|
| AFLD | Adaptation Field Control |
| BAT | Bouquet Association Table |
| CA | Conditional Access |
| CAT | Conditional Access Table |
| CC | Continuity Counter |
| CW | Control Word |
| CPI | Characteristic Point Information |
| DIT | Discontinuity Information Table |
| DTS | Decoding Time Stamp |
| DVB | Digital Video Broadcast |
| ECM | Entitlement Control Messages |
| EMM | Entitlement Management Messages |
| GK | Group Key |
| GKM | Group Key Message |
| GOP | Group Of Pictures |
| HDD | Hard Disk Drive |
| KMM | Key Management Message |
| MPEG | Motion Pictures Experts Group |
| NIT | Network Information Table |
| PAT | Program Association Table |
| PCR | Program Clock Reference |
| PES | Packetized Elementary Stream |
| PID | Packet Identifier |
| PLUSI | Payload Unit Start Indicator |
| PMT | Program Map Table |
| PTS | Presentation Time Stamp |
| SIT | Selection Information Table |
| SCB | Scrambling Control Bits |
| STB | Set-top-box |
| SYNC | Synchronization Unit |
| TEI | Transport Error Indicator |
| TPI | Transport Priority Unit |
| TS | Transport Stream |
| UK | User Key |

It should be noted that the above-mentioned embodiments illustrate rather than limit the invention, and that those skilled in the art will be capable of designing many alternative embodiments without departing from the scope of the invention as defined by the appended claims. Furthermore, any of the embodiments described comprise implicit features, such as, an internal current supply, for example, a battery or an accumulator. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage. The terms "data" and "content" have been used interchangeably through the text, but are to be understood as equivalents.

The invention claimed is:

1. A device for processing a data stream, the device comprising:

a processor, wherein said processor separates a partially decrypted data stream, the partially decrypted data stream including decrypted frame boundary portions between adjacent encrypted frames, each decrypted frame boundary portion having a picture start code portion, into stream portions each including a respective decrypted frame boundary portion and a corresponding encrypted frame; replicates said stream portions a number of times; and connects the replicated stream portions in a predetermined manner to allow slow-forward, slow-backward, stand still, more general slow-motion, or trick-play reproduction.

2. The device according to claim 1, wherein the processor further selectively replaces encrypted frame boundary portions between adjacent encrypted frames of an encrypted data stream by the decrypted frame boundary portions so as to form the partially decrypted data stream.

3. The device according to claim 2, wherein the processor is adapted for selectively replacing only the encrypted frame boundary portions between adjacent encrypted frames of an encrypted data stream by the decrypted frame boundary portions, and for maintaining the encrypted frames.

4. The device according to claim 2, wherein the processor is adapted for selectively replacing the encrypted frame boundary portions by the decrypted frame boundary portions so as to form the partially decrypted data stream as a basis for generating a trick-play stream with a reduced or minimum amount of decrypted portions.

5. The device according to claim 1, wherein the processor is adapted for inserting a plaintext packet at the beginning of each encrypted frame.

6. The device according to claim 5, wherein the plaintext packet comprises a header and/or an Adaptation Field.

7. The device according to claim 1, wherein the processor is adapted for connecting the replicated stream portions based on identifying positions at which a frame boundary portion is spanning across two encrypted frames and based on correcting the identified positions.

8. The device according to claim 1, wherein the processor is adapted for determining a size of at least a part of the frame boundary portions and for connecting the stream portions based on the determined size.

9. The device according to claim 8, wherein the processor is adapted for decreasing the size of at least a part of the frame boundary portions in case that the determined size exceeds a predetermined threshold value.

10. The device according to claim 8, wherein the processor is adapted for increasing the size of at least a part of the frame boundary portions in case that the determined size is below a predetermined threshold value.

11. The device according to claim 10, wherein the processor is adapted to increase the size of at least a part of the frame boundary portions by inserting an extra portion into the data stream.

12. The device according to claim 1, wherein the processor processes the data stream for reproduction in a trick-play reproduction mode.

13. A method of processing a data stream, the method comprising separating of a partially decrypted data stream, the partially decrypted data stream comprising decrypted frame boundary portions between adjacent encrypted frames, each decrypted frame boundary portion comprising a picture start code portion, into stream portions each including a respective decrypted frame boundary portion and a corresponding encrypted frame;

replicating said stream portions a number of times in accordance with a predetermined replication rate; and connecting the replicated stream portions in a predetermined manner to allow slow-forward, slow-backward, stand still, more general slow-motion, or trick-play reproduction.

14. A computer-readable storage medium comprising a computer program including a set of instructions executable by a processor, the set of instructions being operable to:

separate a partially decrypted data stream, the partially decrypted data stream comprising decrypted frame boundary portions between adjacent encrypted frames, each decrypted frame boundary portion comprising a picture start code portion, into stream portions each including a respective decrypted frame boundary portion and a corresponding encrypted frame;

replicate said stream portions a number of times in accordance with a predetermined replication rate; and connecting the replicated stream portions in a predetermined manner to allow slow-forward, slow-backward, stand still, more general slow-motion, or trick-play reproduction.

* * * * *